US012782838B2

(12) United States Patent
Akazaki

(10) Patent No.: US 12,782,838 B2
(45) Date of Patent: Nov. 3, 2026

(54) TONER

(71) Applicant: ZEON CORPORATION, Tokyo (JP)

(72) Inventor: Kojiro Akazaki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 790 days.

(21) Appl. No.: 17/794,460

(22) PCT Filed: Jan. 29, 2021

(86) PCT No.: PCT/JP2021/003147
§ 371 (c)(1),
(2) Date: Jul. 21, 2022

(87) PCT Pub. No.: WO2021/153711
PCT Pub. Date: Aug. 5, 2021

(65) Prior Publication Data

US 2023/0070797 A1 Mar. 9, 2023

(30) Foreign Application Priority Data

Jan. 31, 2020 (JP) ................................ 2020-015164
Jan. 31, 2020 (JP) ................................ 2020-015166

(51) Int. Cl.
*G03G 9/087* (2006.01)
*G03G 9/08* (2006.01)
*G03G 9/097* (2006.01)

(52) U.S. Cl.
CPC ....... *G03G 9/08797* (2013.01); *G03G 9/0821* (2013.01); *G03G 9/08711* (2013.01); *G03G 9/097* (2013.01)

(58) Field of Classification Search
CPC ............. G03G 9/08711; G03G 9/0821; G03G 9/08797
See application file for complete search history.

(56) References Cited

U.S. PATENT DOCUMENTS 5,753,399 A 5/1998 Hayase
6,040,104 A 3/2000 Nakamura et al.
(Continued)

FOREIGN PATENT DOCUMENTS

EP 1273976 B1 * 10/2007 ......... G03G 9/08795
JP H09-034163 A 2/1997
(Continued)

OTHER PUBLICATIONS

Yagyu, Machine Translation of WO 2020-045664A, Mar. 5, 2020 (Year: 2020).*
(Continued)

*Primary Examiner* — Peter L Vajda
*Assistant Examiner* — Jenna Kuipers
(74) *Attorney, Agent, or Firm* — WHDA, LLP

(57) ABSTRACT

A toner excellent in low-temperature fixing property and shelf stability. The toner comprising colored resin particles containing a binder resin, a colorant, a softening agent and a charge control agent, and an external additive, wherein a glass transition temperature (Tg) specified from a temperature dependence curve for a loss tangent (tan δ) of the toner, which is obtained by a dynamic viscoelastic measurement of the toner at a measurement frequency of 24 Hz, satisfies 45° C.<Tg(° C.)<100° C., and formula (I-1): $5.00\times10^{-2}<(\tan\delta(Tg)-\tan\delta(45°\,C.))/(Tg-45)<7.60\times10^{-2}$ and formula (I-2): $-3.0\times10^{-3}<(\tan\delta(130°\,C.)-\tan\delta(100°\,C.))/30<9.8\times10^{-1}$ are satisfied, or formula (II-1): $5.00\times10^{-2}<(\tan\delta(Tg)-\tan\delta(45°\,C.))/(Tg-45)<7.60\times10^{-2}$ and formula (II-2): $2.1\times10^{-3}<(\tan\delta(130°\,C.)-\tan\delta(100°\,C.))/30<4.4\times10^{-2}$ are satisfied.

11 Claims, 2 Drawing Sheets

(56) References Cited

U.S. PATENT DOCUMENTS

| | | | | |
|---|---|---|---|---|
| 10,289,017 | B2 * | 5/2019 | Otake | G03G 9/091 |
| 2006/0166120 | A1 | 7/2006 | Moriki et al. | |
| 2009/0186290 | A1 | 7/2009 | Yoshizaki et al. | |
| 2009/0324296 | A1 | 12/2009 | Joo et al. | |
| 2013/0095423 | A1 | 4/2013 | Takemori | |
| 2017/0115584 | A1 * | 4/2017 | Nakatani | G03G 9/0823 |
| 2018/0120722 | A1 | 5/2018 | Otake | |
| 2018/0120723 | A1 * | 5/2018 | Otake | C09B 29/3626 |

FOREIGN PATENT DOCUMENTS

| | | | | |
|---|---|---|---|---|
| JP | H11-194542 | A | 7/1999 | |
| JP | H11-295918 | A | 10/1999 | |
| JP | 2000-003067 | A | 1/2000 | |
| JP | 2006-235615 | A | 9/2006 | |
| JP | 2009-151005 | A | 7/2009 | |
| JP | 2013-088503 | A | 5/2013 | |
| WO | 2009/011424 | A1 | 1/2009 | |
| WO | WO-2010013923 | A2 * | 2/2010 | G03G 9/0804 |
| WO | WO-2020045664 | A1 * | 3/2020 | G03G 9/0821 |

OTHER PUBLICATIONS

Heubach Group, Toner Magenta E02 Product Page, 2025 (Year: 2025).*

International Search Report dated Apr. 20, 2021, issued in counterpart Application No. PCT/JP2021/003147, with English Translation. (5 pages).

Notification of Transmittal of Translation of the International Preliminary Report on Patentability (Form PCT/IB/338) issued in counterpart International Application No. PCT/JP2021/003147 mailed Aug. 11, 2022, with Forms PCT/IB/373 and PCT/ISA/237. (6 pages).

* cited by examiner

TONER

TECHNICAL FIELD

The present disclosure relates to a toner which is used to develop an electrostatic latent image in, for example, electrophotography, electrostatic recording, and electrostatic printing.

BACKGROUND ART

In an image forming device such as an electronic photographic device, an electrostatic recording device and an electrostatic printing device, first, an electrostatic latent image formed on the photoconductor is developed using a toner; the toner image is transferred onto a transferring material such as a sheet of paper; and the material is heated to fix the image, whereby a fixed image is obtained.

As such an image forming device, those corresponding to high image quality and high-speed printing are desired, and a toner capable of forming a high-quality image is desired. Recently, the development of a toner focusing on the viscoelasticity of the binder resin or the toner has been attempted.

For example, Patent Literature 1 discloses that the following binder resin is used in a toner. The binder resin is a polyester resin, and the minimum tan δ of the binder resin exists between the glass transition temperature (Tg) and the temperature at which the loss elastic modulus (G") becomes $G''=1\times10^4$ Pa. The minimum tan δ of the binder resin is less than 1.2, the storage elastic modulus (G') at the temperature at which the tan δ is the minimum is $G'=5\times10^5$ Pa or more, and the value of the tan δ at the temperature at which $G''=1\times10^4$ Pa is 3.0 or more.

Patent Literature 2 discloses an image-forming method in which a specific fixing member and a specific toner are used in combination. The fixing member has a surface layer in which an abrasion-resistant additive having a volume average particle diameter of 1 μm or less is dispersed. The toner has a peak of tan δ in a range of from 40° C. to 70° C. in the dynamic viscoelastic temperature-dependent measurement, and the peak value of the tan δ is less than 2.0. In Patent Literature 2, as a method of controlling the peak value to less than 2.0, a method in which an amorphous polyester resin is used as the binder resin of the toner, and fine particles having a particle diameter of 0.1 μm or less are dispersed in the toner, and a method in which a crystalline polyester resin and an amorphous polyester resin are used in combination as the binder resin of the toner, are disclosed.

Patent Literature 3 discloses a toner for developing electrostatic images, the toner containing a binder resin, a colorant, a release agent and a charge control agent. The release agent contains a wax having a polar group; the toner has a tan δ of from 1 to 2 at from 80° C. to 145° C., which is measured by a viscoelasticity measuring device at a frequency of 10 kHz and a shear stress of 500 Pa; and the toner has a fracture point of 180° C. or lower as observed in the temperature-tan δ curve. In Patent Literature 3, it is described that a polyester resin is preferably used as the binder resin.

CITATION LIST

Patent Literature

Patent Literature 1: Japanese Patent Application Laid-Open (JP-A) No. H11 (1999)-194542

Patent Literature 2: JP-A No. 2009-151005

Patent Literature 3: JP-A No. 2013-88503

SUMMARY OF INVENTION

Technical Problem

It is required in a toner capable of forming a high-quality image that both low-temperature fixability and shelf stability are excellent in a good balance. However, it has been difficult to improve both the low-temperature fixability and shelf stability of the toner in a well-balanced manner by the conventional method of adjusting the viscoelasticity of the binding resin or the toner.

An object of the present disclosure is to provide a toner excellent in low-temperature fixability and shelf stability.

Solution to Problem

As a result of an extensive study to achieve the object, the inventor of the present disclosure found that there are viscoelastic characteristics of a toner which can efficiently improve the low-temperature fixability of the toner and can suppress blocking during toner storage.

In a first embodiment, the toner of the present disclosure is a toner comprising colored resin particles containing a binder resin, a colorant, a softening agent and a charge control agent, and an external additive, wherein a glass transition temperature (Tg) specified from a temperature dependence curve for a loss tangent (tan δ) of the toner, which is obtained by a dynamic viscoelastic measurement of the toner at a measurement frequency of 24 Hz, satisfies 45° C.<Tg(° C.)<100° C., and wherein, in the temperature dependence curve for the loss tangent (tan δ), the following formulae (I-1) and (I-2) are satisfied:

$$5.00\times10^{-2}<(\tan\delta(Tg)-\tan\delta(45°\text{ C.}))/(Tg-45)<7.60\times10^{-2} \quad \text{Formula (I-1)}$$

$$-3.0\times10^{-3}<(\tan\delta(130°\text{ C.})-\tan\delta(100°\text{ C.}))/30<9.8\times10^{-1} \quad \text{Formula (I-2)}$$

where tan δ(45° C.) is a loss tangent (tan δ) at 45° C.; tan δ(Tg) is a loss tangent (tan δ) at the glass transition temperature (Tg); tan δ(100° C.) is a loss tangent (tan δ) at 100° C.; and tan δ(130° C.) is a loss tangent (tan δ) at 130° C.

In the toner of the first present disclosure, a softening temperature ($T_{1/2}$) measured by a ½ method at a pressure of 10.0 kgf/cm$^2$ using a flow tester, may be more than 154° C. and less than 220° C.

In the toner of the first present disclosure, the loss tangent (tan δ) at the glass transition temperature (Tg) may be less than 1.870.

In the toner of the first present disclosure, in the temperature dependence curve for the loss tangent (tan δ), the loss tangent (tan δ) at 100° C. may be 0.800 or more and 1.100 or less, and the loss tangent (tan δ) at 130° C. may be 0.800 or more and 1.280 or less.

In the toner of the first present disclosure, the binder resin may contain a polymer of one or two or more kinds of polymerizable monomers including at least one kind of monovinyl monomer selected from the group consisting of styrene, acrylic esters and methacrylic esters.

In the toner of the first present disclosure, a weight average molecular weight of a polymer contained in the binder resin may be $3.00\times10^5$ or more and $7.00\times10^5$ or less.

In a second embodiment, the toner of the present disclosure is a toner comprising colored resin particles containing a binder resin, a colorant, a softening agent and a charge control agent, and an external additive, wherein a glass transition temperature (Tg) specified from a temperature dependence curve for a loss tangent (tan δ) of the toner, which is obtained by a dynamic viscoelastic measurement of the toner at a measurement frequency of 24 Hz, satisfies 45° C.<Tg(° C.)<100° C., and wherein, in the temperature dependence curve for the loss tangent (tan δ), the following formulae (II-1) and (II-2) are satisfied:

$$5.00\times10^{-2}<(\tan\delta(Tg)-\tan\delta(45°\ C.))/(Tg-45)<7.60\times10^{-2} \quad \text{Formula (II-1)}$$

$$2.1\times10^{-3}<(\tan\delta(130°\ C.)-\tan\delta(100°\ C.))/30<4.4\times10^{-2} \quad \text{Formula (II-2)}$$

where tan δ(45° C.) is a loss tangent (tan δ) at 45° C.; tan δ(Tg) is a loss tangent (tan δ) at the glass transition temperature (Tg); tan δ(100° C.) is a loss tangent (tan δ) at 100° C.; and tan δ(130° C.) is a loss tangent (tan δ) at 130° C.

In the toner of the second present disclosure, an apparent glass transition temperature (Tg2) of the toner at a time of increasing a temperature of the toner at a temperature increasing rate of 1000 K/sec may be from 68° C. to 74° C., and a heat generation starting temperature of the toner at a time of decreasing a temperature of the toner at a temperature decreasing rate of 1000 K/sec may be from 50° C. to 62° C., both of which are obtained by a differential scanning calorimetry of the toner using a high-speed differential scanning calorimeter.

In the toner of the second present disclosure, a softening temperature ($T_{1/2}$) measured by a ½ method at a pressure of 5.0 kgf/cm$^2$ using a flow tester, may be more than 124° C. and less than 159° C.

In the toner of the second present disclosure, the loss tangent (tan δ) at the glass transition temperature (Tg) may be less than 2.410.

In the toner of the second present disclosure, in the temperature dependence curve for the loss tangent (tan δ), the loss tangent (tan δ) at 100° C. may be 0.900 or more and 1.400 or less, and the loss tangent (tan δ) at 130° C. may be 1.000 or more and 2.500 or less.

In the toner of the second present disclosure, the binder resin may contain a polymer of one or two or more kinds of polymerizable monomers including at least one kind of monovinyl monomer selected from the group consisting of styrene, acrylic esters and methacrylic esters.

In the toner of the second present disclosure, a weight average molecular weight of a polymer contained in the binder resin may be $2.00\times10^4$ or more and $1.00\times10^5$ or less.

Advantageous Effects of Invention

According to the present disclosure as described above, a toner having excellent low-temperature fixability and shelf stability can be provided.

DESCRIPTION OF EMBODIMENTS

Figure 1:
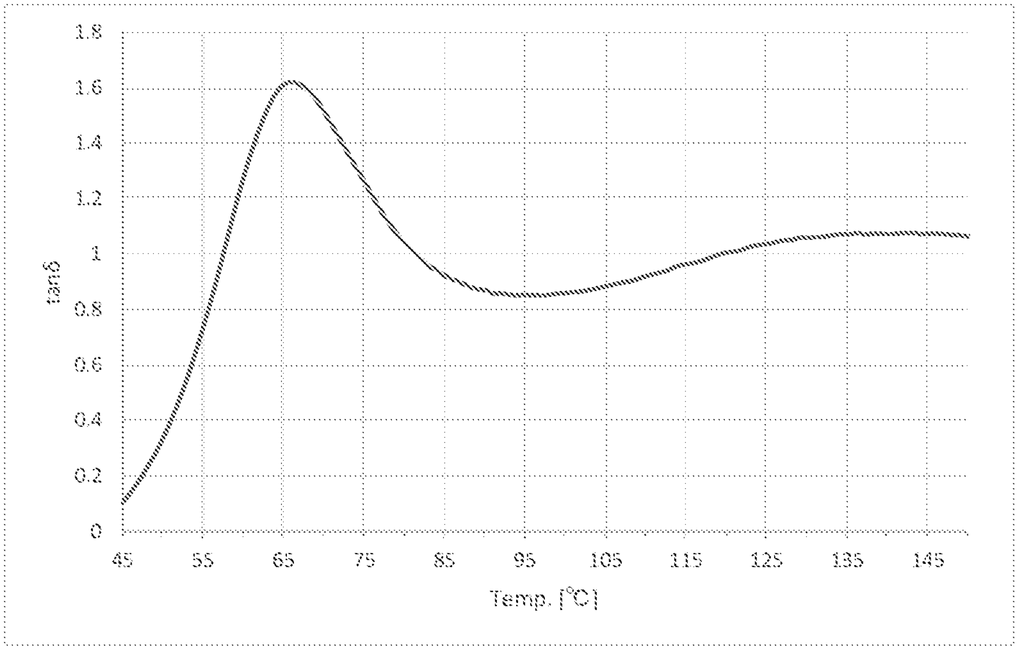
FIG. 1 is a graph showing the temperature dependence curve for the loss tangent (tan δ) of the toner of Example I-1.

I. Toner of the First Present Disclosure

The toner of the first present disclosure is a toner comprising colored resin particles containing a binder resin, a colorant, a softening agent and a charge control agent, and an external additive, wherein a glass transition temperature (Tg) specified from a temperature dependence curve for a loss tangent (tan δ) of the toner, which is obtained by a dynamic viscoelastic measurement of the toner at a measurement frequency of 24 Hz, satisfies 45° C.<Tg(° C.)<100° C., and wherein, in the temperature dependence curve for the loss tangent (tan δ), the following formulae (I-1) and (I-2) are satisfied:

$$5.00\times10^{-2}<(\tan\delta(Tg)-\tan\delta(45°\ C.))/(Tg-45)<7.60\times10^{-2} \quad \text{Formula (I-1)}$$

$$-3.0\times10^{-3}<(\tan\delta(130°\ C.)-\tan\delta(100°\ C.))/30<9.8\times10^{-1} \quad \text{Formula (I-2)}$$

where tan δ(45° C.) is a loss tangent (tan δ) at 45° C.; tan δ(Tg) is a loss tangent (tan δ) at the glass transition temperature (Tg); tan δ(100° C.) is a loss tangent (tan δ) at 100° C.; and tan δ(130° C.) is a loss tangent (tan δ) at 130° C.

Hereinafter, the viscoelastic characteristics of the toner of the first present disclosure, a method for producing colored resin particles used for the toner of the first present disclosure, the colored resin particles, an external additive used for the toner of the first present disclosure, and the performances of the toner of the first present disclosure, will be described in this order.

In the present disclosure, the term "A to B" in the numerical range means that the numerical value described as A is included as the lower limit value and the numerical value described as B is included as the upper limit value.

I-1. Viscoelastic Characteristics of the Toner of the First Disclosure

In the toner of the first present disclosure, the shape of the temperature dependence curve for the loss tangent (tan δ) in the temperature range of 45° C. or higher and 145° C. or lower, which is obtained by a dynamic viscoelastic measurement of the toner at a measurement frequency of 24 Hz, has the following characteristics. The curve has at least one peak in a range of higher than 45° C. and lower than 100° C. After the temperature exceeds the temperature at which the tan δ becomes the maximum value of the peak, the tan δ decreases with increasing temperature. Then, the tan δ decreases while the tan δ increases and decreases, or the tan δ keep decreasing, to reach the minimum value, or to become a constant value above a certain temperature, or to keep decreasing. When the tan δ reaches the minimum value, the tan δ gradually increases from the temperature at which the tan δ reaches the minimum value as the temperature further increases, and then, the tan δ keeps increasing or becomes a substantially constant value above a certain temperature.

In addition, in the toner of the first present disclosure, a glass transition temperature (Tg) specified from the temperature dependence curve for the loss tangent (tan δ) of the toner is higher than 45° C. and lower than 100° C., and in the temperature dependence curve for the loss tangent (tan δ), the following formulae (I-1) and (I-2) are satisfied:

$$5.00\times10^{-2}<(\tan\delta(Tg)-\tan\delta(45°\text{ C.}))/(Tg-45)<7.60\times10^{-2} \quad \text{Formula (I-1)}$$

$$-3.0\times10^{-3}<(\tan\delta(130°\text{ C.})-\tan\delta(100°\text{ C.}))/30<9.8\times10^{-1} \quad \text{Formula (I-2)}$$

where tan δ(45° C.) is a loss tangent (tan δ) at 45° C.; tan δ(Tg) is a loss tangent (tan δ) at the glass transition temperature (Tg); tan δ(100° C.) is a loss tangent (tan δ) at 100° C.; and tan δ(130° C.) is a loss tangent (tan δ) at 130° C.

In the present disclosure, the loss tangent (tan δ) is defined as the ratio (G"/G') of the storage elastic modulus (G') and the loss elastic modulus (G") measured by the dynamic viscoelastic measurement.

In the present disclosure, the value of the tan δ is rounded to the third decimal place according to the rule B of JIS Z8401:1999. The values of the tan δ rounded to the third decimal place are used in the formulae (I-1) and (I-2). In addition, the value of (tan δ(Tg)−tan δ(45° C.))/(Tg−45) shown in the formula (I-1) is set to be a value rounded such that the significant number becomes three orders of magnitude. The value of (tan δ(130° C.)−tan δ(100° C.))/30 shown in the formula (I-2) is set to be a value rounded such that the significant number becomes two orders of magnitude.

In the present disclosure, the glass transition temperature (Tg) specified from the temperature dependence curve for the loss tangent (tan δ) obtained by the dynamic viscoelastic measurement of the toner at a measurement frequency of 24 Hz, is specified as the lowest temperature at which the tan δ is the maximum value in the peak of the lowest temperature side among one or more peaks in the temperature range of higher than 45° C. and lower than 100° C. of the temperature dependence curve. Fine vertical fluctuations (such as noise) caused by the measurement are not interpreted as the above-mentioned peaks. In the present disclosure, the temperature dependence curve for the loss tangent (tan δ) obtained by the dynamic viscoelasticity measurement may be referred to as a "temperature-tan δ curve".

In the toner of the first present disclosure, the dynamic viscoelastic measurement is carried out using a rotating flat plate rheometer (product name: ARES-G2, manufactured by: TA Instruments Inc.) and using a parallel plate or a cross hatch plate under the following conditions.

Frequency: 24 Hz

Sample set: Test piece (8 mm diameter, 2 mm to 4 mm thick) is sandwiched between 8 mm φ plates with a 20 g load, the test piece is fused to the jig by increasing the temperature to 80° C., and then, the temperature is returned to 45° C., to start the temperature increase.

Temperature increasing rate: 5° C./min

Temperature range: 40° C. to 150° C.

For example, the test piece can be produced by pouring 0.2 g of the toner of the first present disclosure into a cylindrical mold of 8 mm φ and pressurizing the toner at 1.0 MPa for 30 seconds, thereby forming a columnar molded product having a diameter of 8 mm φ and a thickness of 2 mm to 4 mm.

The toner of the first present disclosure has the specific viscoelasticity in which the above mentioned formulae (I-1) and (I-2) are satisfied in the temperature-tan δ curve. Consequently, in the toner, both the low-temperature fixability and shelf stability are improved in a well-balanced manner, and the toner has excellent performance which has been difficult to realize in the past. The formula (I-1) shows the range of the slope of the straight line passing through the tan δ(45° C.) and tan δ(Tg) in the temperature-tan δ curve. The formula (I-2) shows the range of the slope of the straight line passing through the tan δ(100° C.) and tan δ(130° C.) in the temperature-tan δ curve. At the time of toner fixing and during toner storage, the toner does not suddenly deform when the toner reaches a certain temperature. The toner gradually deforms as the toner temperature increases or as the toner is kept at a certain temperature over time. The present inventor has found that, based on such a property of the toner, the characteristic of the toner in which the balance between the low-temperature fixability and the shelf stability is good appears as the slope of the straight line passing through the tan δ(45° C.) and tan δ(Tg) and the slope of the straight line passing through the tan δ(100° C.) and tan δ(130° C.). As a result of further intensive studies, the present inventor has found that by adjusting the slope of the straight line passing through the tan δ(45° C.) and tan δ(Tg), the blocking property when the toner is stored for a long time can be easily controlled, and by adjusting the slope of the straight line passing through the tan δ(100° C.) and tan δ(130° C.), the fixability of the toner can be easily controlled.

As the value of (tan δ(Tg)−tan δ(45° C.))/(Tg−45) shown in the formula (I-1) decreases within the above numerical range, blocking during toner storage is likely to be suppressed, and the shelf stability of the toner is improved. The value of (tan δ(Tg)−tan δ(45° C.))/(Tg−45) decreases as the difference between the tan δ(Tg) and tan δ(45° C.) decreases or as the Tg becomes higher. It is presumed that, since the difference between the tan δ(Tg) and tan δ(45° C.) is not too large, the viscosity of the toner does not become too strong, that is, the movement of the polymer chain between the toner particles is suppressed, so that the blocking of the toner is suppressed. Further, it is presumed that blocking of the toner is suppressed because the decrease in modulus of the toner at a low temperature is suppressed due to the not too low Tg. Moreover, since the value of the formula (I-1) is less than the upper limit value, deterioration of the shelf stability of the toner is suppressed. Since the value of the formula (I-1) is more than the lower limit value, the increase of the fixing temperature of the toner is likely to be suppressed, and thus the deterioration of the low-temperature fixability of the toner is suppressed.

On the other hand, as the value of (tan δ(130° C.)−tan δ(100° C.))/30 shown in the formula (I-2) increases within the above numerical range, the fixing temperature of the toner is likely to decrease, and the low-temperature fixability of the toner is improved. At the time of fixing the toner, the toner gradually deforms as the temperature of the toner increases. At the time of actual fixing of the toner, there is a temperature gradient of at least 100° C. to 130° C. from the time when the sheet on which the toner is transferred enters the roll to the time when the sheet is discharged. It is presumed that the larger the value of (tan δ (130° C.)−tan δ(100° C.))/30 shown in the formula (I-2), the faster the increase of the tan δ after the toner is warmed, that is, the faster the increase of the viscosity of the toner, so that fixing of the toner at a relatively low temperature becomes possible. Further, the glossiness of the image to be formed is good when the value of the formula (I-2) is more than the lower limit value. When the value of the formula (I-2) is less than the upper limit value, blocking during toner storage is suppressed, and deterioration of the shelf stability is suppressed.

The present inventor has also found that particularly when the softening temperature ($T_{1/2}$) measured by a ½ method at a pressure of 10.0 kgf/cm$^2$ using a flow tester, is more than 154° C. and less than 220° C., the toner which has the viscoelasticity satisfying the formulae (I-1) and (I-2) in the temperature-tan δ curve, exhibits the above-mentioned effects.

In order to obtain a toner which has the viscoelasticity satisfying the formulae (I-1) and (I-2) in the temperature-tan δ curve, for example, the viscoelasticity of the toner can be controlled by appropriately changing the composition, molecular weight and content of the binder resin contained in the toner, the type and content of the colorant, the viscosity of the colorant raw material, the glass transition temperature (Tg) and content of the charge control agent, the type and molecular weight of the softening agent, and the type and content of the external additive, and the like. Among them, it is effective to adjust the molecular weight and composition of the binder resin, the type and content of the colorant, and the viscosity of the colorant raw material. The molecular weight, composition, and the like of the binder resin contained in the toner have a large influence on the viscoelasticity of the toner in the low temperature range at or below the glass the glass transition temperature. Therefore, in order to achieve the viscoelasticity satisfying the formula (I-1), it is effective to adjust the molecular weight, composition, and the like of the binder resin contained in the toner. On the other hand, the type and content of the colorant contained in the toner, the viscosity of the colorant raw material, and the like have a large influence on the viscoelasticity of the toner in the temperature range of 100° C. to 130° C. Therefore, in order to achieve the viscoelasticity satisfying the formula (I-2), it is effective to adjust the type and content of the colorant contained in the toner, the viscosity of the colorant raw material, and the like. More specifically, the temperature-tan δ curve of the toner can satisfy the formulae (I-1) and (I-2) by the preferable embodiment of each component described later.

The toner of the first present disclosure satisfies the following formula (I-1) in the temperature-tan δ curve obtained by a dynamic viscoelastic measurement of the toner at a measurement frequency of 24 Hz.

$$5.00\times10^{-2}<(\tan\delta(Tg)-\tan\delta(45°\text{ C.}))/(Tg-45)<7.60\times10^{-2} \quad \text{Formula (I-1)}$$

The upper limit in the formula (I-1) is preferably less than $7.40\times10^{-2}$, and more preferably less than $7.20\times10^{-2}$, from the viewpoint that blocking during toner storage is likely to be suppressed and the shelf stability of the toner is easily improved. On the other hand, the lower limit in the formula (I-1) is preferably $5.60\times10^{-2}$ or more, and more preferably $6.00\times10^{-2}$ or more, from the viewpoint that the increase in the fixing temperature is likely to be suppressed.

The toner of the first present disclosure satisfies the following formula (I-2) in the temperature-tan δ curve obtained by a dynamic viscoelastic measurement of the toner at a measurement frequency of 24 Hz.

$$-3.0\times10^{-3}<(\tan\delta(130°\text{ C.})-\tan\delta(100°\text{ C.}))/30<9.8\times10^{-1} \quad \text{Formula (I-2)}$$

The lower limit in the formula (I-2) is preferably more than $-1.5\times10^{-3}$, and more preferably more than $0.1\times10^{-3}$, from the viewpoint that the low-temperature fixability of the toner is improved and the glossiness of the image to be formed is easily improved. The upper limit in the formula (I-2) is preferably less than $5.0\times10^{-2}$, more preferably less than $4.0\times10^{-2}$, and still more preferably less than $2.0\times10^{-2}$, from the viewpoint that the deterioration of the shelf stability of the toner is likely to be suppressed.

The toner of the first present disclosure satisfies the glass transition temperature (Tg) of 45° C.<Tg(° C.)<100° C. The glass transition temperature (Tg) is specified from the temperature dependence curve for the loss tangent (tan δ) of the toner, which is obtained by a dynamic viscoelastic measurement of the toner at a measurement frequency of 24 Hz. The glass transition temperature (Tg) is preferably 50° C. or higher, more preferably 60° C. or higher, and still more preferably 65° C. or higher, from the viewpoint of suppressing abrupt decrease in modulus of the toner at a low temperature and suppressing blocking of the toner. On the other hand, the glass transition temperature (Tg) is preferably 90° C. or lower, more preferably 80° C. or lower, and still more preferably 75° C. or lower, from the view point that the softening start temperature of the toner does not become too high, and the low-temperature fixability of the toner is improved.

In the toner of the first present disclosure, the tan δ(Tg), which is the loss tangent (tan δ) at the glass transition temperature (Tg), is preferably less than 1.900, more preferably less than 1.870, and still more preferably 1.860 or less. When the tan δ(Tg) is equal to or lower than the upper limit value, blocking during toner storage is likely to be suppressed, and the shelf stability of the toner is easily improved.

The lower limit of the tan δ(Tg) is not particularly limited. It is preferably 1.000 or more, and more preferably 1.100 or more, from the viewpoint of improving the fixability of the toner.

In the toner of the first present disclosure, the tan δ(45° C.), which is the loss tangent (tan δ) at 45° C., is preferably 0.300 or less, more preferably 0.200 or less, and still more preferably 0.150 or less. When the tan δ(45° C.) is equal to or lower than the upper limit value, blocking during toner storage is likely to be suppressed, and the shelf stability of the toner is easily improved.

The lower limit of the tan δ(45° C.) is not particularly limited. It is preferably more than 0.000, and more preferably 0.050 or more, from the viewpoint of improving the fixability of the toner.

In the toner of the first present disclosure, the tan δ(100° C.), which is the loss tangent (tan δ) at 100° C., is preferably 0.600 or more, more preferably 0.700 or more, and still more preferably 0.800 or more, from the viewpoint that the low-temperature fixability of the toner is easily improved. The tan δ(100° C.) is preferably 1.200 or less, more preferably 1.100 or less, and still more preferably 1.050 or less, from the viewpoint that the deterioration of the shelf stability of the toner is likely to be suppressed.

In the toner of the first present disclosure, the tan δ(130° C.), which is the loss tangent (tan δ) at 130° C., is preferably 0.800 or more, more preferably 0.900 or more, and still more preferably 0.950 or more, from the viewpoint that the low-temperature fixability of the toner is easily improved. The tan δ(130° C.) is preferably 2.000 or less, more preferably 1.500 or less, and still more preferably 1.280 or less, from the viewpoint that the deterioration of the shelf stability of the toner is likely to be suppressed.

In addition, the toner of the first present disclosure has the softening temperature ($T_{1/2}$) measured by a ½ method at a pressure of 10.0 kgf/cm$^2$ using a flow tester, of preferably more than 154° C. and less than 220° C. When the toner having the softening temperature ($T_{1/2}$) within the above range has the viscoelasticity satisfying the formulae (I-1) and (I-2) in the temperature-tan δ curve, both the low-temperature fixability and shelf stability of the toner can be particularly improved in a well-balanced manner.

The softening temperature ($T_{1/2}$) of the toner is preferably 158° C. or higher, and more preferably 160° C. or higher, from the viewpoint of improving the shelf stability of the toner. On the other hand, from the viewpoint of improving the low-temperature fixability of the toner, the softening temperature ($T_{1/2}$) is preferably 210° C. or lower, and more preferably 200° C. or lower.

The softening temperature ($T_{1/2}$) of the toner of the first present disclosure can be adjusted, for example, by the composition and molecular weight of the binder resin, the type and content of the colorant, and the like. As the amount of the crosslinkable polymerizable monomer used in the binder resin increases, the softening temperature ($T_{1/2}$) is likely to increase. Further, as the weight-average molecular weight of the polymer contained in the binder resin increases, the softening temperature ($T_{1/2}$) is likely to increase. Further, by using a colorant which is likely to increase the viscosity of the toner as described later, the toner of the first present disclosure is likely to have the softening temperature ($T_{1/2}$) within the above range.

The softening temperature ($T_{1/2}$) measured by the ½ method at a pressure of 10.0 kgf/$cm^2$ using a flow tester, can be determined from the flow curve (piston stroke–temperature) measured under the following measurement conditions using a flow tester (product name: CFT-500C) manufactured by Shimadzu Corporation. Specifically, in the flow curve, ½ of the difference between the piston stroke at the outflow ending point and the minimum value of the piston stroke is obtained. Then, the softening temperature ($T_{1/2}$) can be determined as the temperature of the position of the sum of the obtained value and the minimum value.

(Measurement Conditions)

Start temperature: 35° C.
Temperature increasing rate: 3° C./min
Preheating time: 5 minutes
Cylinder pressure: 10.0 kgf/$cm^2$ (10 kg method)
Die hole diameter: 0.5 mm
Die length: 1.0 mm
Sample input amount: 1.0 g to 1.3 g I-2. Method for Producing Colored Resin Particles In general, methods for producing colored resin particles are broadly classified into dry methods such as a pulverization method and wet methods such as an emulsion polymerization agglomeration method, a suspension polymerization method and a dissolution suspension method. The wet methods are preferred since a toner having excellent printing characteristics such as image reproducibility, can be easily obtained. Among the wet methods polymerization methods such as an emulsion polymerization agglomeration method and a suspension polymerization method are preferred, since a toner having a relatively small particle size distribution in micron order can be easily obtained. Among the polymerization methods, a suspension polymerization method is more preferred.

In the emulsion polymerization aggregation method, a polymerizable monomer emulsified is polymerized to obtain a resin fine particle emulsion, and is aggregated with a colorant dispersion or the like, thereby obtaining colored resin particles. In the dissolution suspension method, a solution in which toner components such as a binder resin and a colorant are dissolved or dispersed in an organic solvent is formed into liquid droplets in an aqueous medium, and the organic solvent is removed, thereby obtaining colored resin particles. As those methods, known methods can be used.

The colored resin particles used in the toner of the first present disclosure can be produced by using a wet method or a dry method, and a wet method is preferably used. The colored resin particles can be produced by the following processes using a suspension polymerization method which is particularly preferable among the wet methods.

(A) Suspension Polymerization Method (A-1) Preparation Step of Polymerizable Monomer Composition First, a polymerizable monomer, a colorant, a softening agent, a charge control agent, and other additives such as a molecular weight modifier if necessary are mixed to prepare a polymerizable monomer composition. For example, a media type dispersing machine is used for the mixing in the preparation of the polymerizable monomer composition.

In the present disclosure, the polymerizable monomer is a monomer having a polymerizable functional group. Polymerizable monomers are polymerized to become a binder resin. As the main component of the polymerizable monomer, a monovinyl monomer is preferably used. Examples of the monovinyl monomer include, but are not limited to, styrene; styrene derivatives such as vinyltoluene and α-methylstyrene; acrylic acid and methacrylic acid; acrylic esters such as methyl acrylate, ethyl acrylate, propyl acrylate, butyl acrylate, 2-ethylhexyl acrylate and dimethylaminoethyl acrylate; methacrylic esters such as methyl methacrylate, ethyl methacrylate, propyl methacrylate, butyl methacrylate, 2-ethylhexyl methacrylate and dimethylaminoethyl methacrylate; nitrile compounds such as acrylonitrile and methacrylonitrile; amide compounds such as acrylamide and methacrylamide; and olefins such as ethylene, propylene and butylene.

The monovinyl monomers may be used alone or in combination of two or more thereof.

From the viewpoint that the temperature-tan δ curve of the toner is likely to satisfy the formulae (I-1) and (I-2), and that the softening temperature ($T_{1/2}$) is likely to fall within the preferable range, the polymerizable monomer preferably includes at least one kind of monovinyl monomer selected from the group consisting of styrene, styrene derivatives, acrylic esters and methacrylic esters, more preferably includes at least one kind of monovinyl monomer selected from the group consisting of styrene, acrylic esters and methacrylic esters, and still more preferably includes styrene and at least one kind selected from the group consisting of acrylic esters and methacrylic esters.

In addition, from the viewpoint that the temperature-tan δ curve of the toner is likely to satisfy the formulae (I-1) and (I-2), and that the softening temperature ($T_{1/2}$) is likely to fall within the preferable range, among the acrylic esters, at least one selected from the group consisting of n-butyl acrylate, propyl acrylate and 2-ethylhexyl acrylate is preferred, and among the methacrylic esters, at least one selected from the group consisting of n-butyl methacrylate, propyl methacrylate and 2-ethylhexyl methacrylate is preferred.

The content of styrene in 100 parts by mass of the total amount of the monovinyl monomers is preferably 60 parts by mass or more and 90 parts by mass or less, more preferably 65 parts by mass or more and 85 parts by mass or less, and still more preferably 70 parts by mass or more and 80 parts by mass or less. The larger the styrene content, the higher the softening temperature ($T_{1/2}$) of the toner is likely to be and the higher the glass transition temperature (Tg) of the toner is likely to be.

From the viewpoint that the temperature-tan δ curve of the toner is likely to satisfy the formulae (I-1) and (I-2), and that the softening temperature ($T_{1/2}$) is likely to fall within the preferable range, it is preferable that the monovinyl monomer includes styrene and at least one selected from the group consisting of acrylic acid esters and methacrylic acid esters, and the mass ratio of styrene to the total mass of acrylic acid esters and methacrylic acid esters (styrene:(meth)acrylic acid esters) is within the range of 50:50 to 90:10. The mass ratio (styrene:(meth)acrylic acid esters) is more preferably within the range of 60:40 to 80:20, and particularly preferably within the range of 70:30 to 75:25.

When the polymerizable monomer includes a polymerizable monomer other than the monovinyl monomer, the content of the monovinyl monomer is appropriately adjusted such that the temperature-tan δ curve of the toner satisfies the formulae (I-1) and (I-2). The content of the monovinyl monomer is not particularly limited. The total amount of the monovinyl monomer is preferably 90 parts by mass or more, and more preferably 95 parts by mass or more, per 100 parts by mass of the total amount of the polymerizable monomer.

From the viewpoint that the temperature-tan δ curve of the toner is likely to satisfy the formulae (I-1) and (I-2), and that the softening temperature ($T_{1/2}$) is likely to fall within the preferable range, it is preferable that a crosslinkable polymerizable monomer is preferably used in combination with the monovinyl monomer. The crosslinkable polymerizable monomer is a monomer having two or more polymerizable functional groups. Examples of the crosslinkable polymerizable monomer include, but are not limited to, aromatic divinyl compounds such as divinyl benzene, divinyl naphthalene and derivatives thereof; ester compounds such as ethylene glycol dimethacrylate and diethylene glycol dimethacrylate, in which two or more carboxylic acids are esterified to an alcohol having two or more hydroxyl groups; other divinyl compounds such as N,N-divinylaniline and divinyl ether; and compounds having three or more vinyl groups. Among them, at least one selected from the group consisting of divinyl benzene, divinyl naphthalene and derivatives thereof is preferred. The crosslinkable polymerizable monomers may be used alone or in combination of two or more thereof.

In the present disclosure, the crosslinkable polymerizable monomer is used in an amount of generally from 0.10 parts by mass to 2.00 parts by mass, preferably from 0.50 parts by mass to 1.50 parts by mass, more preferably from 0.65 parts by mass to 1.00 parts by mass, and particularly preferably from 0.70 parts by mass to 0.90 parts by mass, with respect to 100 parts by mass of the monovinyl monomer. As the content of the crosslinkable polymerizable monomer increases, the weight-average molecular weight of the polymer of the polymerizable monomers is likely to increase, and the softening temperature ($T_{1/2}$) of the toner is likely to increase. Further, as the content of the crosslinkable polymerizable monomer increase, the tan δ at 100° C. and the tan δ at 130° C. are likely to decrease in the temperature-tan δ curve of the toner, and the value of (tan δ (130° C.)−tan δ(100° C.))/30 shown in the formula (I-2) is likely to decrease.

The polymerizable monomer may include a macromonomer in combination with the monovinyl monomer. When the polymerizable monomer includes a macromonomer, the balance between the shelf stability and low-temperature fixability of the toner can be improved.

As the macromonomer, examples include a reactive oligomer or polymer which has a polymerizable carbon-carbon unsaturated double bond at the end of the molecular chain and which has a number average molecular weight of generally from 1,000 to 30,000. As the macromonomer, examples include a styrene macromonomer, a styrene-acrylonitrile macromonomer, a polyacrylic ester macromonomer and a polymethacrylic ester macromonomer. Among them, at least one selected from a polyacrylic ester macromonomer and a polymethacrylic ester macromonomer is preferably used, since it is easy to control the glass transition temperature (Tg) of the toner. As the acrylic ester used in the polyacrylic ester macromonomer, examples include the above-mentioned acrylic esters usable as the monovinyl monomer. As the methacrylic ester used in the polymethacrylic ester macromonomer, examples include the above-mentioned methacrylic esters usable as the monovinyl monomer. As the macromonomer, it is preferable to appropriately select and use such a macromonomer, that when the polymerizable monomer includes the macromonomer, the glass transition temperature (Tg) of the obtained binder resin becomes higher than the case where the polymerizable monomer does not include the macromonomer. This is because the glass transition temperature (Tg) of the toner is likely to fall within the preferable range.

As the macromonomer, a commercially-available product may be used. Examples of the commercially-available product of the macromonomer include macromonomer series AA-6, AS-6, AN-6S, AB-6 and AW-6S manufactured by TOAGOSEI Co., Ltd.

The macromonomers may be used alone or in combination of two or more thereof.

When the polymerizable monomer includes the macromonomer, the content of the macromonomer is appropriately adjusted such that the temperature-tan δ curve of the toner satisfies the formulae (I-1) and (I-2). The content of the macromonomer is not particularly limited. The content of the macromonomer is preferably from 0.03 parts by mass to 5 parts by mass, and more preferably from 0.05 parts by mass to 1 part by mass, with respect to 100 parts by mass of the monovinyl monomer.

The content of the polymerizable monomer is appropriately adjusted such that the temperature-tan δ curve of the toner satisfies the formulae (I-1) and (I-2). The content of the polymerizable monomer is not particularly limited. The total content of the polymerizable monomer is preferably from 60 parts by to 95 parts by mass, more preferably from 65 parts by mass to 90 parts by mass, and still more preferably from 70 parts by mass to 90 parts by mass, with respect to 100 parts by mass of the total solid content contained in the polymerizable monomer composition.

In the present disclosure, a “solid content” means all components other than solvents, and liquid monomers and the like are included in the “solid content”.

As the colorant contained in the toner of the first present disclosure, a colorant that is conventionally used for toners may be appropriately selected. The colorant is not particularly limited. As the colorant, a colorant which is likely to increase the viscosity of the toner can be preferably used. Here, a colorant which is likely to increase the viscosity of the toner is a colorant in which an intermolecular force generated between the colorant and the binder resin contained in the toner and an intermolecular force generated between the colorants are relatively high. A colorant which is likely to increase the viscosity of the toner is typically a colorant capable of forming a hydrogen bond with a binder resin. For example, when the toner contains, as the binder resin, a polymer of polymerizable monomers containing styrene and at least one monovinyl monomer selected from the group consisting of acrylate esters and methacrylate esters, examples of the colorant which is likely to form a hydrogen bond with the binder resin include the following:

a colorant having at least one functional group selected from the group consisting of a hydroxyl group, an aldehyde group, a carbonyl group, a carboxyl group, an ester group, an ether group, an amino group, an amide group and a cyano group. This colorant is likely to form a hydrogen bond with a monomer unit derived from the acrylate ester or the methacrylate ester of the polymer contained in the binder resin in the toner. The colorant having the above-mentioned functional group is likely to increase the viscosity of the toner as the amount of the functional group contained in one molecule increases.

Further, as the particle diameter of the colorant contained in the toner decreases, the intermolecular force generated between the colorant and the binder resin and the intermolecular force generated between the colorants increase. Accordingly, the viscosity of the toner is likely to increase.

By using such a colorant which is likely to increase the viscosity of the toner, the softening temperature ($T_{1/2}$) of the toner is likely to fall within the preferable range. In addition, by using such a colorant which is likely to increase the viscosity of the toner, since the reaction rate of the polymerizable monomer increases in the polymerization step described later, the weight-average molecular weight of the polymer of the polymerizable monomer increases. Accordingly, the softening temperature ($T_{1/2}$) of the toner is likely to fall within the above preferable range.

Further, by using such a colorant which is likely to increase the viscosity of the toner, the value of (tan δ (130° C.)−tan δ(100° C.))/30 shown in the formula (I-2) is likely to be small in the temperature-tan δ curve of the toner.

For example, when a mixture consisting of a colorant, a polymerizable monomer and a molecular weight modifier, which are the same type and the same content ratio as those in the polymerizable monomer composition used for producing the toner, has a viscosity of from 200 mPa to 1500 mPa, the colorant contained in the mixture is preferred as the above-mentioned colorant which is likely to increase the viscosity of the toner. The viscosity of the mixture is more preferably from 240 mPa to 1000 mPa.

In the toner of the first present disclosure, it is preferable to select the type and content of the colorant and the type and content of the polymerizable monomer such that the viscosity of the mixture falls within the above range. When the viscosity of the mixture is within the above range, the temperature-tan δ curve of the toner is likely to satisfy the formulae (I-1) and (I-2), and the softening temperature ($T_{1/2}$) of the toner is likely to fall within the above preferable range. Accordingly, the low-temperature fixability and shelf stability of the toner are likely to be well balanced.

For example, the viscosity of the mixture can be set within the above range by using the above-mentioned colorant which is likely to increase the viscosity of the toner, and as the polymerizable monomer, polymerizable monomers containing styrene, and at least one monovinyl monomer selected from the group consisting of acrylic esters and methacrylic esters in combination. Further, as the particle diameter of the colorant decreases, the viscosity of the mixture is likely to become higher.

As the colorant contained in the toner of the first present disclosure, a colorant conventionally used in toners can be appropriately selected and used. The colorant is not particularly limited. When producing a color toner, a black colorant, a cyan colorant, a yellow colorant or a magenta colorant can be used.

Examples of the black colorant include carbon black, titanium black and magnetic powder such as zinc-iron oxide and nickel-iron oxide.

Examples of the cyan colorant include cyan pigments such as phthalocyanine pigments (e.g., copper phthalocyanine pigments and derivatives thereof) and anthraquinone pigments, and cyan dyes. The specific examples include C.I. Pigment Blue 2, 3, 6, 15, 15:1, 15:2, 15:3, 15:4, 16, 17:1, 60; and C.I. Solvent Blue 70.

Examples of the yellow colorant include azo-based pigments (e.g., monoazo pigments and disazo pigments), condensed polycyclic pigments, and yellow dyes. The specific examples include C.I. Pigment Yellow 3, 12, 13, 14, 15, 17, 62, 65, 73, 74, 83, 93, 97, 120, 138, 155, 180, 181, 185, 186, 213 and 214; and C.I. Solvent Yellow 98 and 162.

Examples of the magenta colorant include magenta pigments such as azo-based pigments (e.g., monoazo pigments and disazo pigments) and condensed polycyclic pigments (e.g., quinacridone pigments), and magenta dyes. The specific examples include C.I. Pigment Red 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, 237, 238, 251, 254, 255 and 269; C.I. Pigment Violet 19; C.I. Solvent Red 1, 3, 8, 23, 24, 25, 27, 30, 49, 81, 82, 83, 84, 100, 109, 121; C.I. Disperse Red 9; C.I. Solvent Violet 8, 13, 14, 21, 27; C.I. Disperse Violet 1; C.I. Basic Red 1, 2, 9, 12, 13, 14, 15, 17, 18, 22, 23, 24, 27, 29, 32, 34, 35, 36, 37, 38, 39, 40; and C.I. Basic Violet 1, 3, 7, 10, 14, 15, 21, 25, 26, 27, 28.

The colorants may be used alone or in combination of two or more thereof.

From the viewpoint that the temperature-tan δ curve of the toner is likely to satisfy the formulae (I-1) and (I-2), and that the softening temperature ($T_{1/2}$) is likely to fall within the preferable range, as the colorant contained in the toner of the first present disclosure, a yellow colorant composed of one or more yellow pigments is preferably used. More preferably, a yellow colorant composed of one or more yellow pigments containing no chlorine atom is used since it is likely to increase the viscosity of the toner as described above. Still more preferably, a yellow colorant composed of one or more azo-based yellow pigments containing no chlorine atom is used. Even more preferably, a yellow colorant composed of one or more disazo-based yellow pigments containing no chlorine atom is used. Specifically, for example, at least one selected from C.I. Pigment Yellow 155 and C.I. Pigment Yellow 93 is preferred, and C.I. Pigment Yellow 155 is more preferred.

The content of the colorant is generally from 1 part by mass to 20 parts by mass, more preferably from 5 parts by mass to 15 parts by mass, and still preferably from 7 parts by mass to 13 parts by mass, with respect to 100 parts by mass of the polymerizable monomer. When the content of the colorant is within the above range, the temperature-tan δ curve of the toner is likely to satisfy the formulae (I-1) and (I-2), and the softening temperature ($T_{1/2}$) of the toner is likely to fall within the preferable range.

The polymerizable monomer composition contains a softening agent. When the toner contains a softening agent, the releasability of the toner from the fixing roll at the time of toner fixing can be improved. The softening agent is not particularly limited as long as it is one that is generally used as a softening agent or a releasing agent for toners. As the softening agent, examples include low-molecular-weight polyolefin waxes and modified waxes thereof; petroleum waxes such as paraffin; mineral waxes such as ozokerite; synthetic waxes such as Fischer-Tropsch wax; and ester waxes such as dipentaerythritol ester and carnauba. Among them, from the viewpoint of improving the balance between the shelf stability and low-temperature fixability of the toner by adjusting the viscoelasticity of the toner, ester waxes are preferred, synthetic ester waxes obtained by esterifying an alcohol and a carboxylic acid are more preferred, and polyfunctional ester waxes obtained by esterifying a polyhydric alcohol and a monocarboxylic acid are still more preferred.

For example, as the polyfunctional ester wax, at least one selected from the group consisting of pentaerythritol ester compounds, glycerin ester compounds and dipentaerythritol ester compounds is preferably used. As such a preferable polyfunctional ester wax, examples include, but are not limited to, pentaerythritol ester compounds such as pentaerythritol tetrapalmitate, pentaerythritol tetrabehenate and pentaerythritol tetrastearate; glycerin ester compounds such as hexaglycerin tetrabehenate tetrapalmitate, hexaglycerin octabehenate, pentaglycerin heptabehenate, tetraglycerin hexabehenate, triglycerin pentabehenate, diglycerin tetrabehenate and glycerin tribehenate; and dipentaerythritol ester compounds such as dipentaerythritol hexamyristate and dipentaerythritol hexapalmitate.

The weight average molecular weight Mw of the softening agent is not particularly limited. It is preferably within a range of from 400 to 3500, and more preferably from 500 to 3000. As the weight average molecular weight Mw of the softening agent increases, the softening temperature ($T_{1/2}$) of the toner is likely to increase.

The weight average molecular weight Mw of the softening agent can be measured by the same method as the method for measuring the weight average molecular weight Mw of the polymer described later. In the case of the ester wax, it is also possible to calculate the weight average molecular weight Mw by the following procedure. First, the ester wax is extracted with a solvent; the ester wax is decomposed into an alcohol and a carboxylic acid by hydrolysis; and by carrying out a composition analysis, the molecular weight of the ester wax can be calculated from the structural formula. The weight average molecular weight Mw of the ester wax has the same result as the molecular weight calculated from the structural formula.

From the viewpoint of improving the balance between the shelf stability and low-temperature fixability of the toner by adjusting the viscoelasticity of the toner, the melting point of the softening agent is preferably within the range of from 50° C. to 90° C., more preferably within the range of from 60° C. to 85° C., and still more preferably within the range of from 70° C. to 80° C.

The content of the softening agent is not particularly limited. From the viewpoint of improving the balance between the shelf stability and low-temperature fixability of the toner by adjusting the viscoelasticity of the toner, the content of the softening agent is preferably from 1 part by mass to 30 parts by mass, and more preferably from 5 parts by mass to 20 parts by mass, with respect to 100 parts by mass of the monovinyl monomer.

The softening agents may be used alone or in combination of two or more thereof.

The polymerizable monomer composition contains a positively- or negatively-chargeable charge control agent to improve chargeability of the toner.

The charge control agent is not particularly limited as long as it is one that is generally used as a charge control agent for toners. Among charge control agents, a positively- or negatively-chargeable charge control resin is preferred because it has high compatibility with a polymerizable monomer and can impart stable chargeability (charge stability) to toner particles. A positively chargeable charge control resin is more preferably used from the viewpoint of obtaining a positively chargeable toner.

As the positively- or negatively-chargeable charge control resin, a functional group-containing copolymer can be used. As the positively-chargeable charge control resin, for example, a functional group-containing copolymer that contains a constitutional unit containing a functional group such as an amino group, a quaternary ammonium group or a quaternary ammonium salt-containing group, can be used. Examples of the functional group-containing copolymer include a polyamine resin, a quaternary ammonium group-containing copolymer and a quaternary ammonium salt-containing copolymer. As the negatively-chargeable charge control resin, for example, a functional group-containing copolymer that contains a constitutional unit containing a functional group such as a sulfonic acid group, a sulfonate-containing group, a carboxylic acid group or a carboxylic acid salt-containing group, can be used. Examples of the functional group-containing copolymer include a sulfonic acid group-containing copolymer, a sulfonate-containing copolymer, a carboxylic acid group-containing copolymer, and a carboxylic acid salt-containing copolymer.

From the viewpoint that the temperature-tan δ curve of the toner is likely to satisfy the formulae (I-1) and (I-2), in the functional group-containing copolymer that is used as a positively- or negatively-chargeable charge control resin, the content ratio of the functional group-containing constitutional unit is preferably 10% by mass or less, and more preferably 9% by mass or less. On the other hand, from the viewpoint of improving the charge stability and shelf stability of the toner, the content ratio of the functional group-containing constitutional unit in the functional group-containing copolymer is preferably 0.5% by mass or more. It is presumed that, when the charge control resin sufficiently contains the functional group, the charge control resin is likely to be localized near the surface of each colorant resin particle, and the charge control resin functions like a shell of each colored resin particle, thereby improving the shelf stability of the toner.

As the functional group-containing copolymer that is used as a positively- or negatively-chargeable charge control resin, a styrene-acrylic resin is preferably used, since it has high compatibility with a polymerizable monomer and the temperature-tan δ curve of the toner is likely to satisfy the formulae (I-1) and (I-2).

The glass transition temperature (Tg) of the functional group-containing copolymer used as the positively- or negatively-chargeable charge control resin, is preferably within a range of from 50° C. to 110° C., and more preferably within a range of from 60° C. to 100° C. When the glass transition temperature (Tg) of the functional group-containing copolymer is within the above range, the temperature-tan δ curve of the toner is likely to satisfy the formulae (I-1) and (I-2), and the shelf stability of the toner can be improved. it is presumed that, since the functional group-containing copolymer is likely to be localized near the surface of each colorant resin particle, and it functions like a shell of each colored resin particle, when the Tg of the functional group-containing copolymer is within the above range, the shelf stability of the toner is improved due to the sufficiently high Tg.

The glass transition temperature (Tg) of the functional group-containing copolymer is measured by the same method as that of the glass transition temperature (Tg) of the toner described above.

The weight average molecular weight Mw of the functional group-containing copolymer that is used as a positively- or negatively-chargeable charge control resin, is preferably within a range of from 5000 to 30000, and more preferably within a range of from 10000 to 25000.

As the positively-chargeable charge control agent other than the positively-chargeable charge control resin, examples include a nigrosine dye, a quaternary ammonium salt, a triaminotriphenylmethane compound and an imidazole compound.

As the negatively-chargeable charge control agent other than the negatively-chargeable charge control resin, examples include an azo dye containing a metal such as Cr, Co, Al or Fe, a salicylic acid metal compound and an alkyl salicylic acid metal compound.

The charge control agents may be used alone or in combination of two or more thereof.

In the present disclosure, the charge control agent is used in an amount of generally from 0.01 parts by mass to 10 parts by mass, and preferably from 0.03 parts by mass to 8 parts by mass, with respect to 100 parts by mass of the monovinyl monomer. When the content of the charge control agent is 0.01 parts by mass or more, the occurrence of fog can be suppressed. When the content of the charge control agent is 10 parts by mass or less, printing stains can be suppressed.

It is preferable that the polymerizable monomer composition further contains a molecular weight modifier.

The molecular weight modifier is not particularly limited, as long as it is one that is generally used as a molecular weight modifier for toners. As the molecular weight modifier, examples include, but are not limited to, mercaptan δ such as t-dodecyl mercaptan, n-dodecyl mercaptan, n-octyl mercaptan and 2,2,4,6,6-pentamethylheptane-4-thiol; and thiuram disulfides such as tetramethyl thiuram disulfide, tetraethyl thiuram disulfide, tetrabutyl thiuram disulfide, N,N'-dimethyl-N,N'-diphenyl thiuram disulfide and N,N'-dioctadecyl-N,N'-diisopropyl thiuram disulfide.

The molecular weight modifiers may be used alone or in combination of two or more thereof.

In the toner of the first present disclosure, from the viewpoint that the temperature-tan δ curve of the toner is likely to satisfy the formulae (I-1) and (I-2), and that the softening temperature ($T_{1/2}$) is likely to fall within the preferable range, it is preferable that the content of the molecular weight modifier is adjusted such that the weight-average molecular weight Mw of the polymer contained in the binder resin becomes the preferable range described later. The molecular weight modifier is used in an amount of preferably from 1.0 part by mass to 3.0 parts by mass, more preferably from 1.1 parts by mass to 2.0 parts by mass, with respect to 100 parts by mass of the monovinyl monomer. As the content of the molecular weight modifier increases, the weight-average molecular weight of the polymer contained in the binder resin is likely to decrease, and the softening temperature ($T_{1/2}$) of the toner is likely to decrease. As the content of the molecular weight modifier increases, the value of (tan δ(Tg)−tan δ(45° C.))/(Tg−45) shown in the formula (I-1) and the value of (tan δ(130° C.)−tan δ(100° C.))/30 shown in the formula (I-2) are likely to increase in the temperature-tan δ curve of the toner. Further, as the content of the molecular weight modifier increases, the glass transition temperature (Tg) of the toner is likely to decrease, and the tan δ at Tg, the tan δ at 100° C. and the tan δ at 130° C. are likely to increase.

(A-2) Suspension Step (Droplet Forming Step) to Obtain a Suspension

Then, the polymerizable monomer composition is dispersed in an aqueous medium containing a dispersion stabilizer, and after adding a polymerization initiator, droplet formation of the polymerizable monomer composition is performed. The polymerization initiator may be added before the droplet formation after the polymerizable monomer composition is dispersed in an aqueous medium, as described above. However, the polymerization initiator may be added to the polymerizable monomer composition before being dispersed in an aqueous medium.

The method of forming the droplets is not particularly limited. For example, the method is performed using a device capable of strong agitation, such as an (in-line type) emulsifying and dispersing machine (product name: MILDER, manufactured by Pacific Machinery & Engineering Co., Ltd.) or a high-speed emulsifying and dispersing machine (product name: T. K. HOMOMIXER MARK II type, manufactured by PRIMIX Corporation).

Examples of the polymerization initiator include, but are not limited to, persulfates such as potassium persulfate and ammonium persulfate; azo compounds such as 4,4'-azobis (4-cyanovaleric acid), 2,2'-azobis(2-methyl-N-(2-hydroxyethyl)propionamide), 2,2'-azobis(2-amidinopropane)dihydrochloride, 2,2'-azobis(2,4-dimethylvaleronitrile) and 2,2'-azobisisobutyronitrile; and organic peroxides such as di-t-butylperoxide, benzoylperoxide, t-butylperoxy-2-ethylhexanoate, t-butylperoxy-2-ethylbutanoate, t-hexylperoxy-2-ethylbutanoate, diisopropylperoxydicarbonate, di-t-butylperoxyisophthalate and t-butylperoxyisobutyrate.

Among these, an organic peroxide is preferably used because the residual polymerizable monomer can be reduced and the printing durability of the toner becomes excellent. From the view point that the initiator efficiency is high and the residual polymerizable monomer can be reduced, among the organic peroxides, peroxy esters are preferred, and non-aromatic peroxy esters, that is, peroxy esters having no aromatic ring, are more preferred.

The polymerization initiators may be used alone or in combination of two or more thereof.

The amount of the polymerization initiator to be added, which is used in the polymerization reaction of the polymerizable monomer composition, is preferably from 0.1 parts by mass to 20 parts by mass, more preferably from 0.3 parts by mass to 15 parts by mass, and particularly preferably from 1 part by mass to 10 parts by mass, with respect to 100 parts by mass of the monovinyl monomer.

In the present disclosure, an aqueous medium is a medium containing water as a main component.

In the present disclosure, it is preferable that a dispersion stabilizer is contained in the aqueous medium. As the dispersion stabilizer, examples include the following inorganic and organic compounds: inorganic compounds including sulfates such as barium sulfate and calcium sulfate, carbonates such as barium carbonate, calcium carbonate and magnesium carbonate, phosphates such as calcium phosphate, metal oxides such as aluminum oxide and titanium oxide, and metal hydroxides such as aluminum hydroxide, magnesium hydroxide and iron(II) hydroxide, and organic compounds including water-soluble polymers such as polyvinyl alcohol, methyl cellulose and gelatin; anionic surfactants, nonionic surfactants, and ampholytic surfactants. The dispersion stabilizers may be used alone or in combination of two or more thereof.

Among the dispersion stabilizers, the inorganic compounds are preferred. As the aqueous solvent containing the dispersion stabilizer, a colloid of a hardly water-soluble metal hydroxide is particularly preferred. The use of the inorganic compounds, particularly the use of the colloid of the hardly water-soluble metal hydroxide, can narrow the particle size distribution of the colored resin particles and can reduce the amount of the dispersion stabilizer remaining after washing. Accordingly, the polymerized toner thus obtained becomes capable of reproducing clear images and inhibiting a deterioration in environmental stability.

(A-3) Polymerization Step

After the droplet formation of the polymerizable monomer composition as described above (A-2), the polymerizable monomer composition is subjected to a polymerization reaction in the presence of a polymerization initiator to form colored resin particles. In other words, an aqueous dispersion medium in which droplets of the polymerizable monomer composition are dispersed is heated, and polymerization is initiated to form an aqueous dispersion of colored resin particles.

The condition of the heating is preferably adjusted such that the weight average molecular weight Mw of the polymer of the polymerizable monomer falls within the preferable range described later. The condition of the heating is not particularly limited. The heating temperature is preferably 50° C. or higher, and more preferably from 60° C. to 95° C. The heating time is preferably from 1 hour to 20 hours, and more preferably from 2 hours to 15 hours.

The colorant resin particles may be used as they are as a toner, or the colorant resin particles on which an external additive is added may be used as a toner. It is preferable to use the above-mentioned colored resin particles as a core layer of colored resin particles of a so-called core-shell type (or also referred to as "capsule type"). The core-shell type colored resin particles have a structure in which the outside of the core layer is coated with a shell layer formed of a material different from the core layer. By coating the core layer made of a material having a low softening point with a material having a softening point higher than that, the formulae (I-1) and (I-2) are likely to be satisfied in the temperature-tan δ curve of the toner, and the low-temperature fixability and shelf stability of the toner can be improved in a well-balanced manner.

The method for producing the above-mentioned core-shell type colored resin particles by using the above-mentioned colored resin particles which are obtained by the polymerization of the droplets of the polymerizable monomer composition and which serve as the core layer, is not particularly limited. The core-shell type colored resin particles can be produced by any conventional method. The in situ polymerization method and the phase separation method are preferable from the viewpoint of production efficiency.

A method for producing colored resin particles of a core-shell type by a in situ polymerization method will be described below.

A polymerizable monomer for forming a shell layer (polymerizable monomer for shell) and a polymerization initiator are added into an aqueous medium in which colorant resin particles are dispersed, and the mixture is polymerized, whereby colored resin particles of a core-shell type can be obtained.

As the polymerizable monomer for shell, those same as the above-mentioned polymerizable monomer can be used. Among them, it is preferable to use a monomer that can be a polymer having a Tg of more than 80° C., such as styrene, acrylonitrile and methyl methacrylate, alone or in combination of two or more thereof.

As the polymerization initiator used for the polymerization of the polymerizable monomer for shell, examples include, but are not limited to, water-soluble polymerization initiators including metal persulfates such as potassium persulfate and ammonium persulfate, and azo-type initiators such as 2,2'-azobis(2-methyl-N-(2-hydroxyethyl)propionamide) and 2,2'-azobis(2-methyl-N-(1,1-bis(hydroxymethyl)-2-hydroxyethyl)propionamide). The polymerization initiators may be used alone or in combination of two or more thereof. The content of the polymerization initiator is preferably from 0.1 parts by mass to 30 parts by mass, and more preferably from 1 part by mass to 20 parts by mass, with respect to 100 parts by mass of the polymerizable monomer for shell.

The polymerization temperature of the shell layer is preferably 50° C. or higher, and more preferably from 60° C. to 95° C. The polymerization reaction time is preferably from 1 hour to 20 hours, and more preferably from 2 hours to 15 hours.

(A-4) Washing, Filtrating, Dehydrating and Drying Step

It is preferable that, after completion of the polymerization, to the aqueous dispersion of the colored resin particles obtained by the polymerization, the operation of filtration, washing for removing the dispersion stabilizer, dehydrate and drying is repeated several times as necessary according to a conventional method.

As a method of the washing, when an inorganic compound is used as the dispersion stabilizing agent, it is preferable to dissolve and remove the dispersion stabilizing agent in water by addition of an acid or an alkali to an aqueous dispersion of the colored resin particles. When a colloid of a hardly water-soluble inorganic hydroxide is used as the dispersion stabilizer, it is preferable to add an acid to adjust the pH of the colored resin particle aqueous dispersion to 6.5 or less. As the acid to be added, inorganic acids such as sulfuric acid, hydrochloric acid and nitric acid, and organic acids such as formic acid and acetic acid can be used, and sulfuric acid is particularly preferred because of the high removal efficiency and small burden on the production facilities.

The dehydrating and filtering may be carried out by any of various known methods. The method of the dehydrating and filtering is not particularly limited. For example, a centrifugal filtration method, a vacuum filtration method and a pressure filtration method may be used. The drying may be carried out by any of various methods. The method of the drying is not particularly limited.

(B) Pulverization Method

In the case of producing the colored resin particles by employing the pulverization method, the production is carried out by the following steps, for example.

First, a binder resin, a colorant, a softening agent, a charge control agent, and other additives which are added as needed are mixed by means of a mixer such as a ball mill, a V type mixer, FM MIXER (product name), a high-speed dissolver, an internal mixer or a fallberg. Next, the thus-obtained mixture is kneaded while heating by means of a press kneader, a twin screw kneading machine, a roller or the like. The thus-obtained kneaded product is coarsely pulverized by means of a pulverizer such as a hammer mill, a cutter mill or a roller mill. The coarsely pulverized product is finely pulverized by means of a pulverizer such as a jet mill or a high-speed rotary pulverizer. Then, the finely pulverized product is classified into desired particle diameters by means of a classifier such as an air classifier or an airflow classifier, thereby obtaining the colored resin particles produced by the pulverization method.

As the binder resin, the colorant, the softening agent and the charge control agent used in the pulverization method, those mentioned above in "(A) Suspension Polymerization Method" can be used. The colored resin particles obtained by the pulverization method can also be used to produce core-shell type colored resin particles by using an in situ polymerization method or the like, in the same way as the colored resin particles obtained by the above-mentioned "(A) Suspension Polymerization Method".

As the binder resin, in addition to the binder resin described above, resins which have been widely used for toners conventionally can be used. Examples of the binder resin used in the pulverization method include polystyrene, a styrene-butyl acrylate copolymer, a polyester-based resin, and an epoxy-based resin.

I-3. Colored Resin Particles

The colored resin particles are obtained by the production method such as the above-mentioned "(A) Suspension polymerization Method" or "(B) Pulverization Method".

Hereinafter, the colored resin particles contained in the toner of the first present disclosure will be described. The colored resin particles described below include both core-shell type colored resin particles and colored resin particles which are not core-shell type.

The colored resin particles used in the toner of the first present disclosure contain the binder resin, the colorant, the softening agent and the charge control agent, and may further contain other additives if necessary.

Examples of the binder resin contained in the colored resin particles include the polymer obtained by polymerizing the polymerizable monomer mentioned above in the "(A) Suspension Polymerization Method". In the present disclosure, a polymer may be either a homopolymer or a copolymer. Preferable polymerizable monomers which derive the constitutional units of the polymer are the same as the preferred polymerizable monomers described above in the "(A) Suspension Polymerization Method". From the viewpoint that the temperature-tan δ curve of the toner is likely to satisfy the formulae (I-1) and (I-2), that the softening temperature ($T_{1/2}$) is likely to fall within the preferable range, and that the low-temperature fixability and shelf stability of the toner can be improved in a well-balanced manner, it is preferable that the binder resin, which is contained in the colored resin particles, contains a polymer of one or two or more kinds of polymerizable monomers containing at least one kind of monovinyl monomer selected from the group consisting of styrene, acrylic esters and methacrylic esters. It is more preferable that the binder resin contains a polymer of one or two or more kinds of polymerizable monomers containing styrene and at least one selected from the group consisting of acrylic esters and methacrylic esters. It is still more preferable that the binder resin contains a polymer of one or two or more kinds of polymerizable monomers containing styrene, at least one selected from the group consisting of acrylic esters and methacrylic esters, and at least one selected from the group consisting of divinylbenzene, divinylnaphthalene and derivatives thereof.

The structure of each constitutional unit and the amount of each constitutional unit in all the constitutional units of the polymer can be determined from the charge amount thereof at the time of synthesizing the polymer, or can be calculated from integrated values obtained by $^{1}$H-NMR measurement.

The weight average molecular weight Mw of the polymer contained in the binder resin is preferably $1.00\times10^{5}$ or more and $1.00\times10^{6}$ or less, from the viewpoint that the temperature-tan δ curve of the toner is likely to satisfy the formulae (I-1) and (I-2), that the softening temperature ($T_{1/2}$) is likely to fall within the preferable range, and that the low-temperature fixability and shelf stability of the toner are improved in a well-balanced manner. Moreover, from the viewpoint of improving the shelf stability of the toner, the lower limit of the weight average molecular weight Mw is more preferably $2.00\times10^{5}$ or more, still more preferably $3.00\times10^{5}$ or more, and even more preferably $3.1\times10^{5}$ or more. On the other hand, from the viewpoint of improving the low-temperature fixability of the toner, the upper limit of the weight average molecular weight Mw is more preferably $7.00\times10^{5}$ or less, still more preferably $5.50\times10^{5}$ or less, and even more preferably $5.00\times10^{5}$ or less. The polymer contained in the binder resin is typically a polymer of the above-mentioned polymerizable monomer.

As the weight-average molecular weight Mw of the polymer decreases, the Tg of the toner is likely to decrease and the tan δ(Tg) is likely to increase. Accordingly, the value of tan δ(Tg)−tan δ(45° C.))/(Tg−45) shown in the formula (I-1) is likely to increase. Further, as the weight average molecular weight Mw of the polymer decreases, both the tan δ(100° C.) and tan δ(130° C.) of the toner are likely to increase. However, the value of (tan δ(130° C.)−tan δ(100° C.))/30 shown in the formula (I-2) is likely to increase, since the increase width is likely to be larger in tan δ(130° C.). Moreover, as the weight-average molecular weight Mw of the polymer increases, the softening temperature ($T_{1/2}$) of the toner is likely to increase. Further, when the weight average molecular weight Mw of the polymer is equal to or lower than the above upper limit value, deterioration in shelf stability of the toner is likely to be suppressed.

In the present disclosure, the weight average molecular weight Mw of the polymer can be determined as a polystyrene equivalent molecular weight measured by GPC. As a sample for GPC measurement, a sample obtained by dissolving a polymer to be measured in tetrahydrofuran (THF) is generally used. When the weight average molecular weight Mw of the polymer contained in the binder resin in the toner is measured, a sample in which the toner is dissolved in tetrahydro tetrahydrofuran (THF) is used for GPC measurement, and from the measurement result of the GPC measurement, the weight average molecular weight Mw of the polymer contained as the binder resin can be determined using data obtained by subtracting a peak previously measured for a polymer other than the polymer contained as the binder resin, that is, a charge control resin, a softening agent, and the like.

The binder resin contained in the colored resin particles is typically a polymer of the polymerizable monomer. A small amount of a polyester-based resin, an epoxy-based resin, or the like, which are conventionally widely used as a binder resin in toners, or an unreacted polymerizable monomer may be contained within a range in which the temperature-tan δ curve of the toner satisfies the formulae (I-1) and (I-2). The content of the polyester-based resin contained in 100 parts by mass of the binder resin is preferably 5 parts by mass or less, more preferably 1 part by mass or less, and still more preferably 0.1 parts by mass or less. It is particularly preferable that the binder resin does not contain a polyester-based resin. When the content of the polyester-based resin is equal to or lower than the above upper limit value, the environmental stability of the toner can be improved, and in particular, the change in the charging of the toner due to the change in humidity can be suppressed.

In addition, when the binder resin contains a resin other than the polymer of the polymerizable monomer, the content of the polymer of the polymerizable monomer in 100 parts by mass of the binder resin is preferably 95 parts by mass or more, more preferably 97 parts by mass or more, and still more preferably 99 parts by mass or more, from the viewpoint that the temperature-tan δ curve of the toner is likely to satisfy the formulae (I-1) and (I-2).

In the present disclosure, a molecular weight modifier used in the polymerization reaction is included in the binder resin.

From the viewpoint that the temperature-tan δ curve of the toner is likely to satisfy the formulae (I-1) and (I-2), the total content of the binder resin is preferably from 60 parts by mass to 95 parts by mass, more preferably from 65 parts by mass to 90 parts by mass, and still more preferably from 70 parts by mass to 85 parts by mass, with respect to 100 parts by mass of the total solid content contained in the colored resin particles.

In the total amount of 100% by mass of the binder resin, the content ratio of the constitutional unit derived from styrene is preferably from 60% by mass to 90% by mass, more preferably from 65% by mass to 85% by mass, and still more preferably from 70% by mass to 80% by mass.

In the total amount of 100% by mass of the binder resin, the content ratio of the constitutional unit derived from the crosslinkable polymerizable monomer is preferably from 0.10% by mass to 2.00% by mass, more preferably from 0.50% by mass to 1.50% by mass, and still more preferably from 0.65% by mass to 1.00% by mass.

The colorant, the softening agent and the charge control agent contained in the colored resin particles are the same as those described above in "(A) Suspension Polymerization Method".

The content of the colorant contained in the colored resin particles is appropriately adjusted according to the type of the colorant such that the desired color development is obtained and the temperature-tan δ curve of the toner satisfies the formulae (I-1) and (I-2). The content of the colorant is not particularly limited. The content of the colorant is preferably from 1 part by mass to 20 parts by mass, more preferably from 5 parts by mass to 15 parts by mass, and still more preferably from 7 parts by mass to 13 parts by mass, with respect to 100 parts by mass of the binder resin.

The content of the softening agent contained in the colored resin particles is preferably from 1 part by mass to 30 parts by mass, and more preferably from 5 parts by mass to 20 parts by mass, with respect to 100 parts by mass of the binder resin, from the viewpoint of improving the balance between the shelf stability and low-temperature fixability of the toner.

The content of the charge control agent contained in the colored resin particles is preferably from 0.01 parts by mass to 15 parts by mass, and more preferably from 0.03 parts by mass to 8 parts by mass, with respect to 100 parts by mass of the binder resin. When the content of the charge control agent is equal to or more than the lower limit value, the occurrence of fog can be suppressed. When the content is equal to or less than the upper limit value, printing stains can be suppressed.

The volume average particle diameter (Dv) of the colored resin particles is preferably from 3 μm to 15 μm, and more preferably from 4 μm to 12 μm. When the Dv is 3 μm or more, the flowability of the toner can be improved, and a deterioration of the transfer property of the toner and a decrease in image density can be suppressed. When the Dv is 15 μm or less, a decrease in resolution of an image can be suppressed.

The colored resin particles preferably have a ratio (Dv/Dn) of the volume average particle diameter (Dv) to the number average particle diameter (Dn) of from 1.0 to 1.3, more from preferably from 1.0 to 1.2. When the Dv/Dn is 1.3 or less, it is possible to suppress a deterioration of the transfer property of the toner and a decrease in image density and image resolution. The volume average particle diameter and number average particle diameter of the colored resin particles can be measured using a particle size analyzer (product name: MULTISIZER; manufactured by Beckman Coulter, Inc.) or the like.

The average circularity of the colored resin particles is preferably from 0.96 to 1.00, more preferably from 0.97 to 1.00, and still more preferably from 0.98 to 1.00 from the viewpoint of image reproducibility.

When the average circularity of the colored resin particles is 0.96 or more, fine line reproducibility of printing can be improved. The average circularity of the colored resin particles of the present disclosure is 1 or less. When the measurement sample of the colored resin particles is perfectly spherical, the average circularity is 1.

In the present disclosure, the "circularity" is defined as a value obtained by dividing the perimeter of the circle having the same area as the projected area of the particle image by the perimeter of the projected image of the particle. The average circularity is an indicator that shows the degree of the surface roughness of the colored resin particles, and it can be used as a simple method for quantitatively representing the shape of the particles. The average circularity becomes smaller, as the surface shape of the measurement sample becomes more complex.

For example, the circularity of the colored resin particles can be determined as follows. An aqueous solution in which the colored resin particles are dispersed, is used as a sample solution, and the projected image of the colored resin particles in the sample solution is taken by means of a flow type particle image analyzer (e.g., product name: FPIA-2100, manufactured by: Sysmex Corporation). The perimeter of the circle having the same area as the projected area of the particle image, and the perimeter of the projected particle image are measured from the projected image, and the circularity of the colored resin particles is obtained by the following calculation formula 1: (Circularity)=(Perimeter of the circle having the same area as the projected area of the particle image)/(Perimeter of the projected particle image). The average circularity is the average value of the circularities of each of the colored resin particles contained in the sample solution.

I-4. Toner of the First Present Disclosure

In the first present disclosure, the colorant resin particles may be used as they are as a toner. However, from the viewpoint of adjusting the chargeability, flowability, shelf stability, and the like of the toner, the colored resin particles may be mixed and stirred together with an external additive to perform an external addition treatment, whereby an external additive is added on the surface of each colored resin particle, thereby obtaining a one-component toner.

The one-component toner may be further mixed and stirred together with carrier particles, thereby obtaining a two-component developer.

The mixer for performing the external addition treatment is not particularly limited as long as it is a mixer capable of adding an external additive on the surface of each colored resin particle. For example, a mixer capable of mixing and stirring such as FM MIXER (: product name, manufactured by NIPPON COKE & ENGINEERING CO., LTD.), SUPER MIXER (: product name, manufactured by KAWATA Manufacturing Co., Ltd.), Q MIXER (: product name, manufactured by NIPPON COKE & ENGINEERING CO., LTD.), MECHANOFUSION SYSTEM (: product name, manufactured by Hosokawa Micron Corporation), MECHANO- MILL (: product name, manufactured by Okada Seiko Co., Ltd.), or the like can be used for performing the external addition treatment.

As the external additive, examples include, but are not limited to, inorganic fine particles such as fine particles of silica, titanium oxide, aluminum oxide, zinc oxide, tin oxide, calcium carbonate, calcium phosphate and cerium oxide; and organic fine particles such as fine particles of polymethyl methacrylate resin, silicone resin and melamine resin. Among them, the inorganic fine particles are preferred. Among the inorganic fine particles, fine particles of at least one selected from silica and titanium oxide are preferred, and fine particles of silica are particularly preferred.

The external additives may be used alone. It is preferable to use them in combination of two or more thereof.

In the first present disclosure, the content of the external additive is generally from 0.05 parts by mass to 6 parts by mass, and preferably from 0.2 parts by mass to 5 parts by mass, with respect to 100 parts by mass of the colored resin particles. When the content of the external additive is 0.05 parts by mass or more, the generation of a transfer residue can be suppressed. When the content of the external additive is 6 parts by mass or less, the occurrence of fog can be suppressed.

The toner of the first present disclosure is a toner which has good shelf stability and in which a decrease in the blocking occurrence temperature (heat-resistant temperature) is suppressed, since the temperature-tan δ curve of the toner satisfies the formulae (I-1) and (I-2). The blocking occurrence temperature (heat-resistant temperature) of the toner of the first present disclosure is preferably 53° C. or higher, more preferably 54° C. or higher, and still more preferably 55° C. or higher. In the present disclosure, the blocking occurrence temperature of the toner is defined as the maximum temperature at which, when the toner is stored at a constant temperature for 8 hours, the mass of the toner to be aggregated is 5% by mass or less of the total amount of the toner. The blocking occurrence temperature of the toner can be measured by the same method as the measurement of the heat-resistant temperature of the toner, which is described below in "Examples".

The toner of the first present disclosure is a toner which has good low-temperature fixability and in which an increase in the fixing temperature is suppressed, since the temperature-tan δ curve of the toner satisfies the formulae (I-1) and (I-2). The fixing temperature of the toner of the first present disclosure is preferably 180° C. or lower, more preferably 170° C. or lower, and still more preferably 160° C. or lower. In the present disclosure, the fixing temperature of the toner is defined as the minimum temperature at which, when a solid image is printed on a sheet using a printer and a rubbing test is carried out on the solid area, a fixing rate of 80% or more is obtained from the following formula as the ratio of the image density after the rubbing test (ID (after)) to the image density before the rubbing test (ID (before)):

$$\text{Fixing rate }(\%)=[\text{ID(after)}/\text{ID(before)}]\times 100$$

The rubbing test is carried out by attaching the measurement area to a fastness tester with an adhesive tape, applying a 500 g load, and carrying out reciprocating rubbing 5 times with a rubbing terminal wrapped with a cotton cloth.

In the present disclosure, the solid area is an area in which the developer is controlled to adhere to all dots within the area, which are virtual dots for controlling the printer control unit.

II. Toner of the Second Present Disclosure

The toner of the second present disclosure is a toner comprising colored resin particles containing a binder resin, a colorant, a softening agent and a charge control agent, and an external additive, wherein a glass transition temperature (Tg) specified from a temperature dependence curve for a loss tangent (tan δ) of the toner, which is obtained by a dynamic viscoelastic measurement of the toner at a measurement frequency of 24 Hz, satisfies 45° C.<Tg(° C.)<100° C., and wherein, in the temperature dependence curve for the loss tangent (tan δ), the following formulae (II-1) and (II-2) are satisfied:

$$5.00\times10^{-2}<(\tan\delta(\text{Tg})-\tan\delta(45°\text{ C.}))/(\text{Tg}-45)<7.60\times10^{-2} \quad \text{Formula (II-1)}$$

$$2.1\times10^{-3}<(\tan\delta(130°\text{ C.})-\tan\delta(100°\text{ C.}))/30<4.4\times10^{-2} \quad \text{Formula (II-2)}$$

where tan δ(45° C.) is a loss tangent (tan δ) at 45° C.; tan δ(Tg) is a loss tangent (tan δ) at the glass transition temperature (Tg); tan δ(100° C.) is a loss tangent (tan δ) at 100° C.; and tan δ(130° C.) is a loss tangent (tan δ) at 130° C.

Hereinafter, the viscoelastic characteristics of the toner of the second present disclosure, a method for producing colored resin particles used for the toner of the second present disclosure, the colored resin particles, an external additive used for the toner of the second present disclosure, and the performances of the toner of the second present disclosure, will be described in this order.

II-1. Viscoelastic Characteristics of the Toner of the Second Disclosure

In the toner of the second present disclosure, the shape of the temperature dependence curve for the loss tangent (tan δ) in the temperature range of 45° C. or higher and 145° C. or lower, which is obtained by a dynamic viscoelastic measurement of the toner at a measurement frequency of 24 Hz, has the following characteristics. The curve has at least one peak in a range of higher than 45° C. and lower than 100° C. After the temperature exceeds the temperature at which the tan δ becomes the maximum value of the peak, the tan δ decreases with increasing temperature. Then, the tan δ decreases while the tan δ increases and decreases. After the tan δ reaches the minimum value, the tan δ gradually increases as the temperature further increases.

In addition, in the toner of the second present disclosure, a glass transition temperature (Tg) specified from the temperature dependence curve for the loss tangent (tan δ) of the toner is higher than 45° C. and lower than 100° C., and in the temperature dependence curve for the loss tangent (tan δ), the following formulae (II-1) and (II-2) are satisfied:

$$5.00\times10^{-2}<(\tan\delta(\text{Tg})-\tan\delta(45°\text{ C.}))/(\text{Tg}-45)<7.60\times10^{-2} \quad \text{Formula (II-1)}$$

$$2.1\times10^{-3}<(\tan\delta(130°\text{ C.})-\tan\delta(100°\text{ C.}))/30<4.4\times10^{-2} \quad \text{Formula (II-2)}$$

where tan δ(45° C.) is a loss tangent (tan δ) at 45° C.; tan δ(Tg) is a loss tangent (tan δ) at the glass transition temperature (Tg); tan δ(100° C.) is a loss tangent (tan δ) at 100° C.; and tan δ(130° C.) is a loss tangent (tan δ) at 130° C.

The values of the tan δ rounded to the third decimal place are used in the formulae (II-1) and (II-2). In addition, the value of (tan δ (Tg)−tan δ(45° C.))/(Tg−45) shown in the formula (II-1) is set to be a value rounded such that the significant number becomes three orders of magnitude. The value of (tan δ(130° C.)−tan δ(100° C.))/30 shown in the formula (II-2) is set to be a value rounded such that the significant number becomes two orders of magnitude.

In the toner of the second present disclosure, the dynamic viscoelastic measurement is carried out using the same apparatus under the same conditions as those of the first present disclosure.

The toner of the second present disclosure has the specific viscoelasticity in which the above mentioned formulae (II-1) and (II-2) are satisfied in the temperature-tan δ curve. Consequently, in the toner, both the low-temperature fixability and shelf stability are improved in a well-balanced manner, and the toner has excellent performance which has been difficult to realize in the past.

As the value of (tan δ(Tg)−tan δ(45° C.))/(Tg−45) shown in the formula (II-1) decreases within the above numerical range, blocking during toner storage is likely to be suppressed, and the shelf stability of the toner is improved. The value of (tan δ(Tg)−tan δ(45° C.))/(Tg−45) decreases as the difference between the tan δ(Tg) and tan δ(45° C.) decreases or as the Tg becomes higher. It is presumed that, since the difference between the tan δ(Tg) and tan δ(45° C.) is not too large, the viscosity of the toner does not become too strong, that is, the movement of the polymer chains between the toner particles is suppressed, so that the blocking of the toner is suppressed. Further, it is presumed that blocking of the toner is suppressed because the decrease in modulus of the toner at a low temperature is suppressed due to the not too low Tg. Moreover, since the value of the formula (II-1) is less than the upper limit value, deterioration of the shelf stability of the toner is suppressed, and further, the occurrence of toner spouting after being left at a high temperature is likely to be suppressed. Since the value of the formula (II-1) is more than the lower limit value, the increase of the fixing temperature of the toner is likely to be suppressed, and thus the deterioration of the low-temperature fixability of the toner is suppressed.

On the other hand, as the value of (tan δ(130° C.)−tan δ(100° C.))/30 shown in the formula (II-2) increases within the above numerical range, the fixing temperature of the toner is likely to decrease, and the low-temperature fixability of the toner is improved. At the time of fixing the toner, the toner gradually deforms as the temperature of the toner increases. At the time of actual toner fixing, from the time when the sheet on which the toner is transferred enters the roll to the time when the sheet is discharged, the temperature gradient of the toner is at least from 100° C. to 130° C. It is presumed that the larger the value of (tan δ(130° C.)−tan δ(100° C.))/30 shown in the formula (II-2), the faster the increase of the tan δ, that is, the faster the increase of the viscosity of the toner, after the toner is warmed, so that fixing at a relatively low temperature becomes possible. Further, the glossiness of the image to be formed is good when the value of the formula (II-2) is more than the lower limit value. When the value of the formula (II-2) is less than the upper limit value, blocking during toner storage is suppressed, and deterioration of the shelf stability of the toner is suppressed. Further, when the value of the formula (II-2) is less than the upper limit value, the occurrence of toner spouting after being left at a high temperature is likely to be suppressed.

The present inventor has also found that particularly when the softening temperature ($T_{1/2}$) measured by a ½ method at a pressure of 5.0 kgf/cm$^2$ using a flow tester, is more than 124° C. and less than 159° C., the toner which has the viscoelasticity satisfying the formulae (II-1) and (II-2) in the temperature-tan δ curve, exhibits the above-mentioned effects.

In order to obtain a toner which has the viscoelasticity satisfying the formulae (II-1) and (II-2) in the temperature-tan δ curve, for example, the viscoelasticity of the toner can be controlled by appropriately changing the composition, molecular weight and content of the binder resin contained in the toner, the type and content of the colorant, the glass transition temperature (Tg) and content of the charge control agent, the type and molecular weight of the softening agent, and the type and content of the external additive, and the like. Among them, it is effective to adjust the molecular weight and composition of the binder resin, and the type and content of the colorant. The molecular weight, composition, and the like of the binder resin contained in the toner have a large influence on the viscoelasticity of the toner in the low temperature range at or below the glass the glass transition temperature. Therefore, in order to achieve the viscoelasticity satisfying the formula (II-1), it is effective to adjust the molecular weight, composition, and the like of the binder resin contained in the toner. On the other hand, the type, content, and the like of the colorant contained in the toner have a large influence on the viscoelasticity of the toner in the temperature range of 100° C. to 130° C. Therefore, in order to achieve the viscoelasticity satisfying the formula (II-2), it is effective to adjust the type and content of the colorant contained in the toner, and the like. More specifically, the temperature-tan δ curve of the toner can satisfy the formulae (II-1) and (II-2) by the preferable embodiment of each component described later.

The toner of the second present disclosure satisfies the following formula (II-1) in the temperature-tan δ curve obtained by a dynamic viscoelastic measurement of the toner at a measurement frequency of 24 Hz.

$$5.00\times10^{-2}<(\tan\delta(Tg)-\tan\delta(45°\ C.))/(Tg-45)<7.60\times10^{-2} \quad \text{Formula (II-1)}$$

The upper limit in the formula (II-1) is preferably less than $7.40\times10^{-2}$ from the viewpoint that blocking during toner storage is likely to be suppressed and the shelf stability of the toner is easily improved, and that toner spouting after being left at a high temperature is likely to be suppressed. On the other hand, the lower limit in the formula (II-1) is preferably $5.50\times10^{-2}$ or more, more preferably $5.60\times10^{-2}$ or more, still more preferably $5.90\times10^{-2}$ or more, and even more preferably $6.50\times10^{-2}$ or more, from the viewpoint that the increase in the fixing temperature is likely to be suppressed.

The toner of the second present disclosure satisfies the following formula (II-2) in the temperature-tan δ curve obtained by a dynamic viscoelastic measurement of the toner at a measurement frequency of 24 Hz.

$$2.1\times10^{-3}<(\tan\delta(130°\ C.)-\tan\delta(100°\ C.))/30<4.4\times10^{-2} \quad \text{Formula (II-2)}$$

The lower limit in the formula (II-2) is preferably more than $3.0\times10^{-3}$, more preferably more than $3.5\times10^{-3}$, and still more preferably $1.20\times10^{-2}$ or more, from the viewpoint that the low-temperature fixability of the toner is improved, and that the glossiness of the image to be formed is easily improved. The upper limit in the formula (II-2) is preferably less than $4.1\times10^{-2}$, more preferably less than $3.8\times10^{-2}$, and still more preferably less than $3.2\times10^{-2}$, from the viewpoint that the deterioration of the shelf stability of the toner is likely to be suppressed, and that the occurrence of toner spouting after being left at a high temperature is likely to be suppressed.

The toner of the second present disclosure satisfies the glass transition temperature (Tg) of 45° C.<Tg(° C.)<100°

C. The glass transition temperature (Tg) is specified from the temperature dependence curve for the loss tangent (tan δ) of the toner, which is obtained by a dynamic viscoelastic measurement of the toner at a measurement frequency of 24 Hz. The glass transition temperature (Tg) is preferably higher than 70° C., and more preferably higher than 73° C., from the viewpoint of suppressing abrupt decrease in modulus of the toner at a low temperature and suppressing blocking of the toner. On the other hand, the glass transition temperature (Tg) is preferably 90° C. or lower, and more preferably 85° C. or lower, from the view point that the softening start temperature of the toner does not become too high, and the low-temperature fixability of the toner is improved.

In the toner of the second present disclosure, the tan δ(Tg), which is the loss tangent (tan δ) at the glass transition temperature (Tg), is preferably less than 2.410, more preferably less than 2.320, and still more preferably less than 2.300. When the tan δ(Tg) is equal to or lower than the upper limit value, blocking during toner storage is likely to be suppressed, the shelf stability of the toner is easily improved, and the occurrence of toner spouting after being left at a high temperature is likely to be suppressed.

The lower limit of the tan δ(Tg) is not particularly limited. It is preferably 1.000 or more, and more preferably 1.100 or more, from the viewpoint of improving the fixability of the toner.

In the toner of the second present disclosure, the tan δ(45° C.), which is the loss tangent (tan δ) at 45° C., is preferably 0.200 or less, more preferably 0.100 or less, and still more preferably 0.050 or less. When the tan δ(45° C.) is equal to or lower than the upper limit value, blocking during toner storage is likely to be suppressed, the shelf stability of the toner is easily improved, and the occurrence of toner spouting after being left at a high temperature is likely to be suppressed.

The lower limit of the tan δ(45° C.) is not particularly limited as long as it is 0.000 or more.

In the toner of the second present disclosure, the tan δ(100° C.), which is the loss tangent (tan δ) at 100° C., is preferably 0.800 or more, more preferably 0.900 or more, and still preferably 0.950 or more, from the viewpoint that the low-temperature fixability of the toner is easily improved. The tan δ(100° C.) is preferably 1.500 or less, and more preferably 1.400 or less, from the viewpoint that the deterioration of the shelf stability of the toner is likely to be suppressed, and that the occurrence of toner spouting after being left at a high temperature is likely to be suppressed.

In the toner of the second present disclosure, the tan δ(130° C.), which is the loss tangent (tan δ) at 130° C., is preferably 1.000 or more, from the viewpoint that the low-temperature fixability of the toner is easily improved. The tan δ(130° C.) is preferably 3.000 or less, more preferably 2.500 or less, and still more preferably 2.300 or less, from the viewpoint that the deterioration of the shelf stability of the toner is likely to be suppressed, and that the occurrence of toner spouting after being left at a high temperature is likely to be suppressed.

In addition, the toner of the second present disclosure has the softening temperature ($T_{1/2}$) measured by a ½ method at a pressure of 5.0 kgf/cm$^2$ using a flow tester, of preferably more than 124° C. and less than 159° C. When the toner having the softening temperature ($T_{1/2}$) within the above range has viscoelasticity satisfying the formulae (II-1) and (II-2) in the temperature-tan δ curve, both the low-temperature fixability and shelf stability of the toner can be particularly improved in a well-balanced manner, and the occurrence of toner spouting after being left at a high temperature is likely to be suppressed. Moreover, when the softening temperature ($T_{1/2}$) of the toner is within the above range, the fixing temperature of the toner is lowered. Accordingly, the handling of the toner is favorable, and the generation of volatile organic compounds (VOC: Volatile Organic Compounds) such as styrene and siloxane materials, and nanoparticles (UFP: Ultra Fine Particles) due to the heat at the time of toner fixing is likely to be suppressed.

The softening temperature ($T_{1/2}$) of the toner is preferably 126° C. or higher, more preferably 130° C. or higher, and still more preferably 140° C. or higher from the viewpoint of improving the shelf stability of the toner. On the other hand, from the viewpoint of improving the low-temperature fixability of the toner, the softening temperature ($T_{1/2}$) is preferably less than 165° C., more preferably 163° C. or lower, and more preferably less than 159° C.

The softening temperature ($T_{1/2}$) of the toner of the second present disclosure can be adjusted, for example, by the composition and molecular weight of the binder resin, the type and content of the colorant, the content of the styrene-based thermoplastic elastomer, and the like. As the amount of the crosslinkable polymerizable monomer used in the binder resin decreases, the softening temperature ($T_{1/2}$) is likely to decrease. Further, as the amount of the styrene-based thermoplastic elastomer decreases, the softening temperature ($T_{1/2}$) is likely to decrease. Further, as the weight-average molecular weight of the polymer contained in the binder resin increases, the softening temperature ($T_{1/2}$) is likely to increase.

The softening temperature ($T_{1/2}$) measured by the ½ method at a pressure of 5.0 kgf/cm$^2$ using a flow tester, can be determined from the flow curve (piston stroke-temperature) measured under the following measurement conditions using a flow tester (product name: CFT-500C) manufactured by Shimadzu Corporation. Specifically, in the flow curve, ½ of the difference between the piston stroke at the outflow ending point and the minimum value of the piston stroke is obtained. Then, the softening temperature ($T_{1/2}$) can be determined as the temperature of the position of the sum of the obtained value and the minimum value.

(Measurement Conditions)

Start temperature: 35° C.
Temperature increasing rate: 3° C./min
Preheating time: 5 minutes
Cylinder pressure: 5.0 kgf/cm$^2$ (5 kg method)
Die hole diameter: 0.5 mm
Die length: 1.0 mm
Sample input amount: 1.0 g to 1.3 g II-2. Thermal Properties of Toner The toner having improved low-temperature fixability is likely to be easily spouted out from the developing roller after being left at a high temperature. Therefore, a toner having excellent low-temperature fixability, good shelf stability, and capable of suppressing the occurrence of toner spouting after being left at a high temperature, has been required.

In the toner of the second present disclosure, the occurrence of toner spouting after being left at a high temperature is more likely to be suppressed. In particular, in the toner of the second present disclosure, when the apparent glass transition temperature (Tg2) of the toner at a time of increasing a temperature of the toner at a temperature increasing rate of 1000 K/sec is from 68° C. to 74° C., and a heat generation starting temperature of the toner at a time of decreasing a temperature of the toner at a temperature decreasing rate of 1000 K/sec is from 50° C. to 62° C., both of which are obtained by a differential scanning calorimetry of the toner using a high-speed differential scanning calorimeter, both the low-temperature fixability and shelf stability of the toner are improved in a well-balanced manner, and toner spouting after being left at a high temperature is suppressed.

In the toner of the second present disclosure, it is preferable that the apparent glass transition temperature (Tg2) of the toner at a time of increasing a temperature of the toner at a temperature increasing rate of 1000 K/sec, is from 68° C. to 74° C., and a heat generation starting temperature of the toner at a time of decreasing a temperature of the toner at a temperature decreasing rate of 1000 K/sec is from 50° C. to 62° C., both of which are obtained by a differential scanning calorimetry of the toner using a high-speed differential scanning calorimeter.

In the present disclosure, the differential scanning calorimetry (DSC) of the toner using the high-speed differential scanning calorimeter can be performed using an ultra-high-speed DSC device (FLASH DSC, manufactured by Mettler-Toledo) under the following temperature conditions (1) to (5).

(1) Hold at 0° C. for 0.1 second,
(2) Increase the temperature from 0° C. to 150° C. at 1000 K/sec,
(3) Hold at 150° C. for 60 seconds,
(4) Decrease the temperature from 150° C. to 0° C. at −1000 K/sec, and
(5) Hold at 0° C. for 1 second.

Figure 3:
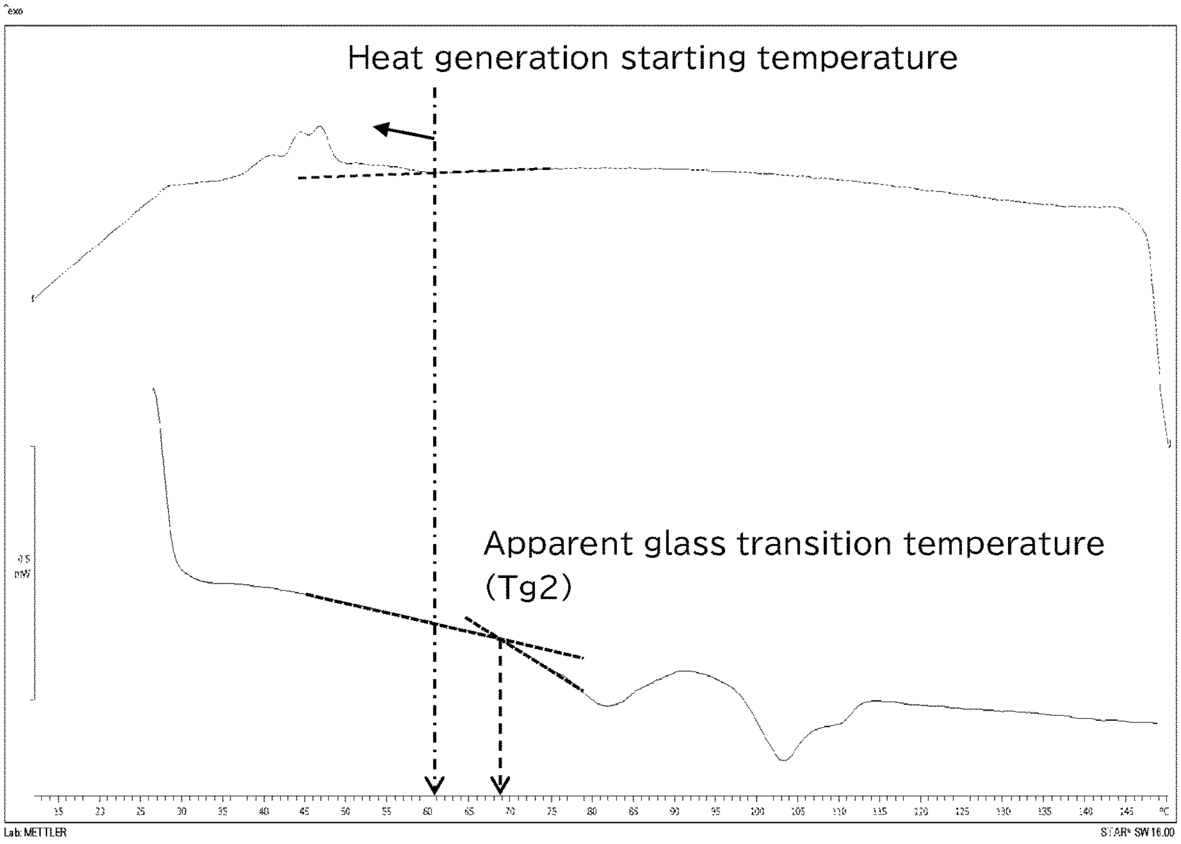
FIG. 3 is a graph showing how the apparent glass transition temperature (Tg2) of the toner at a time of increasing a temperature of the toner and the heat generation starting temperature of the toner at a time of decreasing a temperature of the toner are obtained by a differential scanning calorimetry of the toner.

FIG. 3 shows how the apparent glass transition temperature (Tg2) of the toner at a time of increasing the temperature of the toner at a temperature increasing rate of 1000 K/sec and the heat generation starting temperature of the toner at a time of decreasing the temperature of the toner at a temperature decreasing rate of 1000 K/sec, are obtained by a differential scanning calorimetry of the toner.

The apparent glass transition temperature (Tg2) is defined as the temperature of the intersection of a straight line obtained by extending the baseline on the low temperature side to the high temperature side, and a stepwise change part of the glass transition, or a tangential line drawn at a point where the slope of the curve of the endothermic peak due to enthalpy relaxation is maximized, in the DSC curve at the time of temperature increase.

The heat generation starting temperature of the toner is defined as the temperature at which exothermic heat is generated when, in the DSC curve at the time of temperature decrease, the curve deviates from the previous baseline and an exothermic peak occurs.

The present inventor has found that, by using the apparent glass transition temperature and the heat generation starting temperature measured at a high-speed temperature increasing and decreasing rates of 1000 K/sec which are equivalent to those at the time of toner fixing, it is possible to indirectly evaluate the behavior of the toner in a condition in which the components coexisting in the toner composition are subjected to the interaction with respect to the phenomena of rapid heating and cooling such as toner fixing, and it is possible to control the low-temperature fixability of the toner.

In a low-speed temperature increasing rate of 10 K/sec as in a normal DSC measurement, a semicrystalline sample containing an amorphous component may be reorganized and recrystallized in the middle of the temperature increase and may appear as a peak. When the peak derived from the above is overlap with the glass transition temperature, it is difficult to accurately identify the temperature. On the other hand, at a high-speed temperature increasing rate of 1000 K/sec, it is considered that, since a time grace for recrystallization or the like is not given, the behavior of the toner at the time of heating during toner fixing can be reproduced as it is. At a high-speed temperature increasing rate of 1000 K/sec, the endothermic behavior of the toner is simple. Accordingly, a plurality of peaks is likely to be one, and the phase transition at the time of toner fixing is apparently simplified.

In addition, in a low-speed decreasing temperature rate of 10 K/sec as in a normal DSC measurement, it is considered that, since an amorphous component such as a resin and a crystalline component such as a softening agent are gradually phase-separated from the compatible state, the temperature at which crystallization of the crystalline component begins is hardly affected by an amorphous component. On the other hand, at a high-speed temperature decreasing rate of 1000 K/sec, it is considered that, since the amorphous component such as a resin and the crystalline component such as a softening agent are rapidly cooled from the compatible state without time of phase separation, that is, the crystallization of the crystalline component occurs while interfering with each other. It has been found that the order of toners depending on high and low heat generation starting temperature measured at a high-speed temperature decreasing rate of 1000 K/sec which is equivalent to that at the time of toner fixing may be different from the order of toners depending on high and low heat generation starting temperature measured at a low-speed temperature decreasing rate of 10 K/sec. It is considered that the heat generation starting temperature measured at a high-speed temperature decreasing rate of 1000 K/sec which is equivalent to that at the time of toner fixing, can be evaluated as the temperature at which crystallization begins while the crystalline component contained in the toner is affected by the surrounding amorphous component at the time of fixing.

The toner of the second present disclosure, in which the apparent glass transition temperature (Tg2) of the toner at a time of increasing the temperature of the toner at a temperature increasing rate of 1000 K/sec is from 68° C. to 74° C. and the heat generation starting temperature of the toner at a time of decreasing the temperature of the toner at a temperature decreasing rate of 1000 K/sec is from 50° C. to 62° C., is excellent in the low temperature fixability, has good shelf stability, and can suppress the occurrence of toner spouting after being left at a high temperature.

The fact that the heat generation starting temperature is low as in the above-mentioned specific range means that, in the process of fixing the toner, at the timing at which the toner is heated and melted, and then, rapidly cooled, the flowability of the melted binder resin is maintained, and at the same time, the crystallization of the softening agent is slow, and it is considered that the toner spreads on the paper surface and the fixability of the toner is easily improved.

When the apparent glass transition temperature (Tg2) and the heat generation starting temperature are equal to or lower than the above upper limit values, the low-temperature fixability of the toner is good. When the apparent glass transition temperature (Tg2) and the heat generation starting temperature are equal to or higher than the lower limit values, deterioration in shelf stability of the toner is suppressed, and occurrence of toner spouting after being left at a high temperature can be suppressed.

In order to obtain a toner having thermal properties satisfying the above-mentioned specific ranges of the apparent glass transition temperature (Tg2) and the heat generation starting temperature, the thermal properties of the toner can be controlled, for example, by appropriately changing the composition, molecular weight and content of the binder resin contained in the toner, the type and content of the colorant, the glass transition temperature (Tg) and content of the charge control agent, the type and molecular weight of the softening agent, and the type and content of the external additive, and the like. Among them, it is effective to adjust the molecular weight and composition of the binder resin, the type and content of the colorant, and the like. More specifically, the above-mentioned specific ranges of the apparent glass transition temperature (Tg2) and the heat generation starting temperature can be satisfied by the preferable embodiment of each component described later.

From the viewpoint that an increase in the fixing temperature is likely to be suppressed, the upper limit value of the apparent glass transition temperature (Tg2) is preferably 73° C. or lower, more preferably 72° C. or lower.

The lower limit value of the heat generation starting temperature is preferably 52° C. or higher, and more preferably 54° C. or higher, from the viewpoint that blocking during toner storage is likely to be suppressed, the shelf stability of the toner is easily improved, and that the occurrence of toner spouting after being left at a high temperature is likely to be suppressed. On the other hand, the upper limit value of the heat generation starting temperature is preferably 60° C. or lower, and more preferably 58° C. or lower, from the viewpoint that an increase in the fixing temperature of the toner is likely to be suppressed.

II-3. Method for Producing Colored Resin Particles

The colorant resin particles used in the toner of the second present disclosure can be produced by using a wet method or a dry method as in the case of the colored resin particles used in the toner of the first present disclosure, and a wet method is preferably used. The colored resin particles can be produced by the following processes using a suspension polymerization method which is particularly preferable among the wet methods.

(A) Suspension Polymerization Method (A-1) Preparation Step of Polymerizable Monomer Composition First, a polymerizable monomer, a colorant, a softening agent, a charge control agent, and other additives such as a molecular weight modifier and a styrene-based thermoplastic elastomer if necessary are mixed to prepare a polymerizable monomer composition. For example, a media type dispersing machine is used for the mixing in the preparation of the polymerizable monomer composition. Hereinafter, the colorant resin particles used in the toner of the first present disclosure may be referred to as “colored resin particles of the first present disclosure”, and the colored resin particles used in the toner of the second present disclosure may be referred to as “colored resin particles of the second present disclosure”.

As the polymerizable monomer used in the production of the colorant resin particles of the second present disclosure, examples include the polymerizable monomer used in the production of the colored resin particles of the first present disclosure. The polymerizable monomer used in the production of the colored resin particles of the second present disclosure preferably contains a monovinyl monomer as a main component, and may further contain a macromonomer or a crosslinkable polymerizable monomer.

From the viewpoint that the temperature-tan δ curve of the toner is likely to satisfy the formulae (II-1) and (II-2), that the softening temperature ($T_{1/2}$) is likely to fall within the preferable range, and that the apparent glass transition temperature (Tg2) and heat generation starting temperature of the toner are likely to fall within the above specific ranges, the polymerizable monomer preferably includes at least one monovinyl monomer selected from the group consisting of styrene, styrene derivative, acrylic acid esters and methacrylic acid esters, more preferably includes at least one monovinyl monomer selected from the group consisting of styrene, acrylic acid esters and methacrylic acid esters, and still more preferably includes styrene and at least one monovinyl monomer selected from the group consisting of acrylic acid esters and methacrylic acid esters.

In addition, from the viewpoint that the temperature-tan δ curve of the toner is likely to satisfy the formulae (II-1) and (II-2), that the softening temperature ($T_{1/2}$) is likely to fall within the preferable range, and that the apparent glass transition temperature (Tg2) and heat generation starting temperature of the toner are likely to fall within the above specific ranges, as the acrylic acid ester, at least one selected from the group consisting of n-butyl acrylate, propyl acrylate, and 2-ethylhexyl acrylate is preferred, and as the methacrylic acid ester, at least one selected from the group consisting of n-butyl methacrylate, propyl methacrylate, and 2-ethylhexyl methacrylate is preferred The content of styrene in 100 parts by mass of the total amount of the monovinyl monomers is preferably 60 parts by mass or more, more preferably 70 parts by mass or more, still more preferably 80 parts by mass or more, and even more preferably 90 parts by mass or more. As the content of styrene increases, the apparent glass transition temperature (Tg2) of the toner is likely to increase, the softening temperature ($T_{1/2}$) of the toner is likely to increase, and the glass transition temperature (Tg) of the toner is likely to increase.

From the viewpoint that the temperature-tan δ curve of the toner is likely to satisfy the formulae (II-1) and (II-2), that the softening temperature ($T_{1/2}$) is likely to fall within the preferable range, and that the apparent glass transition temperature (Tg2) and heat generation starting temperature of the toner are likely to fall within the above specific ranges, it is preferable that the monovinyl monomer includes styrene and at least one selected from the group consisting of acrylic acid esters and methacrylic acid esters, and the mass ratio of styrene to the total mass of acrylic acid esters and methacrylic acid esters (styrene:(meth)acrylic acid esters) is within the range of 50:50 to 90:10. The mass ratio (styrene:(meth)acrylic acid esters) is more preferably within the range of 60:40 to 80:20, and particularly preferably within the range of 70:30 to 80:20.

When the polymerizable monomer includes a polymerizable monomer other than the monovinyl monomer, the content of the monovinyl monomer is appropriately adjusted such that the temperature-tan δ curve of the toner satisfies the formulae (II-1) and (II-2), and preferably further such that the apparent glass transition temperature (Tg2) and heat generation starting temperature of the toner fall within the specified ranges. The content of the monovinyl monomer is not particularly limited. The total amount of the monovinyl monomer is preferably 90 parts by mass or more, and more preferably 95 parts by mass or more, per 100 parts by mass of the total amount of the polymerizable monomer. The monovinyl monomers may be used alone or in combination of two or more thereof.

As the macromonomer, at least one selected from the group consisting of polyacrylic ester macromonomers and polymethacrylic ester macromonomers can be preferably used, from the viewpoint of easily controlling the apparent glass transition temperature (Tg2) of the toner and the glass transition temperature (Tg) in the temperature-tan δ curve. As the acrylic ester used in the polyacrylic ester macromonomer, examples include the above-mentioned acrylic esters usable as the monovinyl monomer. As the methacrylic ester used in the polymethacrylic ester macromonomer, examples include the above-mentioned methacrylic esters usable as the monovinyl monomer. As the macromonomer, it is preferable to appropriately select and use such a macromonomer, that when the polymerizable monomer includes the macromonomer, the glass transition temperature (Tg) of the obtained binder resin becomes higher than the case where the polymerizable monomer does not include the macromonomer. This is because the apparent glass transition temperature (Tg2) of the toner and the glass transition temperature (Tg) in the temperature-tan δ curve are likely to fall within the preferable ranges.

When the polymerizable monomer includes the macromonomer, the content of the macromonomer is appropriately adjusted such that the temperature-tan δ curve of the toner satisfies the formulae (II-1) and (II-2). The content of the macromonomer is not particularly limited. The content of the macromonomer is preferably from 0.03 parts by mass to 5 parts by mass, and more preferably from 0.05 parts by mass to 1 part by mass, with respect to 100 parts by mass of the monovinyl monomer.

The macromonomers may be used alone or in combination of two or more thereof.

When the polymerizable monomer includes the crosslinkable polymerizable monomer, from the viewpoint that the softening temperature ($T_{1/2}$) of the toner is likely to fall within the preferable range, that the apparent glass transition temperature (Tg2) and heat generation starting temperature of the toner are likely to fall within the above specific ranges, and that the glossiness of the image to be formed is easily improved, the content of the crosslinkable polymerizable monomer is preferably 0.5 parts by mass or less, more preferably 0.1 parts by mass or less, and still more preferably 0.05 parts by mass or less, with respect to 100 parts by mass of the monovinyl monomer. Most preferably, the polymerizable monomer does not include a crosslinkable polymerizable monomer. The crosslinkable polymerizable monomers may be used alone or in combination of two or more thereof.

The content of the polymerizable monomer is appropriately adjusted such that the temperature-tan δ curve of the toner satisfies the formulae (II-1) and (II-2), and preferably further such that the apparent glass transition temperature (Tg2) and heat generation starting temperature of the toner fall within the specified ranges. The content of the polymerizable monomer is not particularly limited. The total content of the polymerizable monomer is preferably from 60 parts by mass to 95 parts by mass, more preferably from 65 parts by mass to 90 parts by mass, and still more preferably from 70 parts by mass to 85 parts by mass, with respect to 100 parts by mass of the total solid content contained in the polymerizable monomer composition.

As the colorant contained in the toner of the second present disclosure, a colorant that is conventionally used for toners may be appropriately selected. The colorant is not particularly limited. When producing a color toner, a black colorant, a cyan colorant, a yellow colorant or a magenta colorant can be used. Examples of the black colorant, the cyan colorant, the yellow colorant and the magenta colorant include those that can be used in the toner of the first present disclosure.

As the colorant contained in the toner of the second present disclosure, from the viewpoint that the low-temperature fixability and shelf stability of the toner easily improves since the temperature-tan δ curve of the toner is likely to satisfy the formulae (II-1) and (II-2), and the softening temperature ($T_{1/2}$) is likely to fall within the preferable range, and from the viewpoint that the hot-offset property of the toner is easily maintained since the apparent glass transition temperature (Tg2) and heat generation starting temperature of the toner are likely to fall within the above specific ranges, it is preferable to use a cyan colorant containing a cyan pigment, a yellow colorant containing a combination of a yellow dye and a yellow pigment, or a magenta colorant containing a magenta pigment. It is more preferable to use a cyan colorant containing a phthalocyanine-based cyan pigment, a yellow colorant containing a combination of a yellow dye and a yellow pigment containing a chlorine atom, or a magenta colorant containing a quinacridone-based magenta pigment. It is still more preferable to use a cyan colorant containing at least one selected from C.I. Pigment Blue 15:3 and C.I. Pigment Blue 15:4, a yellow colorant containing a combination of C.I. Solvent Yellow 98 and C.I. Pigment Yellow 214, or a magenta colorant containing at least one selected from C.I. Pigment Red 122 and C.I. Pigment Violet 19.

As the quinacridone-based magenta pigment preferably used as the magenta colorant, a mixed crystal of C.I. Pigment Violet 19 and C.I. Pigment Red 122 can be preferably used from the viewpoint of excellent weather resistance and image density. The mixed crystal of C.I. Pigment Violet 19 and C.I. Pigment Red 122 can be prepared, for example, by the method described in U.S. Pat. No. 3,160,510, in which the mixed crystal components are simultaneously recrystallized from sulfuric acid or other suitable solvent, and treated with a solvent after salt gringing if necessary. The mixed crystal of C.I. Pigment Violet 19 and C.I. Pigment Red 122 can be also prepared, for example, by the method described in German Pat. No. 1217333, in which the substituted diaminoterephthalic acid mixture is treated with a solvent after cyclization.

In the mixed crystal of C.I. Pigment Violet 19 and C.I. Pigment Red 122, the mass ratio of C.I. Pigment Violet 19 to C.I. Pigment Red 122 used is generally from 80:20 to 20:80, preferably from 70:30 to 30:70, and more preferably from 60:40 to 40:60.

The content of the colorant is generally from 1 part by mass to 20 parts by mass, more preferably from 5 parts by mass to 15 parts by mass, and still preferably from 7 parts by mass to 13 parts by mass, with respect to 100 parts by mass of the polymerizable monomer. When the content of the colorant is within the above range, the temperature-tan δ curve of the toner is likely to satisfy the formulae (II-1) and (II-2), the softening temperature ($T_{1/2}$) of the toner is likely to fall within the above preferable range, and the apparent glass transition temperature (Tg2) and heat generation starting temperature of the toner are likely to fall within the above specific ranges. The colorants may be used alone or in combination of two or more thereof.

The polymerizable monomer composition contains a softening agent. When the toner contains a softening agent, the releasability of the toner from the fixing roll at the time of fixing can be improved. The softening agent is not particularly limited as long as it is one that is generally used as a softening agent or a releasing agent for toners. Examples of the softening agent include those that can be used in the colored resin particles of the first present disclosure.

The weight average molecular weight Mw of the softening agent is not particularly limited. It is preferably within a range of from 400 to 3500, and more preferably within a range of from 500 to 3000. As the weight average molecular weight Mw of the softening agent increases, the softening temperature ($T_{1/2}$) of the toner is likely to increase, and the apparent glass transition temperature (Tg2) and heat generation starting temperature of the toner are likely to increase.

From the viewpoint of improving the balance between the shelf stability and low-temperature fixability of the toner by adjusting the viscoelasticity of the toner and the apparent glass transition temperature (Tg2) and heat generation starting temperature of the toner, the melting point of the softening agent is preferably within the range of from 50° C. to 90° C., more preferably within the range of from 60° C. to 85° C., and still more preferably within the range of from 70° C. to 80° C.

The content of the softening agent is not particularly limited. From the viewpoint of improving the balance between the shelf stability and low-temperature fixability of the toner by adjusting the viscoelasticity of the toner and the apparent glass transition temperature (Tg2) and heat generation starting temperature of the toner, the content of the softening agent is preferably from 1 part by mass to 30 parts by mass, and more preferably from 5 parts by mass to 20 parts by mass, with respect to 100 parts by mass of the monovinyl monomer.

The softening agents can be used alone or in combination of two or more thereof.

The polymerizable monomer composition contains a positively- or negatively-chargeable charge control agent to improve chargeability of the toner.

The charge control agent is not particularly limited as long as it is one that is generally used as a charge control agent for toners. Among charge control agents, a positively- or negatively-chargeable charge control resin is preferred because it has high compatibility with a polymerizable monomer and can impart stable chargeability (charge stability) to toner particles. A positively chargeable charge control resin is more preferably used from the viewpoint of obtaining a positively chargeable toner.

Examples of the positively- or negatively-chargeable charge control resin include the functional group-containing copolymers that can be used in the colored resin particles of the first present disclosure.

In the functional group-containing copolymers that can be used as the positively- or negatively-chargeable charge control resin, the ratio of the functional group-containing constitutional unit in the functional group-containing copolymer is preferably 3% by mass or less, and more preferably 2.5% by mass or less, from the viewpoint that the temperature-tan δ curve of the toner is likely to satisfy the formulae (II-1) and (II-2), and that the apparent glass transition temperature (Tg2) and heat generation starting temperature of the toner are likely to fall within the above specific ranges. On the other hand, the ratio of the functional group-containing constitutional unit in the functional group-containing copolymer is preferably 0.5% by mass or more, from the viewpoint of improving the charge stability and shelf stability of the toner and easily suppressing the occurrence of toner spouting after being left at high temperature. It is presumed that, when the charge control resin sufficiently contains the functional group, the charge control resin is likely to be localized near the surface of each colorant resin particle, and the charge control resin functions like a shell of each colored resin particle, thereby improving the shelf stability of the toner and suppressing the occurrence of toner spouting after being left at a high temperature.

As the functional group-containing copolymer that is used as a positively- or negatively-chargeable charge control resin, a styrene-acrylic resin is preferably used, since it has high compatibility with a polymerizable monomer, the temperature-tan δ curve of the toner is likely to satisfy the formulae (II-1) and (II-2), and the apparent glass transition temperature (Tg2) and heat generation starting temperature of the toner are likely to fall within the above specific ranges.

The glass transition temperature (Tg) of the functional group-containing copolymer used as the positively- or negatively-chargeable charge control resin, is preferably within a range of from 50° C. to 110° C., and more preferably within a range of from 60° C. to 100° C. When the glass transition temperature (Tg) of the functional group-containing copolymer is within the above range, the temperature-tan δ curve of the toner is likely to satisfy the formulae (II-1) and (II-2), the apparent glass transition temperature (Tg2) and heat generation starting temperature of the toner are likely to fall within the above specific ranges, and the shelf stability of the toner can be improved. It is presumed that, since the functional group-containing copolymer is likely to be localized near the surface of each colorant resin particle, and it functions like a shell of each colored resin particle, when the Tg of the functional group-containing copolymer is within the above range, the shelf stability of the toner is improved due to the sufficiently high Tg.

The weight average molecular weight Mw of the functional group-containing copolymer that is used as a positively- or negatively-chargeable charge control resin, is preferably within a range of from 5000 to 30000, and more preferably within a range of from 10000 to 25000.

As the positively- or negatively-chargeable charge control agent other than the chargeable charge control resin, examples include those that can be used in the colored resin particles of the first present disclosure.

In the present disclosure, the charge control agent is used in an amount of generally from 0.01 parts by mass to 10 parts by mass, and preferably from 0.03 parts by mass to 8 parts by mass, with respect to 100 parts by mass of the monovinyl monomer. When the content of the charge control agent is 0.01 parts by mass or more, the occurrence of fog can be suppressed. When the content of the charge control agent is 10 parts by mass or less, printing stains can be suppressed. The charge control agents may be used alone or in combination of two or more thereof.

It is preferable that the polymerizable monomer composition further contains a molecular weight modifier. The molecular weight modifier is not particularly limited, as long as it is one that is generally used as a molecular weight modifier for toners. Examples of the molecular weight modifier include those that can used for the production of the colored resin particles of the first present disclosure.

In the toner of the second present disclosure, from the viewpoint that the temperature-tan δ curve of the toner is likely to satisfy the formulae (II-1) and (II-2), that the softening temperature ($T_{1/2}$) is likely to fall within the preferable range, and that the apparent glass transition temperature (Tg2) and heat generation starting temperature of the toner are likely to fall within the above specific ranges, it is preferable that the content of the molecular weight modifier is adjusted such that the weight-average molecular weight Mw of the polymer contained in the binder resin becomes the preferable range described later. The molecular weight modifier is used in an amount of preferably from 1.0 part by mass to 3.0 parts by mass, more preferably from 1.1 parts by mass to 2.0 parts by mass, with respect to 100 parts by mass of the monovinyl monomer. The molecular weight modifiers may be used alone or in combination of two or more thereof. As the content of the molecular weight modifier increases, the weight-average molecular weight of the polymer contained in the binder resin is likely to decrease, the softening temperature ($T_{1/2}$) of the toner is likely to decrease, and the apparent glass transition temperature (Tg2) and heat generation starting temperature of the toner are likely to decrease. As the content of the molecular weight modifier increases, the value of (tan δ(Tg)−tan δ(45° C.))/(Tg−45) shown in the formula (II-1) and the value of (tan δ(130° C.)−tan δ(100° C.))/30 shown in the formula (II-2) are likely to increase in the temperature-tan δ curve of the toner. Further, as the content of the molecular weight modifier increase, the glass transition temperature (Tg) of the toner is likely to decrease, and the tan δ at Tg, the tan δ at 100° C. and the tan δ at 130° C. are likely to increase.

The polymerizable monomer composition may further contains a styrene-based thermoplastic elastomer. When the polymerizable monomer composition contains a styrene-based thermoplastic elastomer, the softening temperature ($T_{1/2}$) of the toner is likely to fall within the above range. Here, the styrene-based thermoplastic elastomer includes a copolymer such as a random-, block- or graft-copolymer or the like of a styrene-based monomer and other monomer, and a hydrogenate of the copolymer. The other monomer is a monomer which can be copolymerized with the styrene-based monomer and is at least one selected from monoolefins, diolefins and the like.

Further, when the toner contains the styrene-based thermoplastic elastomer, the fixability of the toner can be improved while maintaining the heat-resistant temperature of the toner.

Examples of the styrene-based thermoplastic elastomer include a styrene-butadiene-styrene type block copolymer, a styrene-butadiene type block copolymer, a styrene-isoprene-styrene type block copolymer, a styrene-isoprene type block copolymer, a styrene-butadiene-isoprene-styrene type block copolymer, and hydrogenates thereof; a styrene-ethylene-butylene-styrene type block copolymer, a styrene-ethylene-propylene-styrene type block copolymer, and a styrene-ethylene-ethylene-propylene-styrene type block copolymer.

Among these styrene-based thermoplastic elastomers, a styrene-isoprene-styrene type block copolymer can be preferably used from the viewpoint of optimizing the balance of the shelf stability and low-temperature fixability of the toner.

The styrene content ratio in the styrene-based thermoplastic elastomer is preferably from 15% by mass to 70% by mass, more preferably from 15% by mass to 60% by mass, and still more preferably from 20% by mass to 40% by mass. When the styrene content ratio is equal to or higher than the lower limit value, the ratio of the hydrocarbon unit is not too high, and the fixed toner is hardly peeled off from the fixing surface. Accordingly, the deterioration in fixability of the toner is suppressed. On the other hand, when the styrene content ratio is equal to or lower than the upper limit value, the compatibility with the binder resin does not become too high, and the deterioration in shelf stability of the toner is suppressed.

The weight average molecular weight Mw of the styrene-based thermoplastic elastomer is not particularly limited. It is preferably from 50,000 to 350,000, and more preferably from 80,000 to 250,000, from the viewpoint that the effect of improving fixability of the toner while maintaining the heat-resistant temperature of the toner is excellent.

The content of the styrene-based thermoplastic elastomer is preferably adjusted such that the softening temperature ($T_{1/2}$) of the toner falls within the above preferable range, and that the apparent glass transition temperature (Tg2) and heat generation starting temperature of the toner fall within the preferable ranges. The content of the styrene-based thermoplastic elastomer is not particularly limited. The styrene-based thermoplastic elastomer is preferably used in an amount from of 0.5 parts by mass to 10 parts by mass, more preferably from 1 part by mass to 8 parts by mass, and still more preferably from 2 parts by mass to 6 parts by mass, with respect to 100 parts by mass of the monovinyl monomer.

The styrene-based thermoplastic elastomers may be used alone or in combination of two or more thereof.

(A-2) Suspension Step (Droplet Forming Step) to Obtain a Suspension

The droplet forming step performed in the production of the colorant resin particles of the second present disclosure may be the same as the droplet forming step performed in the production of the colored resin particles of the first present disclosure.

(A-3) Polymerization Step

The polymerization step performed in the production of the colorant resin particles of the second present disclosure may be the same as the polymerization step performed in the production of the colored resin particles of the first present disclosure. In this step, it is preferable to produce core-shell type colored resin particles as in the production of the colored resin particles of the first present disclosure. By coating the core layer made of a material having a low softening point with a material having a softening point higher than that, the formulae (II-1) and (II-2) are likely to be satisfied in the temperature-tan δ curve of the toner, and the low-temperature fixability and shelf stability of the toner can be improved in a well-balanced manner.

(A-4) Washing, Filtrating, Dehydrating and Drying Step

The washing, filtrating, dehydrating and drying step performed in the production of the colorant resin particles of the second present disclosure may be the same as the washing, filtrating, dehydrating and drying step performed in the production of the colored resin particles of the first present disclosure.

(B) Pulverization Method

In the case of producing the colored resin particles by employing the pulverization method, for example, the pulverization method which can be used for producing colored resin particles of the first present disclosure can be used.

II-4. Colored Resin Particles

The colored resin particles are obtained by the production method such as the above-mentioned "(A) Suspension Polymerization Method" or "(B) Pulverization Method".

Hereinafter, the colored resin particles contained in the toner of the second present disclosure will be described. The colored resin particles described below include both core-shell type colored resin particles and colored resin particles which are not core-shell type.

The colored resin particles used in the toner of the second present disclosure contains the binder resin, the colorant, the softening agent and the charge control agent, and may further contain other additives such as the styrene-based thermoplastic elastomer if necessary.

Examples of the binder resin contained in the colored resin particles include a polymer obtained by polymerizing the polymerizable monomer described in the "(A) Suspension Polymerization Method". In addition, the polymer of the polymerizable monomer contained as the binder resin may form a cross-linked bond with the styrene-based thermoplastic elastomer inside the colored resin particles. Preferable polymerizable monomers which derive each constitutional unit of the polymer are the same as the preferable polymerizable monomers described in the "(A) Suspension Polymerization Method". From the viewpoint that the temperature-tan δ curve of the toner is likely to satisfy the formulae (II-1) and (II-2), that the softening temperature ($T_{1/2}$) is likely to fall in the preferable range, that the apparent glass transition temperature (Tg2) and heat generation starting temperature of the toner are likely to fall within the above specific ranges, and that the low-temperature fixability and shelf stability of the toner are likely to be improved in a well-balanced manner, it is preferable that the binder resin contained in the colored resin particles contains a polymer of one or two or more kinds of polymerizable monomers including at least one kind of monovinyl monomer selected from the group consisting of styrene, acrylic esters and methacrylic esters. It is more preferable that the binder resin contains a polymer of one or two or more kinds of polymerizable monomers containing styrene and at least one selected from the group consisting of acrylic esters and methacrylic esters.

The weight average molecular weight Mw of the polymer contained in the binder resin is preferably $1.00\times10^4$ or more and $2.00\times10^5$ or less, from the viewpoint that the temperature-tan δ curve of the toner is likely to satisfy the formulae (II-1) and (II-2), that the softening temperature ($T_{1/2}$) is likely to fall within the preferable range, that the apparent glass transition temperature (Tg2) and heat generation starting temperature of the toner are likely to fall within the above specific ranges, and that the low-temperature fixability and the shelf stability are improved in a well-balanced manner. Moreover, from the viewpoint of improving the shelf stability of the toner, the lower limit of the weight average molecular weight Mw is more preferably $2.00\times10^4$ or more, and still more preferably $3.00\times10^4$ or more. On the other hand, from the viewpoint of improving the low-temperature fixability of the toner, the upper limit of the weight average molecular weight Mw is more preferably $1.50\times10^5$ or less, and still more preferably $1.00\times10^5$ or less. The polymer contained in the binder resin is typically a polymer of the above-mentioned polymerizable monomer.

As the weight-average molecular weight Mw of the polymer decreases, the Tg of the toner is likely to decrease and the tan δ(Tg) is likely to increase. Accordingly, the value of tan δ(Tg)−tan δ(45° C.))/(Tg−45) shown in the formula (II-1) is likely to increase. Further, as the weight average molecular weight Mw of the polymer decreases, both the tan δ(100° C.) and the tan δ(130° C.) of the toner are likely to increase. However, the value of (tan δ(130° C.)−tan δ(100° C.))/30 shown in the formula (II-2) is likely to increase, since the increase width is likely to be larger in tan δ(130° C.). Also, as the weight-average molecular weight Mw of the polymer increases, the softening temperature ($T_{1/2}$) of the toner is likely to increase and the apparent glass transition temperature (Tg2) and heat generation starting temperature of the toner are likely to increase. Further, when the weight average molecular weight Mw of the polymer is equal to or lower than the above upper limit value, deterioration in shelf stability of the toner is likely to be suppressed.

The weight average molecular weight Mw of the polymer contained in the binder resin can be determined by the same method as that described in the colored resin particles of the first present disclosure. In the colored resin particles of the second present disclosure, examples of the polymer other than the polymer contained as the binder resin include a charge control resin, a softening agent and a styrene-based thermoplastic elastomer.

The binder resin contained in the colored resin particles is typically a polymer of the polymerizable monomer. A small amount of a polyester-based resin, an epoxy-based resin, or the like, which are conventionally widely used as a binder resin in toners, or an unreacted polymerizable monomer may be contained within a range in which the temperature-tan δ curve of the toner satisfies the formulae (II-1) and (II-2). The content of the polyester-based resin contained in 100 parts by mass of the binder resin is preferably 5 parts by mass or less, more preferably 1 part by mass or less, and still more preferably 0.1 parts by mass or less. It is particularly preferable that the binder resin does not contain a polyester-based resin. When the content of the polyester-based resin is equal to or lower than the above upper limit value, the environmental stability of the toner can be improved, and in particular, the change in the charging of the toner due to the change in humidity can be suppressed.

In addition, when the binder resin contains a resin other than the polymer of the polymerizable monomer, the content of the polymer of the polymerizable monomer in 100 parts by mass of the binder resin is preferably 95 parts by mass or more, more preferably 97 parts by mass or more, and still more preferably 99 parts by mass or more, from the viewpoint that the temperature-tan δ curve of the toner is likely to satisfy the formulae (II-1) and (II-2), and that the apparent glass transition temperature (Tg2) and heat generation starting temperature of the toner are likely to fall within the above specific ranges.

From the viewpoint that the temperature-tan δ curve of the toner is likely to satisfy the formulae (II-1) and (II-2), and that the apparent glass transition temperature (Tg2) and heat generation starting temperature of the toner are likely to fall within the above specific ranges, the total content of the binder resin is preferably from 60 parts by mass to 95 parts by mass, more preferably from 65 parts by mass to 90 parts by mass, and still more preferably from 70 parts by mass to 85 parts by mass, with respect to 100 parts by mass of the total solid content contained in the colored resin particles.

The colorant, the softening agent, the charge control agent and the styrene-based thermoplastic elastomer contained in the colored resin particles are the same as those described above in "(A) Suspension Polymerization Method".

The content of the colorant contained in the colored resin particles is appropriately adjusted according to the type of the colorant such that the desired color development is obtained, that the temperature-tan δ curve of the toner satisfies the formulae (II-1) and (II-2), and that the apparent glass transition temperature (Tg2) and heat generation starting temperature of the toner are likely to fall within the above specific ranges. The content of the colorant is not particularly limited. The content of the colorant is preferably from 1 part by mass to 20 parts by mass, more preferably from 5 parts by mass to 15 parts by mass, and still more preferably from 7 parts by mass to 13 parts by mass, with respect to 100 parts by mass of the binder resin.

The content of the softening agent contained in the colored resin particles is preferably from 1 part by mass to 30 parts by mass, and more preferably from 5 parts by mass to 20 parts by mass, with respect to 100 parts by mass of the binder resin, from the viewpoint of improving the balance between the shelf stability and low-temperature fixability of the toner.

The content of the charge control agent contained in the colored resin particles is preferably from 0.01 parts by mass to 15 parts by mass, and more preferably from 0.03 parts by mass to 8 parts by mass, with respect to 100 parts by mass of the binder resin. When the content of the charge control agent is equal to or more than the lower limit value, the occurrence of fog can be suppressed. When the content is equal to or less than the upper limit value, printing stains can be suppressed.

The content of the styrene-based thermoplastic elastomer in the colored resin particles is appropriately adjusted such that the temperature-tan δ curve of the toner satisfies the formulae (II-1) and (II-2), and preferably further such that the apparent glass transition temperature (Tg2) and heat generation starting temperature of the toner are likely to fall within the above specific ranges. The content of the styrene-based thermoplastic elastomer is not particularly limited. The content of the styrene-based thermoplastic elastomer is preferable from 0.5 parts by mass to 10 parts by mass, more preferably from 1 part by mass to 8 parts by mass, and still more preferably from 2 parts by mass to 6 parts by mass, with respect to 100 parts by mass of the binder resin.

The volume average particle diameter (Dv) of the colored resin particles is preferably from 3 μm to 15 μm, and more preferably from 4 μm to 12 μm. When the Dv is 3 μm or more, the flowability of the toner can be improved, and a deterioration of the transfer property of the toner and a decrease in image density can be suppressed. When the Dv is 15 μm or less, a decrease in resolution of an image can be suppressed.

The colored resin particles preferably have a ratio (Dv/Dn) of the volume average particle diameter (Dv) to the number average particle diameter (Dn) of from 1.0 to 1.3, more from preferably from 1.0 to 1.2. When the Dv/Dn is 1.3 or less, it is possible to suppress deterioration of the transfer property of the toner and a decrease in image density and image resolution.

The average circularity of the colored resin particles is preferably from 0.96 to 1.00, more preferably from 0.97 to 1.00, and still more preferably from 0.98 to 1.00 from the viewpoint of image reproducibility.

When the average circularity of the colored resin particles is 0.96 or more, fine line reproducibility of printing can be improved.

II-5. Toner of the Second Present Disclosure

In the second present disclosure, the colorant resin particles may be used as they are as a toner. However, from the viewpoint of adjusting the chargeability, flowability, shelf stability, and the like of the toner, the colored resin particles may be mixed and stirred together with an external additive to perform an external addition treatment, whereby an external additive is added on the surface of each colored resin particle, thereby obtaining a one-component toner.

The one-component toner may be further mixed and stirred together with carrier particles, thereby obtaining a two-component developer.

The mixer for performing the external addition treatment is not particularly limited as long as it is a mixer capable of adding an external additive on the surface of the colored resin particles. Examples of the mixer include those that can be used for producing the toner of the first present disclosure.

Examples of the external additive include those that can be used in the toner of the first present disclosure, and the preferred external additive in the first present disclosure can be similarly preferably used.

In the second present disclosure, the content of the external additive is generally from 0.05 parts by mass to 6 parts by mass, and preferably from 0.2 parts by mass to 5 parts by mass, with respect to 100 parts by mass of the colored resin particles. When the content of the external additive is 0.05 parts by mass or more, the generation of a transfer residue can be suppressed. When the content of the external additive is 6 parts by mass or less, the occurrence of fog can be suppressed. The external additives may be used alone or in combination of two or more thereof.

The toner of the second present disclosure is a toner which has good shelf stability and in which a decrease in the blocking occurrence temperature (heat-resistant temperature) is suppressed, since the temperature-tan δ curve of the toner satisfies the formulae (II-1) and (II-2). The blocking occurrence temperature (heat-resistant temperature) of the toner of the second present disclosure is preferably 53° C. or higher, more preferably 54° C. or higher, and still more preferably 55° C. or higher.

The toner of the second present disclosure is a toner which has good low-temperature fixability and in which an increase in the fixing temperature is suppressed, since the temperature-tan δ curve of the toner satisfies the formulae (II-1) and (II-2). The fixing temperature of the toner of the second present disclosure is preferably 170° C. or lower, more preferably 160° C. or lower, and still more preferably 150° C. or lower.

In addition, the toner of the second present disclosure is a toner which has good shelf stability and in which the occurrence of toner spouting after being left at a high temperature is likely to be suppressed, since the apparent glass transition temperature (Tg2) and heat generation starting temperature of the toner are within the above specific range, and the temperature-tan δ curve of the toner satisfies the formula (II-1). In a spouting test after leaving the toner at a high temperature, the toner of the second present disclosure preferably has a time (spouting time (sec)) of from 0 second to 15 seconds. The spouting time is a time for a phenomenon in which a toner spills off (spouts) from a developing roller of a cartridge is settled down. It is more preferable that the spouting time is shorter. It is still more preferably that no toner spouting occurs. In the present disclosure, the spouting test after leaving the toner at a high temperature is carried out as follows. The toner cartridge of the developing device of the printer of a commercially available non-magnetic one-component developing system is filled with the toner, and the cartridge filled with the toner is sealed so as not to be affected by humidity. The toner is left under a high temperature environment (temperature: 45° C.) for 5 days in the above-mentioned state. Then, the spouting test is carried out under an environment of 23° C. and humidity of 50% RH. The spouting test of the toner can be performed by the same method as “Spouting Test After Leaving Toner at a High Temperature”, which is described below in “Examples”.

EXAMPLES

Hereinafter, the present disclosure will be described further in detail, with reference to Examples and Comparative Examples. However, the present disclosure is not limited to these examples. Herein, part(s) and % are on a mass basis unless otherwise noted.

The weight average molecular weight Mw of the polymer was determined as a polystyrene equivalent molecular weight measured by GPC. A sample for measurement was obtained as follows: a polymer was dissolved in tetrahydrofuran (THF) so as to have a concentration of 2 mg/mL, and an ultrasonic treatment was carried out thereon for 10 minutes, followed by filtration through a 0.45 μm membrane filter, thereby obtaining the sample for measurement. The measurement conditions were as follows: temperature: 40° C., solvent: tetrahydrofuran, flow rate: 1.0 mL/min, concentration: 0.2 wt %, and sample input amount: 100 μL. As a column, GPC TSKgel Multipore HXL-M (30 cm×2) manufactured by Tosoh Corporation, was used. Also, the measurement was carried out under the condition that the first-order correlation (Log(Mw)–elution time) in a weight average molecular weight (Mw) range of from 1,000 to 300,000, was 0.98 or more. The weight average molecular weight Mw of the binder resin in the colorant resin particles was obtained as follows: a sample was obtained by dissolving the toner in THF, and the weight average molecular weight Mw of the binder resin was determined using data obtained by subtracting the peaks of the charge control resin, the softening agent, the styrene-based thermoplastic elastomer, and the like measured in advance from the results of GPC obtained by the aforementioned measurement method.

Example I Series: Toner of the First Present Disclosure

Example I-1

1. Production of Colored Resin Particles (1) Preparation of Polymerizable Monomer Composition for Core:

First, 70 parts of styrene, 30 parts of n-butyl acrylate, 0.1 parts of a polymethacrylic acid ester macromonomer (product name: AA6; manufactured by: TOAGOSEI Co., Ltd.; Tg: 94° C.), 0.72 parts of divinylbenzene, 1.25 parts of tetraethyl thiuram disulfide, and as a colorant, 8 parts of C.I. Pigment Yellow 155 (product name: TONERYELLOW3GP CT, manufactured by Clariant) were wet-pulverized by means of a media-type disperser (product name: PICOMILL, manufactured by ASADA IRON WORKS. Co., Ltd.). As a result of measuring the viscosity of the mixture obtained by the wet-pulverization by the following method, it was 974 mPa·s.

(Method for Measuring Viscosity)

The viscosity was measured by using a B type viscometer (device name: DV-I+ DIGITAL RHEOMETER, manufactured by Brookfield). The temperature of the mixture obtained by the wet-pulverization was brought to 25° C. using a constant temperature water bath. Then, after the mixture was rotated at a spindle rotation speed of 60 rpm for 1 minute, the viscosity of the mixture was measured. The following spindles were selected depending on the viscosity range to be measured.

Less than 100 mPa·s: Spindle No. 1

100 mPa·s or more and less than 200 mPa·s: Spindle No.

200 mPa·s or more and less than 1500 mPa·s: Spindle No. 3

To the mixture obtained by the wet-pulverization, 0.5 parts of a charge control resin (a styrene-acrylic resin containing a quaternary ammonium salt, functional group amount: 8% by mass) and 6.0 parts of a synthetic ester wax (pentaerythritol tetrabehenate, melting point: 76° C.) were added, mixed and dissolved to prepare a polymerizable monomer composition for core.

(2) Preparation of Aqueous Dispersion Medium:

An aqueous solution in which 7.3 parts of sodium hydroxide was dissolved in 50 parts of ion exchanged water, was gradually added under stirring to an aqueous solution in which 10.4 parts of magnesium chloride was dissolved in 280 parts of ion exchanged water, whereby a magnesium hydroxide colloidal dispersion was prepared.

(3) Preparation of Polymerizable Monomer for Shell:

An aqueous dispersion of a polymerizable monomer for shell was prepared by finely dispersing 2 parts of methyl methacrylate and 130 parts of water by means of an ultrasonic emulsifier.

(4) Droplets Forming Step:

The polymerizable monomer composition for core was added to the magnesium hydroxide colloidal dispersion (the magnesium hydroxide colloid amount: 5.3 parts), and the mixture was further stirred. Then, as a polymerization initiator, 6 parts of t-butylperoxy-2-ethylbutanoate was added thereto. The dispersion mixed with the polymerization initiator was dispersed at a rotational frequency of 15,000 rpm by an in-line type emulsifying and dispersing machine (product name: MILDER, manufactured by Pacific Machinery & Engineering Co., Ltd.) to form droplets of the polymerizable monomer composition for core.

(5) Suspension Polymerization Step:

The dispersion containing the droplets of the polymerizable monomer composition for core was placed in a reactor, and the temperature of the dispersion was raised to 90° C. to initiate a polymerization reaction. After reaching the polymerization conversion rate of almost 100%, a solution prepared by dissolving, as a polymerization initiator for shell, 0.1 parts of 2,2'-azobis[2-methyl-N-(2-hydroxyethyl)-propionamide] (product name: VA-086, manufactured by Wako Pure Chemical Industries, Ltd., a water-soluble initiator) in the aqueous dispersion of the polymerizable monomer for shell, was added to the reactor. Next, the polymerization reaction was further continued by maintaining the dispersion temperature at 95° C. for 4 hours. Then, the polymerization reaction was stopped by water cooling, thereby obtaining an aqueous dispersion of core-shell type colored resin particles.

(6) Post-Treatment Step:

The aqueous dispersion of the colored resin particles was subjected to acid washing (25° C., 10 minutes) by adding, while stirring the aqueous dispersion, sulfuric acid to the dispersion until the pH of the dispersion reached 4.5 or less. Then, the colored resin particles were separated by filtration and washed with water. The washing water was filtered. The electric conductivity of the filtrate at this time was 20 μS/cm. The colored resin particles subjected to the washing and filtering step were dehydrated and dried to obtain dried colored resin particles.

(7) Volume Average Particle Diameter (Dv), Number Average Particle Diameter (Dn) and Particle Size Distribution (Dv/Dn)

About 0.1 g of the colored resin particles were weighed out and put in a beaker. Next, as a dispersant, 0.1 mL of a surfactant aqueous solution (product name: DRIWEL, manufactured by: Fujifilm Corporation) was added thereto. In addition, 10 mL to 30 mL of ISOTON II was put in the beaker. The mixture was dispersed for 3 minutes with a 20 W (watt) ultrasonic disperser. Then, the volume average particle diameter (Dv) and number average particle diameter (Dn) of the colored resin particles were measured with a particle size analyzer (product name: MULTISIZER, manufactured by: Beckman Coulter, Inc.) in the following conditions: aperture diameter: 100 μm, medium: ISOTON II, and the number of measured particles: 100,000 particles. Then, the particle size distribution (Dv/Dn) of the colored resin particles was calculated.

2. Production of Toner

To 100 parts of the colored resin particles, 0.2 parts of hydrophobized silica fine particles having an average particle diameter of 7 nm, 0.76 parts of hydrophobized silica fine particles having an average particle diameter of 20 nm, and 1.91 parts of hydrophobized silica fine particles having an average particle diameter of 50 nm, were added. They were mixed by means of a high-speed mixing machine (product name: FM MIXER, manufactured by NIPPON COKE & ENGINEERING CO., LTD.) to prepare the toner of Example I-1.

Examples I-2 to I-11 and Comparative Examples I-1 to I-2

The toners of the Examples I-2 to I-11 and Comparative Examples I-1 to 1-2 were obtained in the same manner as in Example I-1, except that each material was added according to Table 1 below, in the "(1) Preparation of Polymerizable Monomer Composition for Core" of "1. Production of Colored Resin Particles".

TABLE 1

| | Binder resin | | | | | | | |
|---|---|---|---|---|---|---|---|---|
| | Monovinyl monomer | | | Crosslinkable polymerizable monomer | | Macromonomer | | Molecular weight modifier |
| | ST | | BA | DVB | | AA6 | Mw | TET |
| | [Parts] | [% by mass] | [Parts] | [Parts] | [% by mass] | [Parts] | [x10$^5$] | [Parts] |
| Example I-1 | 70 | 68.6 | 30 | 0.72 | 0.71 | 0.1 | 3.72 | 1.25 |
| Example I-2 | 71 | 69.5 | 29 | 0.74 | 0.72 | 0.1 | 3.64 | 1.25 |
| Example I-3 | 71 | 69.5 | 29 | 0.74 | 0.72 | 0.1 | 3.01 | 1.25 |
| Example I-4 | 71 | 69.5 | 29 | 0.74 | 0.72 | 0.1 | 3.37 | 1.25 |
| Example I-5 | 71 | 69.6 | 29 | 0.72 | 0.71 | 0.1 | 3.35 | 1.25 |
| Example I-6 | 70 | 68.6 | 30 | 0.72 | 0.71 | 0.1 | 3.97 | 1.25 |
| Example I-7 | 70 | 68.6 | 30 | 0.72 | 0.71 | 0.1 | 3.11 | 1.25 |
| Example I-8 | 74 | 72.5 | 26 | 0.73 | 0.72 | 0.1 | 5.22 | 1.25 |
| Example I-9 | 70 | 68.5 | 30 | 0.80 | 0.78 | 0.1 | 4.59 | 1.25 |
| Example I-10 | 72 | 70.5 | 28 | 0.72 | 0.71 | 0.1 | 3.29 | 1.25 |
| Example I-11 | 88 | 68.7 | 32 | 0.65 | 0.64 | 0.1 | 2.60 | 1.25 |
| Comparative Example I-1 | 69 | 68.0 | 31 | 0.67 | 0.66 | 0.1 | N.D. | 0.75 |
| Comparative Example I-2 | 70 | 68.6 | 30 | 0.72 | 0.71 | 0.1 | 2.79 | 1.25 |

| | Colorant | | | Mixture of polymerizable monomer, TET and colorant | Charge control | Synthetic | Colored resin particles | |
|---|---|---|---|---|---|---|---|---|
| | Type | Product name | [Parts] | Viscosity [mPa · s] | resin [Parts] | ester wax [Parts] | Dv [μm] | Dv/Dn |
| Example I-1 | PY155 | TY3GP-CT | 8 | 974 | 0.5 | 6.0 | 6.2 | 1.14 |
| Example I-2 | PY155 | VY5GD | 9 | 362 | 0.5 | 6.0 | 7.1 | 1.24 |
| Example I-3 | PY155 | VY5GD | 9 | 280 | 0.5 | 6.0 | 7.4 | 1.21 |
| Example I-4 | PY155 | VY5GD | 9 | 350 | 0.5 | 6.0 | 6.7 | 1.20 |
| Example I-5 | PY155 | TY3GP-CT | 8 | 974 | 0.5 | 6.0 | 7.1 | 1.16 |
| Example I-6 | PY155 | TY3GP-CT | 8 | 704 | 0.5 | 6.0 | 8.5 | 1.12 |
| Example I-7 | PY155 | TY3GP-CT | 8 | 704 | 0.5 | 6.0 | 8.2 | 1.13 |
| Example I-8 | PY93 | CY3G | 8 | 240 | 0.5 | 6.0 | 7.1 | 1.29 |
| Example I-9 | PY155 | TY3GP-CT | 7 | 504 | 0.5 | 6.0 | 7.2 | 1.19 |
| Example I-10 | PY155 | TY3GP-CT | 7 | 1836 | 0.5 | 6.0 | 5.9 | 1.14 |
| Example I-11 | PY155 | TY3GP-CT | 8 | 704 | 0.5 | 6.0 | 7.1 | 1.14 |
| Comparative Example I-1 | PY155 | TY3GP-CT | 8 | 704 | 0.5 | 6.0 | 6.4 | 1.12 |
| Comparative Example I-2 | PY155 | TY3GP-CT | 8 | 590 | 0.5 | 6.0 | 8.0 | 1.18 |

Abbreviations in the table 1 are as follows.

ST: Styrene

BA: n-Butyl acrylate

DVB: Divinylbenzene

AA6 Polymethacrylic acid ester macromonomer (product name: AA6; manufactured by: TOAGOSEI Co., Ltd.; Tg: 94° C.)

TET: Tetraethyl thiuram disulfide

PY155: C.I. Pigment Yellow 155

PY93: C.I. Pigment Yellow 93

Details of each product name of the colorant in Table 1 are as follows.

TY3GP-CT: Product name "TONERYELLOW3GP CT", manufactured by Clariant

VY5GD: Product name "VERSAL YELLOW 5GD", manufactured by Synthesia

CY3G: Product name "CROMOPHTAL YELLOW D 1040", manufactured by BASF

The "% by mass" of ST and DVB in Table 1 is the content ratio of the constitutional unit derived from ST and the content ratio of the constitutional unit derived from DVB, in the total amount of 100% by mass of the binder resin, respectively. They are determined as the content ratio (% by mass) of ST or DVB to the total amount of 100% by mass of the polymerizable monomer and the molecular weight modifier used for synthesizing the binder resin.

The value of the weight average molecular weight Mw of the polymer contained in the binder resin is a value obtained by multiplying the value shown in Table 1 by $10^5$.

[Measurement of Viscoelasticity]

For the toner obtained in each of Examples and Comparative Examples, the temperature dependence curve for the loss tangent (tan δ) was obtained by dynamic viscoelasticity measurement. The dynamic viscoelasticity measurement was carried out using a rotating flat plate rheometer (product name: ARES-G2, manufactured by: TA Instruments Inc.) and a cross hatch plate under the conditions mentioned below. A test piece was obtained by pouring 0.2 g of the toner into a cylindrical mold of 8 mm φ and pressurizing the toner at 1.0 MPa for 30 seconds, thereby forming a columnar molded product having a diameter of 8 mm φ and a thickness of 3 mm.

(Conditions of the Dynamic Viscoelasticity Measurement)

Frequency: 24 Hz

Sample set: Test piece (3 mm thick) was sandwiched between 8 mm φ plates with a 20 g load, then the temperature of the test piece is raised to 80° C., the test piece was fused to the jig, and then the temperature was returned to 45° C. to start temperature increasing.

Temperature increasing rate: 5° C./min

Temperature range: 45° C. to 150° C.

The shape of the temperature dependence curve for the loss tangent (tan δ) of the toner obtained in each Example had the following characteristics. In the temperature range of from 45° C. to the glass transition temperature (Tg) shown in Table 2, with increasing temperature, the tan δ rapidly increased from around 0 to around 1.6, and the tan δ reached at the maximum value at the Tg. In the temperature range of from the Tg to around 100° C., the tan δ decreased with increasing temperature to around from 0.8 to 0.9 and reached the minimum value. In the temperature range of from the temperature at the minimum value of the tan δ to 150° C., the tan δ gradually increased with increasing temperature, then became a substantially constant value. As an example, the temperature dependence curve for the loss tangent (tan δ) of the toner obtained in Example I-1 is shown in FIG. 1. The dynamic viscoelasticity measurement was carried out in a range of from 45° C. to 150° C. However, FIG. 1 shows the measurement results in a range of from 45° C. to 145° C.

Further, for each toner, from the obtained temperature-tan δ curve, the loss tangent (tan δ) at 45° C., the glass transition temperature (Tg), the loss tangent (tan δ) at the glass transition temperature (Tg), the loss tangent (tan δ) at 100° C. and the loss tangent (tan δ) at 130° C. were determined, and the value of (tan δ(Tg)−tan δ (45° C.))/(Tg−45) shown in the formula (I-1) and the value of (tan δ(130° C.)−tan δ(100° C.))/30 shown in the formula (I-2) were calculated.

[Measurement of Softening Temperature $T_{1/2}$]

For the toner obtained in each of Examples and Comparative Examples, the softening temperature ($T_{1/2}$) was measured by the ½ method at a pressure of 10.0 $kgf/cm^2$ using a flow tester (product name: CFT-500C) manufactured by Shimadzu Corporation under the following measurement conditions.

(Measurement Conditions)

Starting temperature: 35° C.

Temperature increasing rate: 3° C./min

Preheating time: 5 min

Cylinder pressure: 10.0 $kgf/cm^2$

Die hole diameter: 0.5 mm

Die length: 1.0 mm

Sample input amount: 1.0 g to 1.3 g

[Evaluation]

(1) Heat-Resistant Temperature of Toner

First, 10 g of the toner was placed in a 100 mL polyethylene container, and the container was hermetically sealed. Then, the container was set in a constant temperature water bath set at a predetermined temperature. After 8 hours passed, the container was removed from the constant temperature water bath. The toner was transferred from the removed container onto a 42-mesh sieve in a manner preventing vibration as much as possible, and then it was set in a powder characteristic tester (product name: POWDER TESTER (registered trademark) PT-R, manufactured by Hosokawa Micron Corporation). The amplitude condition of the sieve was set to 1.0 mm, and the sieve was vibrated for 30 seconds. Then, the mass of the toner remaining on the sieve was measured, and the thus-measured mass was determined as an aggregated toner mass.

The maximum temperature at which the aggregated toner mass became 0.5 g or less, was determined as the heat-resistant temperature of the toner. As the heat-resistant temperature increases, the blocking during toner storage is less likely to occur and the toner becomes more excellent in shelf stability.

(2) Fixing Temperature of Toner

A commercially-available, non-magnetic one-component developing printer was modified such that the temperature of the fixing roller was able to be changed. While the temperature of the fixing roller of the printer was changed from 120° C. by 5° C., the fixing rate at each changed temperature was measured. The relationship between the temperature and the fixing rate was determined, and the lowest temperature at which the fixing rate of 80% or more was obtained, was defined as the fixing temperature of the toner. The lower the fixing temperature, the better the toner has low-temperature fixability.

The fixing rate was calculated from the image density ratio before and after a rubbing test operation of a black solid area on a test paper sheet printed by the printer. When the image density before the rubbing test is determined as "ID (before)" and the image density after the rubbing test is determined as "ID (after)", the fixing rate is determined as follows: the fixing rate (%)=[ID (after)/ID (before)]×100. The rubbing test was carried out by attaching the measurement area of the test paper sheet to a fastness tester with an adhesive tape, applying a 500 g load, and carrying out reciprocating rubbing 5 times with a rubbing terminal wrapped with a cotton cloth.

(3) Gloss (Glossiness)

A commercially-available, non-magnetic one-component developing printer (a 24 sheets per minute printer; printing speed: 24 sheets/min) was modified such that the temperature of the fixing roller was able to be changed. The toner cartridge in the development device of the modified printer was filled with 100 g of the toner. Then, printing sheets were loaded in the printer.

The printer was adjusted such that the amount of the toner of a solid image on the sheets became 0.35 $mg/cm^2$. Then, the temperature of the fixing roller (fixing temperature) was set at 170° C., and a solid image of 5 cm square was printed on a sheet (product name: INITIATIVE MULTIPURPOSE PAPER, manufactured by Cowans Group). The obtained solid image of 5 cm square was measured for gloss value with a gloss meter (product name: VGS-SENSOR, manufactured by Nippon Denshoku Industries Co., Ltd.) at an incident angle of 60°. The larger the gloss value, the higher the gloss feeling.

TABLE 2

| | tanδ (45° C.) | tanδ (Tg) | Tg [° C.] | tanδ (100° C.) | tanδ (130° C.) | (tanδ(Tg) − tanδ(45° C.))/ (Tg − 45) | (tanδ(130° C. − tanδ(100° C.))/ 30 | $T_{1/2}$ (10 kg method) [° C.] | Heat-resistant temperature [° C.] | Fixing temperature [° C.] | Gloss |
|---|---|---|---|---|---|---|---|---|---|---|---|
| Example I-1 | 0.107 | 1.610 | 66.7 | 0.860 | 1.058 | $6.93 \times 10^{-2}$ | $6.6 \times 10^{-3}$ | 169 | 54 | 160 | 2.7 |
| Example I-2 | 0.067 | 1.640 | 68.9 | 0.877 | 1.206 | $6.58 \times 10^{-2}$ | $1.1 \times 10^{-2}$ | 168 | 55 | 170 | 2.7 |
| Example I-3 | 0.071 | 1.760 | 69.8 | 1.005 | 1.277 | $6.81 \times 10^{-2}$ | $9.1 \times 10^{-3}$ | 158 | 53 | 160 | 2.9 |
| Example I-4 | 0.066 | 1.730 | 69.1 | 0.949 | 1.261 | $6.90 \times 10^{-2}$ | $1.0 \times 10^{-2}$ | 163 | 54 | 170 | 2.8 |
| Example I-5 | 0.100 | 1.670 | 67.8 | 0.906 | 1.155 | $6.89 \times 10^{-2}$ | $8.3 \times 10^{-3}$ | 163 | 54 | 170 | 2.8 |
| Example I-6 | 0.080 | 1.560 | 66.7 | 0.818 | 0.974 | $6.82 \times 10^{-2}$ | $5.2 \times 10^{-3}$ | 173 | 55 | 170 | 2.6 |
| Example I-7 | 0.101 | 1.620 | 67.5 | 0.836 | 1.070 | $6.75 \times 10^{-2}$ | $7.8 \times 10^{-3}$ | 170 | 55 | 170 | 2.6 |
| Example I-8 | 0.013 | 1.860 | 73.9 | 0.990 | 1.087 | $6.39 \times 10^{-2}$ | $3.2 \times 10^{-3}$ | 193 | 54 | 180 | 2.3 |
| Example I-9 | 0.076 | 1.610 | 69.3 | 0.845 | 0.949 | $6.31 \times 10^{-2}$ | $3.5 \times 10^{-3}$ | 183 | 56 | 170 | 2.3 |
| Example I-10 | 0.069 | 1.291 | 66.8 | 0.573 | 0.807 | $5.60 \times 10^{-2}$ | $8.0 \times 10^{-3}$ | 162 | 59 | 170 | 2.8 |
| Example I-11 | 0.177 | 1.540 | 64.1 | 1.074 | 1.206 | $7.10 \times 10^{-2}$ | $4.0 \times 10^{-3}$ | 151 | 53 | 170 | 3.1 |
| Cemparative Example I-1 | 0.080 | 1.600 | 67.2 | 0.667 | 0.570 | $6.85 \times 10^{-2}$ | $-3.2 \times 10^{-3}$ | 220 | 55 | 190 | 2.0 |
| Comparative Example I-2 | 0.077 | 1.870 | 68.3 | 0.667 | 1.282 | $7.70 \times 10^{-2}$ | $4.0 \times 10^{-3}$ | 154 | 52 | 160 | 3.0 |

[Discussion]

The toner of Comparative Example I-1 had a high fixing temperature and was inferior in low-temperature fixability, since the toner had viscoelasticity in which the value of (tan δ(130° C.)−tan δ(100° C.))/30 shown in the formula (I-2) was $-3.0\times10^{-3}$ or less in the temperature-tan δ curve. It was impossible to measure the weight-average molecular weight Mw of the polymer contained as the binder resin in the toner of Comparative Example I-1, since the toner was not sufficiently dissolved in THF.

The toner of Comparative Example 1-2 was inferior in shelf stability due to the low heat resistance temperature, that is, easy occurrence of blocking during toner storage, since the toner had viscoelasticity in which the value of (tan δ(Tg)−tan δ(45° C.))/(Tg−45) shown in the formula (I-1) was $7.60\times10^{-2}$ or more in the temperature-tan δ curve.

On the other hand, the toners of Examples I-1 to I-11 were excellent in shelf stability due to the high heat resistance temperature, that is, hardly occurrence of blocking during toner storage, had low fixing temperature and excellent low-temperature fixability, and were also excellent in glossiness, since the toners had viscoelasticity satisfying the formulae (I-1) and (I-2) in the temperature-tan δ curves.

Example II Series: Toner of the Second Present Disclosure

Production Example II-1: Production of Magenta Pigment A 2,5-Di-(4-methylphenylamino)terephthalic acid was cyclized in phosphoric acid to synthesize 2,9-dimethylquinacridone (C.I. Pigment Red 122). Water was added to the obtained phosphoric acid dispersion of 2,9-dimethylquinacridone, the 2,9-dimethylquinacridone was filtered off by a filter and washed with water. Water was added again to the washed 2,9-dimethylquinacridone to obtain an aqueous dispersion having a solid content of 20%.

Similarly, 2,5-di-phenylaminoterephthalic acid was used to produce an aqueous dispersion of quinacridone (C.I. Pigment Violet 19) with a solid content of 20%.

To 250 parts of an aqueous dispersion of the dimethylquinacridone (C.I. Pigment Red 122) having a solid content of 20% described above and 250 parts of an aqueous dispersion of the quinacridone (C.I. Pigment Violet 19) having a solid content of 20%, 250 parts of ethanol were added to obtain a mixture liquid of pigments. The mixture was transferred to a container equipped with a cooling tube and allowed to react under heating reflux for 5 hours while the pigments were ground. After completion of the reaction, the pigment was filtered off from the reaction solution, washed, and dried, and then pulverized to obtain a magenta pigment A which is a mixed crystal of magenta pigments (that is, a mixed crystal of C.I. Pigment Red 122 and C.I. Pigment Violet 19). The mass ratio of each pigment contained in the mixed crystal was C.I. Pigment Red 122: C.I. Pigment Violet 19=1:1.

Production Example II-2: Production of Elastomer (a)

To the pressure-resistant reactor, 23.2 kg of cyclohexane, 1.5 mmol of N, N, N', N'-tetramethylethylenediamine (TMEDA) and 1.70 kg of styrene were added. While stirring them at 40° C., 99.1 mmol of n-butyllithium was added thereto, the temperature of the mixture was increased to 50° C. and the mixture was polymerized for 1 hour. The polymerization conversion rate of styrene was 100% by mass. Subsequently, while controlling the temperature to keep from 50° C. to 60° C., 6.03 kg of isoprene was continuously added to the reactor over a period of 1 hour. After completion of the addition of isoprene, the isoprene was polymerized for an additional 1 hour to form a styrene-isoprene diblock copolymer. The polymerization conversion rate of the isoprene was 100% by mass. Next, as a coupling agent, 15.0 mmol of dimethyldichlorosilane was added thereto, and the coupling reaction was carried out for 2 hours to form a styrene-isoprene-styrene triblock copolymer. Thereafter, as a polymerization terminator, 198 mmol of methanol was added thereto and mixed well to stop the reaction, thereby obtaining a reaction solution containing a block copolymer composition. To 100 parts of the thus obtained reaction solution (containing 30 parts of a polymer component), 0.3 parts of 2,6-di-tert-butyl-p-cresol was added as an antioxidant, and mixed, thereby obtaining a mixture solution. The mixture solution was gradually added dropwise into hot water of from 85° C. to 95° C. to volatilize the solvent contained in the mixture solution to obtain a precipitate. This precipitate was pulverized and dried by hot air at 85° C., thereby recovering the block copolymer composition. The content ratio of the styrene monomer unit of the obtained block copolymer composition (Elastomer (a)) was 24% by mass, and the weight average molecular weight Mw of the copolymer was 106,000.

Example II-1

1. Production of Colored Resin Particles (1) Preparation of Polymerizable Monomer Composition for Core:

First, 74 parts of styrene, 26 parts of n-butyl acrylate, 0.1 parts of a polymethacrylic acid ester macromonomer (product name: AA6; manufactured by: TOAGOSEI Co., Ltd.; Tg: 94° C.), 0.50 parts of tetraethyl thiuram disulfide, and as a colorant, 8.0 parts of the magenta pigment A (the mixed crystal of C.I. Pigment Red 122 and C.I. Pigment Violet 19) obtained in the production example 1 were wet-pulverized by means of a media-type disperser (product name: PICOMILL, manufactured by ASADA IRON WORKS. Co., Ltd.).

To the mixture obtained by the wet-pulverization, 10.0 parts of a charge control resin (CCR1: a styrene-acrylic resin containing a quaternary ammonium salt, functional group amount: 1% by mass), 12.0 parts of a synthetic ester wax 1 (hexaglycerin octabehenate, melting point: 70° C.), and as a styrene-based thermoplastic elastomer, 2.0 parts of Elastomer (a) obtained in the production example II-2 were added, mixed and dissolved to prepare a polymerizable monomer composition for core.

(2) Preparation of Aqueous Dispersion Medium:

An aqueous solution in which 7.3 parts of sodium hydroxide was dissolved in 50 parts of ion exchanged water, was gradually added under stirring to an aqueous solution in which 10.4 parts of magnesium chloride was dissolved in 280 parts of ion exchanged water, whereby a magnesium hydroxide colloidal dispersion was prepared.

(3) Preparation of Polymerizable Monomer for Shell:

An aqueous dispersion of a polymerizable monomer for shell was prepared by finely dispersing 2 parts of methyl methacrylate and 130 parts of water by means of an ultrasonic emulsifier.

(4) Droplets Forming Step:

The polymerizable monomer composition for core was added to the magnesium hydroxide colloidal dispersion (the magnesium hydroxide colloid amount: 5.3 parts), and the mixture was further stirred. Then, as a polymerization initiator, 6 parts of t-butylperoxy-2-ethylbutanoate was added thereto. The dispersion mixed with the polymerization initiator was dispersed at a rotational frequency of 15,000 rpm by an in-line type emulsifying and dispersing machine (product name: MILDER, manufactured by Pacific Machinery & Engineering Co., Ltd.) to form droplets of the polymerizable monomer composition for core.

(5) Suspension Polymerization Step:

The dispersion containing the droplets of the polymerizable monomer composition for core was placed in a reactor, and the temperature of the dispersion was raised to 90° C. to initiate a polymerization reaction. After reaching the polymerization conversion rate of almost 100%, a solution prepared by dissolving, as a polymerization initiator for shell, 0.1 parts of 2,2'-azobis[2-methyl-N-(2-hydroxyethyl)-propionamide] (product name: VA-086, manufactured by Wako Pure Chemical Industries, Ltd., a water-soluble initiator) in the aqueous dispersion of the polymerizable monomer for shell, was added to the reactor. Next, the polymerization reaction was further continued by maintaining the dispersion temperature at 95° C. for 4 hours. Then, the polymerization reaction was stopped by water cooling, thereby obtaining an aqueous dispersion of core-shell type colored resin particles.

(6) Post-Treatment Step:

The aqueous dispersion of the colored resin particles was subjected to acid washing (25° C., 10 minutes) by adding, while stirring the aqueous dispersion, sulfuric acid to the dispersion until the pH of the dispersion reached 4.5 or less. Then, the colored resin particles were separated by filtration and washed with water. The washing water was filtered. The electric conductivity of the filtrate at this time was 20 μS/cm. The colored resin particles subjected to the washing and filtering step were dehydrated and dried to obtain dried colored resin particles.

The volume average particle diameter (Dv) and number average particle diameter (Dn) of the obtained colored resin particles were measured in the same manner as in Example I series.

2. Production of Toner

To 100 parts of the colored resin particles, 0.2 parts of hydrophobized silica fine particles having an average particle diameter of 7 nm, 0.76 parts of hydrophobized silica fine particles having an average particle diameter of 20 nm, and 1.91 parts of hydrophobized silica fine particles having an average particle diameter of 50 nm, were added. They were mixed by means of a high-speed mixing machine (product name: FM MIXER, manufactured by NIPPON COKE & ENGINEERING CO., LTD.) to prepare the toner of Example II-1.

Examples II-2 to II-17 and Comparative Examples II-1 to II-7

The toners of the Examples II-2 to II-17 and Comparative Examples II-1 to II-7 were obtained in the same manner as in Example II-1, except that each material was added according to Table 3 below, in the "(1) Preparation of Polymerizable Monomer Composition for Core" of "1. Production of Colored Resin Particles".

TABLE 3

| | Binder resin | | | | | | Colorant | |
|---|---|---|---|---|---|---|---|---|
| | ST | BA | AA6 | DVB | Mw | TET (Molecular weight modifier) | | |
| | [Parts] | [Parts] | [Parts] | [Parts] | [×10$^4$] | [Parts] | Type | [Parts] |
| Example II-1 | 74 | 26 | 0.1 | 0.0 | 5.74 | 0.50 | Magenta pigment A | 8.0 |
| Example II-2 | 76 | 24 | 0.1 | 0.0 | 5.71 | 0.50 | Maganta pigment A | 8.0 |
| Example II-3 | 71 | 29 | 0.1 | 0.0 | 5.50 | 0.50 | Magenta pigment A | 8.0 |
| Example II-4 | 74 | 26 | 0.1 | 0.0 | 3.64 | 1.25 | Magenta pigment A | 8.0 |
| Example II-5 | 74 | 26 | 0.1 | 0.0 | 3.08 | 1.50 | Magenta pigment A | 8.0 |
| Example II-6 | 71 | 29 | 0.1 | 0.0 | 4.85 | 0.50 | Magenta pigment A | 8.0 |
| Example II-7 | 71 | 29 | 0.1 | 0.0 | 3.96 | 0.80 | Magenta pigment A | 8.0 |

TABLE 3-continued

| | | | | | | | | |
|---|---|---|---|---|---|---|---|---|
| Example II-8 | 71 | 29 | 0.1 | 0.0 | 5.17 | 0.20 | Magenta pigment A | 8.0 |
| Example II-9 | 74 | 26 | 0.1 | 0.0 | 6.70 | 0.75 | Magenta pigment A | 8.0 |
| Example II-10 | 74 | 26 | 0.1 | 0.0 | 5.51 | 0.50 | Magenta pigment A | 8.0 |
| Example II-11 | 71 | 29 | 0.1 | 0.0 | 3.76 | 1.00 | Magenta pigment A | 8.0 |
| Example II-12 | 75 | 25 | 0.1 | 0.0 | 6.05 | 1.25 | PB15:3 | 6.0 |
| Example II-13 | 75 | 25 | 0.1 | 0.0 | 6.23 | 1.75 | PB15:3 | 6.0 |
| Example II-14 | 76 | 24 | 0.1 | 0.0 | 8.14 | 1.25 | PB15:3 | 8.0 |
| Example II-15 | 77 | 23 | 0.1 | 0.0 | 9.84 | 1.25 | PB15:3 | 6.0 |
| Comparative Example II-1 | 75 | 25 | 0.1 | 0.0 | 9.61 | 0.00 | PB15:3 | 6.0 |
| Comparative Example II-2 | 76 | 24 | 0.1 | 0.0 | 11.8 | 0.00 | PB15:3 | 6.0 |
| Comparative Example II-3 | 75 | 25 | 0 | 0.0 | 3.38 | 3.25 | PB15:3 | 6.0 |
| Comparative Example II-4 | 75 | 25 | 0.1 | 0.0 | 6.57 | 0 | Magenta pigment A | 8.0 |
| Example II-16 | 75 | 25 | 0.1 | 0.0 | 5.33 | 0.75 | PY214/SY98 | 6.4/1.28 |
| Example II-17 | 75 | 25 | 0.1 | 0.0 | 5.69 | 0.95 | PY214/SY98 | 6.4/1.28 |
| Comparative Example II-5 | 75 | 25 | 0.1 | 0.0 | 4.60 | 1.00 | PY214/SY98 | 6.4/1.28 |
| Comparative Example II-6 | 75 | 25 | 0.1 | 0.0 | 3.58 | 1.45 | PY214/SY98 | 6.4/1.28 |
| Comparative Example II-7 | 73 | 27 | 0.1 | 0.6 | N.D. | 0.75 | PY214/SY98 | 8.0/1.6 |

| | Charge control resin | | Synthetic ester wax | | | Elastomer | Colored resin particles | |
|---|---|---|---|---|---|---|---|---|
| | | | Ester wax 1 | Ester wax 2 | Ester wax 3 | (a) | Dv | |
| | Type | [Parts] | [Parts] | [Parts] | [Parts] | [Parts] | [μm] | Dv/Dn |
| Example II-1 | CCR1 | 10.0 | 12.0 | 0.0 | 0.0 | 2.0 | 6.3 | 1.1 |
| Example II-2 | CCR1 | 10.0 | 12.0 | 0.0 | 0.0 | 2.0 | 6.2 | 1.1 |
| Example II-3 | CCR1 | 10.0 | 12.0 | 0.0 | 0.0 | 2.0 | 6.5 | 1.1 |
| Example II-4 | CCR1 | 10.0 | 12.0 | 0.0 | 0.0 | 2.0 | 7.0 | 1.1 |
| Example II-5 | CCR1 | 10.0 | 12.0 | 0.0 | 0.0 | 2.0 | 7.2 | 1.1 |
| Example II-6 | CCR1 | 13.0 | 0.0 | 12.0 | 0.0 | 0.0 | 6.5 | 1.1 |
| Example II-7 | CCR1 | 10.0 | 0.0 | 12.0 | 0.0 | 0.0 | 8.5 | 1.1 |
| Example II-8 | CCR1 | 10.0 | 0.0 | 12.0 | 0.0 | 0.0 | 6.4 | 1.1 |
| Example II-9 | CCR1 | 13.0 | 12.0 | 0.0 | 0.0 | 2.0 | 6.9 | 1.1 |
| Example II-10 | CCR1 | 10.0 | 15.0 | 0.0 | 0.0 | 2.0 | 6.1 | 1.1 |
| Example II-11 | CCR1 | 10.0 | 0.0 | 12.0 | 0.0 | 0.0 | 7.4 | 1,1 |
| Example II-12 | CCR1 | 13.0 | 15.0 | 0.0 | 0.0 | 2.0 | 6.8 | 1.1 |
| Example II-13 | CCR1 | 13.0 | 15.0 | 0.0 | 0.0 | 2.0 | 6.9 | 1.1 |
| Example II-14 | CCR1 | 13.0 | 15.0 | 0.0 | 0.0 | 3.0 | 6.1 | 1.1 |
| Example II-15 | CCR1 | 13.0 | 15.0 | 0.0 | 0.0 | 5.0 | 6.3 | 1.1 |
| Comparative Example II-1 | CCR1 | 13.0 | 15.0 | 0.0 | 0.0 | 2.0 | 6.0 | 1.1 |
| Comparative Example II-2 | CCR1 | 13.0 | 15.0 | 0.0 | 0.0 | 3.0 | 6.0 | 1.1 |
| Comparative Example II-3 | CCR1 | 13.0 | 0.0 | 15.0 | 0.0 | 0.0 | 6.1 | 1.1 |
| Comparative Example II-4 | CCR1 | 10.0 | 0.0 | 14.0 | 0.0 | 0.0 | 6.9 | 1.1 |
| Example II-16 | CCR2 | 10.0 | 15.0 | 0.0 | 0.0 | 2.0 | 6.2 | 1.1 |
| Example II-17 | CCR2 | 12.5 | 15.0 | 0.0 | 0.0 | 2.0 | 6.9 | 1.1 |
| Comparative Example II-5 | CCR2 | 10.0 | 15.0 | 0.0 | 0.0 | 2.0 | 6.2 | 1.1 |
| Comparative Example II-6 | CCR2 | 10.0 | 15.0 | 0.0 | 0.0 | 2.0 | 6.3 | 1.1 |
| Comparative Example II-7 | CCR1 | 7.0 | 0.0 | 0.0 | 15.0 | 0.0 | 7.1 | 1.1 |

Abbreviations in the table 3 are as follows. In the abbreviations in Table 3, those described in Table 1 are as described above.

PB15:3: C.I. Pigment Blue 15:3

PY214: C.I. Pigment Yellow 214

SY98: C.I. Solvent Yellow 98

CCR1: Styrene-acrylic resin containing a quaternary ammonium salt, functional group amount: 1% by mass CCR2: Styrene-acrylic resin containing a quaternary ammonium salt, functional group amount: 0.5% by mass Ester wax 1: Hexaglycerin octabehenate (melting point: 70° C.)

Ester wax 2: Pentaerythritol tetrabehenate (melting point: 76° C.)

Ester wax 3: Pentaerythritol tetrastearate (melting point: 76° C.)

In Table 3, in Examples II-16 to II-17 and Comparative Examples II-5 to II-6, "PY214/SY98" as the type of the colorant and "6.4/1.28" as the amount of the colorant means that 6.4 parts of C.I. Pigment Yellow 214 and 1.28 parts of C.I. Solvent Yellow 98 were used as the colorant. In Comparative Example II-7, "PY214/SY98" as the type of the colorant and "8.0/1.6" as the amount of the colorant means that 8.0 parts of C.I. Pigment Yellow 214 and 1.6 parts of C.I. Solvent Yellow 98 were used as the colorant.

The value of the weight average molecular weight Mw of the polymer contained in the binder resin is a value obtained by multiplying the value shown in Table 3 by $10^4$.

[Measurement of Viscoelasticity]

For the toner obtained in each of Examples and Comparative Examples, the temperature dependence curve for the loss tangent (tan δ) was obtained by dynamic viscoelasticity measurement in the same manner as in Example I series.

Figure 2:
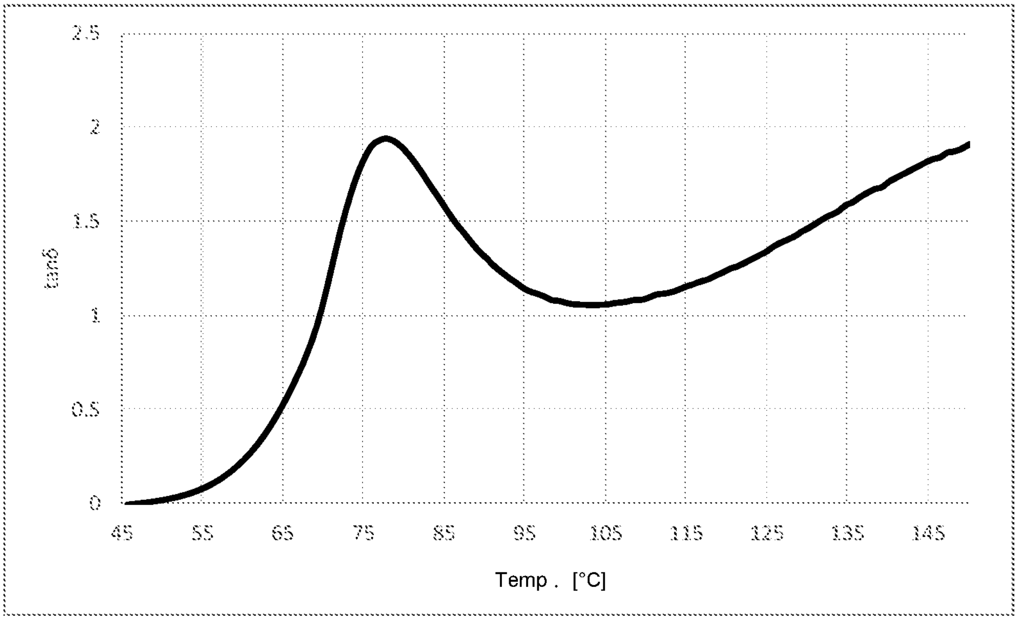
FIG. 2 is a graph showing the temperature dependence curve for the loss tangent (tan δ) of the toner of Example II-1.

The shape of the temperature dependence curve for the loss tangent (tan δ) of the toner obtained in each Example had the following characteristics. In the temperature range of from 45° C. to the glass transition temperature (Tg) shown in Table 4, with increasing temperature, the tan δ rapidly increased from around 0 to around 2.0 and the tan δ reached at the maximum value at the Tg. In the temperature range of from the Tg to around 100° C., the tan δ decreased with increasing temperature to around from 1.0 to 1.2 and reached the minimum value. In the temperature range of from the temperature at the minimum value of the tan δ to 150° C., the tan δ gradually increased with increasing temperature. As an example, the temperature dependence curve for the loss tangent (tan δ) of the toner obtained in Example II-1 is shown in FIG. 2. The dynamic viscoelasticity measurement was carried out in a range of from 45° C. to 150° C. However, FIG. 2 shows the measurement results in a range of from 45° C. to 145° C.

Further, for each toner, from the obtained temperature-tan δ curve, the loss tangent (tan δ) at 45° C., the glass transition temperature (Tg), the loss tangent (tan δ) at the glass transition temperature (Tg), the loss tangent (tan δ) at 100° C. and the loss tangent (tan δ) at 130° C. were determined, and the value of (tan δ(Tg)−tan δ(45° C.))/(Tg−45) shown in the formula (II-1) and the value of (tan δ (130° C.)−tan δ(100° C.))/30 shown in the formula (II-2) were calculated.

[Measurement of Softening Temperature $T_{1/2}$]

For the toner obtained in each of Examples and Comparative Examples, the softening temperature ($T_{1/2}$) was measured by the ½ method at a pressure of 5.0 kgf/cm$^2$ using a flow tester (product name: CFT-500C) manufactured by Shimadzu Corporation under the following measurement conditions.

(Measurement Conditions)

Starting temperature: 35° C.
Temperature increasing rate: 3° C./min
Preheating time: 5 min
Cylinder pressure: 5.0 kgf/cm$^2$
Die hole diameter: 0.5 mm
Die length: 1.0 mm
Sample input amount: 1.0 g to 1.3 g

[High-Speed DSC Measurement]

For the toner obtained in each of Examples and Comparative Examples, the DSC-curve at a time of increasing and decreasing the temperature of the toner was obtained by a high-speed differential scanning calorimetry. In the differential scanning calorimetry (DSC) of the toner using a high-speed differential scanning calorimeter, as a pretreatment of a sample, a silicon oil was applied and spread on a chip sensor, by using a brush tip. By applying the silicon oil to the chip sensor, the toner after the measurement does not fuse to the chip sensor. Accordingly, the toner after the measurement can be removed and the same chip sensor can be reused. As a result, the baselines are stabilized between samples, and data with good reproducibility can be obtained.

About 10 particles of toner were put on the chip sensor coated with silicone oil. The toner was subjected to the measurement under a nitrogen-gas flow and the following temperatures conditions (1) to (5) using an ultra-high-speed DSC device (FLASH DSC, manufactured by Mettler-Toledo).

(1) Hold at 0° C. for 0.1 second,
(2) Increase the temperature from 0° C. to 150° C. at 1000 K/sec,
(3) Hold at 150° C. for 60 seconds,
(4) Decrease the temperature from 150° C. to 0° C. at −1000 K/sec, and
(5) Hold at 0° C. for 1 second.

FIG. 3 shows how the apparent glass transition temperature (Tg2) of the toner at a time of increasing the temperature of the toner at a temperature increasing rate of 1000 K/sec, and the heat generation starting temperature of the toner at a time of decreasing the temperature of the toner at a temperature decreasing rate of 1000 K/sec, are obtained by a differential scanning calorimetry of the toner.

The apparent glass transition temperature (Tg2) was determined as the temperature of the intersection of a straight line obtained by extending the baseline on the low temperature side to the high temperature side, and a stepwise change part of the glass transition, or a tangential line drawn at a point where the slope of the curve of the endothermic peak due to enthalpy relaxation was maximized, in the DSC curve at the time of temperature increase.

The heat generation starting temperature of the toner was determined as the temperature at which exothermic heat was generated when, in the DSC curve at the time of temperature decrease, the curve deviated from the previous baseline and an exothermic peak occurred.

[Evaluation]

The heat-resistant temperature of the toner, the fixing temperature of the toner, and the glossiness (gloss) of the images were measured in the same manner as in Example I series.

The heat-resistant temperature and fixing temperature of the toner obtained in each of Examples and Comparative Examples were evaluated according to the following criteria.

(Evaluation Criteria for Heat Resistance Temperature)

◎: 58° C. or higher
○: 53° C. or higher and 57° C. or lower
x: 52° C. or lower (Evaluation Criteria for Fixing Temperature)

○: Less than 180° C.
x: 180° C. or higher (3) Spouting Test after Leaving Toner at a High Temperature A commercially-available, non-magnetic one-component developing printer was used, and the toner cartridge of the developing device of the printer was filled with toner.

The cartridge filled with the toner was sealed so as not to be affected by humidity, and the printer was left under a high-temperature environment (temperature: 45° C.) for 5 days. Then, the developing roller mounted on the cartridge was rotated by 400 revolutions per minute (equivalent to a printing speed of 40 ppm) using an electric screwdriver (EZ6220, manufactured by Panasonic Corporation) at 23° C. and a humidity of 50% RH. It was confirmed whether or not a phenomenon in which toner spilled off (spouted) from the developing roller of the cartridge occurred by the above-mentioned operation. When the spouting phenomenon occurred, the spouting time was determined as a time for the phenomenon in which the toner spilled off (spouted) from the developing roller of the cartridge was settled down. When the spouting phenomenon did not occur, the spouting time was determined as 0 sec.

TABLE 4

| | tanδ (45° C.) | tanδ (Tg) | Tg [° C.] | tanδ (100° C.) | tanδ (130° C.) | (tanδ(Tg) − tanδ(45° C.))/(Tg − 45) | (tanδ(130° C.) − tanδ(100° C.))/30 | $T_{1/2}$ (5 kg method) |
|---|---|---|---|---|---|---|---|---|
| Example II-1 | 0.003 | 1.940 | 77.9 | 1.070 | 1.466 | $5.89 \times 10^{-2}$ | $1.3 \times 10^{-2}$ | 141 |
| Example II-2 | 0.000 | 1.990 | 80.4 | 1.109 | 1.491 | $5.82 \times 10^{-2}$ | $1.3 \times 10^{-2}$ | 141 |
| Example II-3 | 0.000 | 1.880 | 74.5 | 1.060 | 1.618 | $6.37 \times 10^{-2}$ | $1.9 \times 10^{-2}$ | 141 |
| Exemple II-4 | 0.000 | 2.190 | 77.7 | 1.279 | 2.000 | $6.70 \times 10^{-2}$ | $2.4 \times 10^{-2}$ | 132 |
| Example II-5 | 0.000 | 2.270 | 76.0 | 1.364 | 2.277 | $7.32 \times 10^{-2}$ | $3.0 \times 10^{-2}$ | 128 |
| Example II-6 | 0.034 | 1.680 | 74.4 | 1.077 | 1.828 | $5.60 \times 10^{-2}$ | $2.5 \times 10^{-2}$ | 130 |
| Example II-7 | 0.000 | 1.790 | 75.3 | 1.241 | 2.076 | $5.91 \times 10^{-2}$ | $2.8 \times 10^{-2}$ | 128 |
| Example II-8 | 0.023 | 1.657 | 74.8 | 0.971 | 1.385 | $5.48 \times 10^{-2}$ | $1.4 \times 10^{-2}$ | 137 |
| Example II-9 | 0.000 | 2.005 | 76.5 | 1.164 | 1.843 | $6.37 \times 10^{-2}$ | $2.3 \times 10^{-2}$ | 138 |
| Example II-10 | 0.000 | 2.072 | 77.5 | 1.063 | 1.496 | $6.38 \times 10^{-2}$ | $1.4 \times 10^{-2}$ | 135 |
| Example II-11 | 0.000 | 1.970 | 74.6 | 1.318 | 2.417 | $6.63 \times 10^{-2}$ | $3.7 \times 10^{-2}$ | 128 |
| Example II-12 | 0.005 | 2.140 | 76.1 | 1.112 | 1.539 | $6.87 \times 10^{-2}$ | $1.4 \times 10^{-2}$ | 135 |
| Example II-13 | 0.008 | 2.180 | 75.8 | 1.131 | 1.556 | $7.05 \times 10^{-2}$ | $1.4 \times 10^{-2}$ | 127 |
| Example II-14 | 0.000 | 2.220 | 78.1 | 1.103 | 1.395 | $6.71 \times 10^{-2}$ | $9.7 \times 10^{-3}$ | 143 |
| Example II-15 | 0.000 | 2.242 | 79.4 | 1.052 | 1.153 | $6.52 \times 10^{-2}$ | $3.4 \times 10^{-3}$ | 163 |
| Comparative Example II-1 | 0.000 | 1.995 | 79.6 | 1.019 | 1.083 | $5.77 \times 10^{-2}$ | $2.1 \times 10^{-3}$ | 159 |
| Comparative Example II-2 | 0.000 | 1.985 | 80.8 | 1.015 | 1.016 | $5.55 \times 10^{-2}$ | $3.3 \times 10^{-5}$ | 166 |
| Comparative Example II-3 | 0.024 | 2.379 | 75.1 | 1.346 | 2.489 | $7.82 \times 10^{-2}$ | $3.8 \times 10^{-2}$ | 124 |
| Comparative Example II-4 | 0.000 | 1.555 | 77.0 | 0.904 | 1.246 | $4.86 \times 10^{-2}$ | $1.1 \times 10^{-2}$ | 142 |
| Example II-16 | 0.000 | 2.310 | 78.5 | 1.229 | 1.967 | $7.33 \times 10^{-2}$ | $2.5 \times 10^{-2}$ | 135 |
| Example II-17 | 0.010 | 2.277 | 77.0 | 1.298 | 2.242 | $7.08 \times 10^{-2}$ | $3.2 \times 10^{-2}$ | 137 |
| Comparative Example II-5 | 0.000 | 2.370 | 76.0 | 1.354 | 2.497 | $7.65 \times 10^{-2}$ | $3.8 \times 10^{-2}$ | 130 |
| Comparative Example II-6 | 0.013 | 2.420 | 75.5 | 1.552 | 2.947 | $7.89 \times 10^{-2}$ | $4.7 \times 10^{-2}$ | 124 |
| Comparative Example II-7 | 0.088 | 1.795 | 71.9 | 0.950 | 0.932 | $6.35 \times 10^{-2}$ | $-5.9 \times 10^{-4}$ | 226 |

| | Apparent Tg (Tg2) [° C.] | Heat generation starting temperature [° C.] | Heat-resistant temperature | Fixing temperature | Spouting after being left at a high temperature (sec) | Gloss |
|---|---|---|---|---|---|---|
| Example II-1 | 73 | 61 | ◎ 60° C. | ○ 160° C. | 0 | 2.8 |
| Example II-2 | 72 | 57 | ◎ 62° C. | ○ 180° C. | 0 | 2.8 |
| Example II-3 | 70 | 58 | ○ 57° C. | ○ 160° C. | 0 | 2.8 |
| Exemple II-4 | 73 | 51 | ○ 57° C. | ○ 150° C. | 0 | 3.3 |
| Example II-5 | 72 | 58 | ○ 55° C. | ○ 150° C. | 2 | 3.4 |
| Example II-6 | 70 | 55 | ◎ 59° C. | ○ 140° C. | 0 | 3.4 |
| Example II-7 | 69 | 54 | ○ 57° C. | ○ 140° C. | 0 | 3.5 |
| Example II-8 | 72 | 54 | ◎ 59° C. | ○ 160° C. | 0 | 3.0 |
| Example II-9 | 74 | 60 | ◎ 59° C. | ○ 160° C. | 0 | 3.0 |
| Example II-10 | 74 | 59 | ◎ 58° C. | ○ 160° C. | 0 | 3.1 |
| Example II-11 | — | — | ○ 56° C. | ○ 140° C. | 0 | 3.6 |
| Example II-12 | 74 | 56 | ○ 54° C. | ○ 160° C. | 4 | 2.1 |
| Example II-13 | 72 | 54 | ○ 54° C. | ○ 160° C. | 8 | 3.7 |
| Example II-14 | 71 | 56 | ◎ 58° C. | ○ 170° C. | 0 | 2.7 |
| Example II-15 | 72 | 52 | ◎ 59° C. | ○ 170° C. | 0 | 1.7 |
| Comparative Example II-1 | 73 | 64 | ◎ 61° C. | X 180° C. | 0 | 1.9 |
| Comparative Example II-2 | 75 | 61 | ◎ 61° C. | X 180° C. | 0 | 1.6 |
| Comparative Example II-3 | 67 | 49 | X — | ○ — | 20 | 3.9 |
| Comparative Example II-4 | — | — | ◎ 64° C. | X 180° C. | 0 | 2.8 |
| Example II-16 | 74 | 60 | ○ 53° C. | ○ 150° C. | 15 | 4.3 |
| Example II-17 | — | — | ○ 54° C. | ○ 150° C. | 0 | 3.6 |
| Comparative Example II-5 | 72 | 60 | X 52° C. | ○ 140° C. | 18 | 5.7 |
| Comparative Example II-6 | 72 | 57 | X 50° C. | ○ 140° C. | 31 | 7.6 |
| Comparative Example II-7 | 67 | 42 | ○ — | X — | 1 | 1.0 |

[Discussion]

The toners of Comparative Examples II-1, 11-2 and II-7 had a high fixing temperature and was inferior in low-temperature fixability, since the toners had viscoelasticity in which the value of (tan δ(130° C.)−tan δ(100° C.))/30 shown in the formula (II-2) was $2.1\times10^{-3}$ or less in the temperature-tan δ curve.

The toners of Comparative Examples II-3 and II-5 were inferior in shelf stability due to the low heat resistance temperature, that is, easy occurrence of blocking during toner storage, and were inferior in the property of spouting after being left at a high temperature, since the toners had viscoelasticity in which the value of (tan δ(Tg)−tan δ(45° C.))/(Tg−45) shown in the formula (II-1) was $7.60\times10^{-2}$ or more in the temperature-tan δ curve.

The toner of Comparative Example II-4 had a high fixing temperature and was inferior in low-temperature fixability, since the toner had viscoelasticity in which the value of (tan δ(Tg)−tan δ(45° C.))/(Tg−45) shown in the formula (II-1) was $5.00\times10^{-2}$ or less in the temperature-tan δ curve.

The toner of Comparative Example II-6 had lower heat resistance temperature and was more inferior in shelf stability, compared to the toner of Comparative Example II-5, since the toner of Comparative Example II-6 had viscoelasticity in which the value of (tan δ(Tg)−tan δ(45° C.))/(Tg−45) shown in the formula (II-1) was $7.60\times10^{-2}$ or more and the value of (tan δ(130° C.)−tan δ(100° C.))/30 shown in the formula (II-2) was $4.4\times10^{-2}$ or more, in the temperature-tan δ curve.

On the other hand, the toners of Examples II-1 to II-17 were excellent in shelf stability due to the high heat resistance temperature, that is, hardly occurrence of blocking during toner storage, had low fixing temperature and excellent low-temperature fixability, and were also excellent in glossiness, since the toners had viscoelasticity satisfying the formulae (II-1) and (II-2) in the temperature-tan δ curves. In addition, the toners of Examples II-1 to II-17 were excellent in the property of spouting after being left at a high temperature.

The invention claimed is:

1. A toner comprising colored resin particles containing a binder resin, a colorant, a softening agent and a charge control agent, and an external additive, wherein the binder resin comprises a polymer of polymerizable monomers including at least a monovinyl monomer; the monovinyl monomer includes styrene and at least one selected from the group consisting of acrylic esters and methacrylic esters; and a weight average molecular weight Mw of the polymer is $1.00\times10^{5}$ or more and $1.00\times10^{6}$ or less, wherein the colorant is composed of one or more yellow disazo-based pigments containing no chlorine atom, wherein a content of the colorant is from 5 parts by mass to 15 parts by mass with respect to 100 parts by mass of the polymerizable monomers, wherein a glass transition temperature (Tg) specified from a temperature dependence curve for a loss tangent (tan δ) of the toner, which is obtained by a dynamic viscoelastic measurement of the toner at a measurement frequency of 24 Hz, satisfies 45° C.<Tg(° C.)<100° C., and wherein, in the temperature dependence curve for the loss tangent (tan δ), the following formulae (I-1) and (I-2) are satisfied:

$$5.00\times10^{-2}<(\tan\delta(Tg)-\tan\delta(45°\ C.))/(Tg-45)<7.60\times10^{-2} \quad \text{Formula (I-1)}$$

$$-3.0\times10^{-3}<(\tan\delta(130°\ C.)-\tan\delta(100°\ C.))/30<9.8\times10^{-1} \quad \text{Formula (I-2)}$$

where tan δ (45° C.) is a loss tangent (tan δ) at 45° C.; tan δ (Tg) is a loss tangent (tan δ) at the glass transition temperature (Tg); tan δ (100° C.) is a loss tangent (tan δ) at 100° C.; and tan δ (130° C.) is a loss tangent (tan δ) at 130° C.

2. The toner according to claim 1, wherein a softening temperature ($T_{1/2}$) measured by a ½ method at a pressure of 10.0 kgf/cm$^2$ using a flow tester, is more than 154° C. and less than 220° C.

3. The toner according to claim 1, wherein the loss tangent (tan δ) at the glass transition temperature (Tg) is less than 1.870.

4. The toner according to claim 1, wherein, in the temperature dependence curve for the loss tangent (tan δ), the loss tangent (tan δ) at 100° C. is 0.800 or more and 1.100 or less, and the loss tangent (tan δ) at 130° C. is 0.800 or more and 1.280 or less.

5. The toner according to claim 1, wherein a weight average molecular weight of a polymer contained in the binder resin is $3.00\times10^{5}$ or more and $7.00\times10^{5}$ or less.

6. A toner comprising colored resin particles containing a binder resin, a colorant, a softening agent and a charge control agent, and an external additive, wherein the binder resin comprises a polymer of polymerizable monomers including at least a monovinyl monomer and a crosslinkable polymerizable monomer; the monovinyl monomer includes styrene and at least one selected from the group consisting of acrylic esters and methacrylic esters; the content of the crosslinkable polymerizable monomer is 0.05 parts by mass or less with respect to 100 parts by mass of the monovinyl monomer; and a weight average molecular weight Mw of the polymer is $1.00\times10^{4}$ or more and $2.00\times10^{5}$ or less, wherein the colorant comprises a phthalocyanine-based cyan pigment, a combination of a yellow dye and a yellow pigment containing a chlorine atom, or a quinacridone-based magenta pigment, wherein a content of the colorant is from 5 parts by mass to 15 parts by mass with respect to 100 parts by mass of the polymerizable monomers, wherein the charge control agent comprises a positively- or negatively-chargeable charge control resin, wherein a glass transition temperature (Tg) specified from a temperature dependence curve for a loss tangent (tan δ) of the toner, which is obtained by a dynamic viscoelastic measurement of the toner at a measurement frequency of 24 Hz, satisfies 45° C.<Tg(° C.)<100° C., and wherein, in the temperature dependence curve for the loss tangent (tan δ), the following formulae (II-1) and (II-2) are satisfied:

$$5.00\times10^{-2}<(\tan\delta(Tg)-\tan\delta(45°\ C.))/(Tg-45)<7.60\times10^{-2} \quad \text{Formula (I-1)}$$

$$-3.0\times10^{-3}<(\tan\delta(130°\ C.)-\tan\delta(100°\ C.))/30<9.8\times10^{-1} \quad \text{Formula (I-2)}$$

where tan δ (45° C.) is a loss tangent (tan δ) at 45° C.; tan δ (Tg) is a loss tangent (tan δ) at the glass transition temperature (Tg); tan δ (100° C.) is a loss tangent (tan δ) at 100° C.; and tan δ (130° C.) is a loss tangent (tan δ) at 130° C., and wherein a softening temperature ($T_{1/2}$) measured by a ½ method at a pressure of 5.0 kgf/$cm^2$ using a flow tester, is more than 124° C. and less than 159° C.

7. The toner according to claim 6, wherein an apparent glass transition temperature (Tg2) of the toner at a time of increasing a temperature of the toner at a temperature increasing rate of 1000 K/sec is from 68° C. to 74° C., and a heat generation starting temperature of the toner at a time of decreasing a temperature of the toner at a temperature decreasing rate of 1000 K/sec is from 50° C. to 62° C., both of which are obtained by a differential scanning calorimetry of the toner using a high-speed differential scanning calorimeter.

8. The toner according to claim 6, wherein the loss tangent (tan δ) at the glass transition temperature (Tg) is less than 2.410.

9. The toner according to claim 6, wherein, in the temperature dependence curve for the loss tangent (tan δ), the loss tangent (tan δ) at 100° C. is 0.900 or more and 1.400 or less, and the loss tangent (tan δ) at 130° C. is 1.000 or more and 2.500 or less.

10. The toner according to claim 6, wherein a weight average molecular weight of a polymer contained in the binder resin is $2.00\times10^4$ or more and $1.00\times10^5$ or less.

11. The toner according to claim 6, wherein the mass ratio of styrene:(meth)acrylic acid esters, which is the mass ratio of the styrene to the total mass of the acrylic acid esters and methacrylic acid esters, is 50:50 to 76:24.

* * * * *